(12) United States Patent
Agnew et al.

(10) Patent No.: US 10,459,939 B1
(45) Date of Patent: Oct. 29, 2019

(54) PARALLEL COORDINATES CHART VISUALIZATION FOR MACHINE DATA SEARCH AND ANALYSIS SYSTEM

(71) Applicant: Splunk Inc., San Francisco, CA (US)

(72) Inventors: Marshall Chalmers Agnew, Seattle, WA (US); Michael Porath, San Francisco, CA (US); Patrick Wied, London (GB); Clark Eugene Mullen, San Mateo, CA (US)

(73) Assignee: SPLUNK INC., San Francisco, CA (US)

( * ) Notice: Subject to any disclaimer, the term of this patent is extended or adjusted under 35 U.S.C. 154(b) by 386 days.

(21) Appl. No.: 15/224,618

(22) Filed: Jul. 31, 2016

(51) Int. Cl.
  *G06F 16/30* (2019.01)
  *G06F 16/248* (2019.01)
  *G06T 11/20* (2006.01)
  *G06F 16/26* (2019.01)
  *G06F 16/22* (2019.01)

(52) U.S. Cl.
  CPC ........ *G06F 16/248* (2019.01); *G06F 16/2264* (2019.01); *G06F 16/26* (2019.01); *G06T 11/206* (2013.01)

(58) Field of Classification Search
  CPC .................................................. G06F 16/248
  See application file for complete search history.

(56) References Cited

U.S. PATENT DOCUMENTS

| | | | |
|---|---|---|---|
| 6,188,403 B1 | 2/2001 | Sacerdoti et al. | |
| 6,366,299 B1 * | 4/2002 | Lanning | G06F 17/30572 |
| | | | 345/586 |
| 7,596,716 B2 | 9/2009 | Frost et al. | |
| 7,644,375 B1 | 1/2010 | Anderson et al. | |
| 8,650,492 B1 | 2/2014 | Mui et al. | |
| 8,806,361 B1 | 8/2014 | Noel et al. | |
| 9,021,361 B1 | 4/2015 | Pettinati et al. | |
| 9,530,228 B1 | 12/2016 | Fermum et al. | |
| 9,727,623 B1 | 8/2017 | Catania et al. | |
| 9,923,782 B1 | 3/2018 | Bindle et al. | |
| 10,061,601 B2 | 8/2018 | Marathe et al. | |
| 2002/0133504 A1 | 9/2002 | Vlahos et al. | |

(Continued)

OTHER PUBLICATIONS

Book entitled "Exploring Splunk", by Carasso, Copyright 2012.*

(Continued)

*Primary Examiner* — Mahesh H Dwivedi
(74) *Attorney, Agent, or Firm* — Perkins Coie LLP

(57) ABSTRACT

Disclosed are a system and a method for providing user-interactive parallel coordinates charts. In an embodiment, a machine data search and analysis system retrieves search results including a plurality of events, each of the events containing time-stamped data in response to a search query. The system identifies a plurality of characteristics from the data corresponding to the events. The system causes display of a multiple-dimensional chart (e.g., a parallel coordinates chart) depicting the data corresponding to the events. The multiple-dimensional chart includes a plurality of axes. Each of the axes corresponds to one of the identified characteristics. The multiple-dimensional chart further includes a plurality of polylines representing the events. Each of the polylines includes a plurality of vertices on the axes.

29 Claims, 81 Drawing Sheets
(64 of 81 Drawing Sheet(s) Filed in Color)

(56) References Cited

U.S. PATENT DOCUMENTS

| | | | |
|---|---|---|---|
| 2002/0143780 A1* | 10/2002 | Gorman | G06F 17/246 |
| 2003/0115333 A1 | 6/2003 | Cohen et al. | |
| 2003/0220897 A1* | 11/2003 | Lee | G06F 17/30439 |
| 2004/0117802 A1 | 6/2004 | Green | |
| 2005/0021731 A1 | 1/2005 | Sehm et al. | |
| 2007/0022000 A1 | 1/2007 | Bodart et al. | |
| 2007/0024490 A1* | 2/2007 | Carter | G06T 11/20 342/36 |
| 2007/0132727 A1* | 6/2007 | Garbow | G06F 17/30398 345/157 |
| 2007/0171716 A1 | 7/2007 | Wright et al. | |
| 2007/0250762 A1 | 10/2007 | Mansfield | |
| 2008/0126996 A1* | 5/2008 | Morris | G06F 3/0482 715/854 |
| 2008/0180458 A1 | 7/2008 | Favart et al. | |
| 2008/0181463 A1 | 7/2008 | Error | |
| 2010/0289804 A1 | 11/2010 | Jackman et al. | |
| 2011/0078707 A1 | 3/2011 | Larson et al. | |
| 2011/0292072 A1 | 12/2011 | Fisher et al. | |
| 2012/0174002 A1 | 7/2012 | Martin et al. | |
| 2012/0218254 A1 | 8/2012 | Abeln | |
| 2013/0091270 A1 | 4/2013 | Zhang et al. | |
| 2013/0159864 A1 | 6/2013 | Smith et al. | |
| 2013/0318603 A1 | 11/2013 | Merza | |
| 2013/0321407 A1 | 12/2013 | Jenkins et al. | |
| 2014/0115527 A1 | 4/2014 | Pepper et al. | |
| 2014/0156806 A1 | 6/2014 | Karpistsenko et al. | |
| 2014/0173412 A1 | 6/2014 | MacAulay et al. | |
| 2014/0297620 A1 | 10/2014 | Beisiegel et al. | |
| 2014/0362120 A1 | 12/2014 | Wohl et al. | |
| 2015/0019537 A1* | 1/2015 | Neels | G06F 17/30551 707/722 |
| 2015/0040041 A1 | 2/2015 | Yang et al. | |
| 2015/0119081 A1 | 4/2015 | Ayoob et al. | |
| 2015/0160835 A1 | 6/2015 | Singh et al. | |
| 2015/0212663 A1* | 7/2015 | Papale | G06F 17/30424 715/762 |
| 2015/0213631 A1* | 7/2015 | Vander Broek | G06T 11/206 345/589 |
| 2015/0301698 A1 | 10/2015 | Roques | |
| 2016/0078657 A1 | 3/2016 | McCord | |
| 2016/0103912 A1 | 4/2016 | Daggett et al. | |
| 2016/0104307 A1 | 4/2016 | Allyn et al. | |
| 2016/0205137 A1 | 7/2016 | Babb | |
| 2016/0212023 A1 | 7/2016 | Mohan et al. | |
| 2016/0232457 A1 | 8/2016 | Gray et al. | |
| 2016/0321574 A1 | 11/2016 | Peterson | |
| 2016/0335303 A1 | 11/2016 | Madhalam et al. | |
| 2017/0017903 A1 | 1/2017 | Gray et al. | |
| 2017/0039233 A1 | 2/2017 | Gauthier et al. | |
| 2017/0076507 A1 | 3/2017 | Bivins | |
| 2017/0098318 A1 | 4/2017 | Iannaccone et al. | |
| 2017/0132814 A1 | 5/2017 | Liu et al. | |
| 2017/0185609 A1 | 6/2017 | Braghin et al. | |
| 2017/0235815 A1 | 8/2017 | Bhatt et al. | |
| 2017/0293418 A1 | 10/2017 | Hams et al. | |
| 2017/0365078 A1 | 12/2017 | Cailly et al. | |
| 2018/0032512 A1 | 2/2018 | Oliner | |

OTHER PUBLICATIONS

Article entitled "Splunk>: Atlanta Meetup Advanced Visualizations", by Hutchinson, dated Jul. 2014.*

Article entitled "How-to Make a Conditional Column Chart in Excel", by Admin, dated Jan. 5, 2012.*

Article entitled "Advanced Splunk Dashboards in Operations and Support", by Hamel, dated 2003.*

Manual entitled "Splunk Enterprise 6.0 Dashboards and Visualizations", by Splunk, Dated Oct. 26, 2013.*

Manual entitled "Splunk Enterprise 6.0", by Splunk, Copyright 2013.*

Book entitled "Implementing Splunk: Big Data Reporting and Development for Operational Intelligence", Copyright 2013, by Bumgarner.*

Non-Final Office Action dated Sep. 4, 2018 for U.S. Appl. No. 15/224,622 of Agnew et al. filed Jul. 31, 2016.

U.S. Appl. No. 15/224,607 of Agnew, M. et al. filed Jul. 31, 2016.
U.S. Appl. No. 15/224,609 of Agnew, M. et al. filed Jul. 31, 2016.
U.S. Appl. No. 15/224,612 of Agnew, M. et al. filed Jul. 31, 2016.
U.S. Appl. No. 15/224,622 of Agnew, M. et al. filed Jul. 31, 2016.

Non-Final Office Action dated Oct. 12, 2018 for U.S. Appl. No. 15/224,612 of Agnew et al. filed Jul. 31, 2016.

Non-Final Office Action dated Oct. 1, 2018 for U.S. Appl. No. 15/224,609 of Agnew et al., filed Jul. 31, 2016.

"Conditional Formatting of Excel Charts", Peltier Tech Blog, retrieved on Oct. 3, 2018 from url: https://peltiertech.com/conditional-formatting-of-excel-charts/, Feb. 13, 2012, pp. 1-67.

Advisory Action dated Apr. 26, 2019 for U.S. Appl. No. 15/224,612 of Agnew et al., filed Jul. 31, 2016.

Final Office Action dated Apr. 18, 2019 for U.S. Appl. No. 15/224,609 of Agnew et al., filed Jul. 31, 2016.

Final Office Action dated Feb. 14, 2019 for U.S. Appl. No. 15/224,612 of Agnew et al., filed Jul. 31, 2016.

Final Office Action dated Feb. 26, 2019 for U.S. Appl. No. 15/224,622 of Agnew et al., filed Jul. 31, 2016.

Advisory Action dated May 15, 2019 for U.S. Appl. No. 15/224,622 of Agnew et al., filed Jul. 31, 2016.

* cited by examiner

FIG. 5B

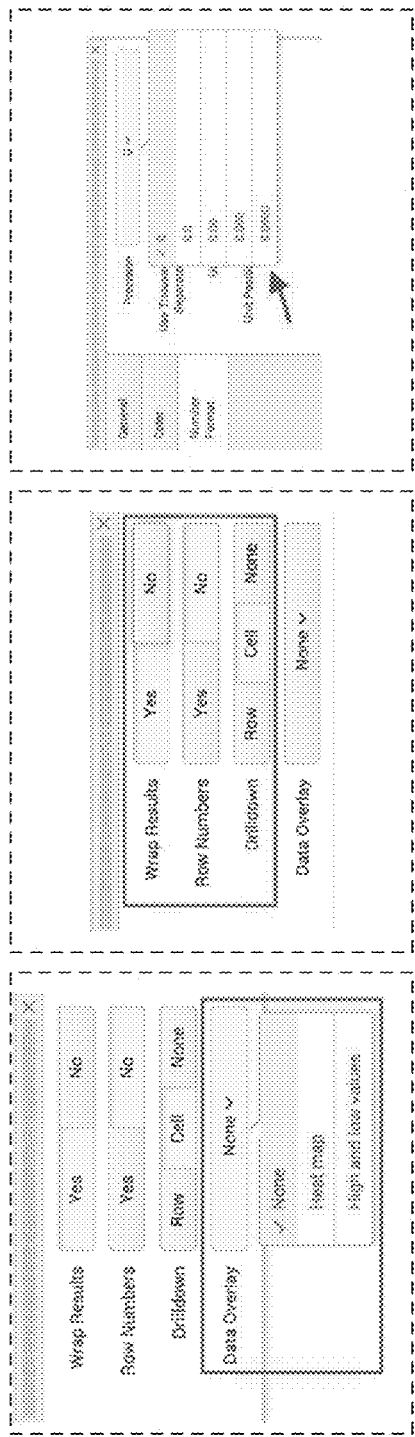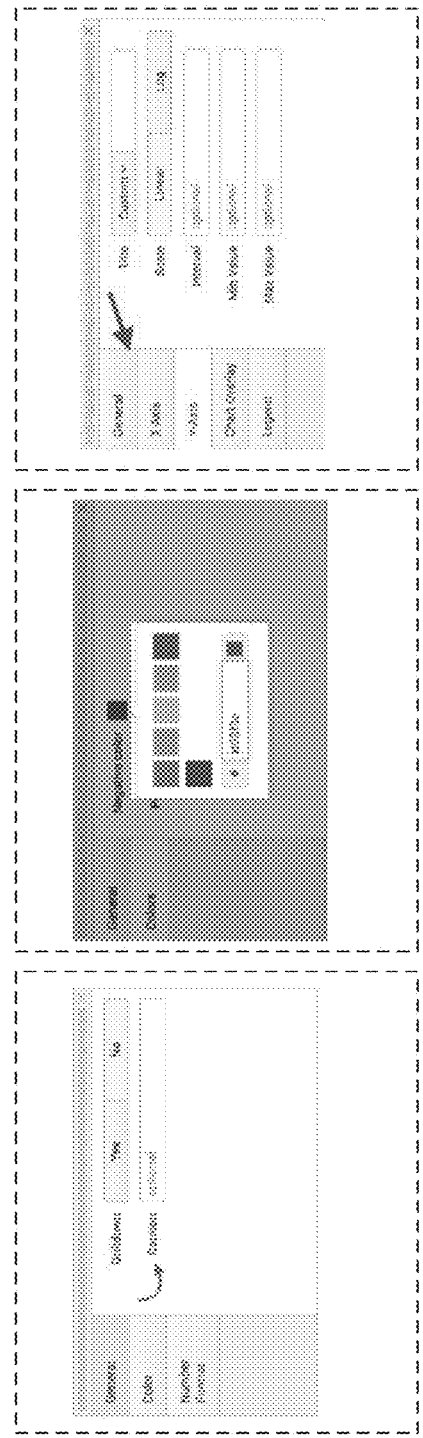
FIG. 9A  FIG. 9B  FIG. 9C
FIG. 9D  FIG. 9E  FIG. 9F

PARALLEL COORDINATES CHART VISUALIZATION FOR MACHINE DATA SEARCH AND ANALYSIS SYSTEM

COPYRIGHT NOTICE

The patent or application file contains at least one drawing executed in color. Copies of this patent or patent application publication with color drawing(s) will be provided by the Office upon request and payment of the necessary fee.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least one embodiment of the present disclosure pertains to information organization and understanding, and more particularly, to generating and displaying visualizations of event data (e.g. machine-generated event data).

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system or other information technology environment. Such data can be analyzed to diagnose equipment performance problems, monitor user interactions, and to derive other insights.

A number of tools are available to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

One or more embodiments of the present disclosure are illustrated by way of example and not limitation in the figures of the accompanying drawings, in which like references indicate similar elements.

FIG. 5B illustrates an example of a data summary dialog of the search GUI;

FIG. 9A shows an example user interface display providing an option to modify an interactive visualization in the form of a drop down menu;

FIG. 9B shows an example user interface display providing an option to modify an interactive visualization in the form of selectable buttons;

FIG. 9C shows an example user interface display providing an option to modify an interactive visualization in the form of a drop down menu prompting a user to select a level of precision for displayed values in an interactive visualization;

FIG. 9D shows an example user interface display providing an option to modify an interactive visualization in the form of an editable text field prompting a user to enter a caption to be displayed in a particular visualization;

FIG. 9E shows an example user interface display providing an option to modify an interactive visualization in the form of drop down menu prompting a user to select a categorical color to be applied in a particular interactive visualization;

FIG. 9F shows an example user interface display providing an option to modify an interactive visualization in the form of a menu through which a user can select groupings of other options to access;

FIG. 15 illustrates an example of a statistics tab for a flow diagram;

FIG. 23 illustrates an example of a statistics tab for a punchcard chart;

FIG. 37 illustrates an example of a visualization tab displaying horizon charts;

FIG. 38 illustrates an example of a horizon chart displaying additional information in response to a user interaction;

FIG. 43 illustrates an example of a statistics tab for a timeline chart;

FIG. 64 illustrates an example of a statistics tab for a calendar heat map;

FIG. 69 illustrates an example of a statistics tab for a location tracker graph;

DETAILED DESCRIPTION

Figure 1:
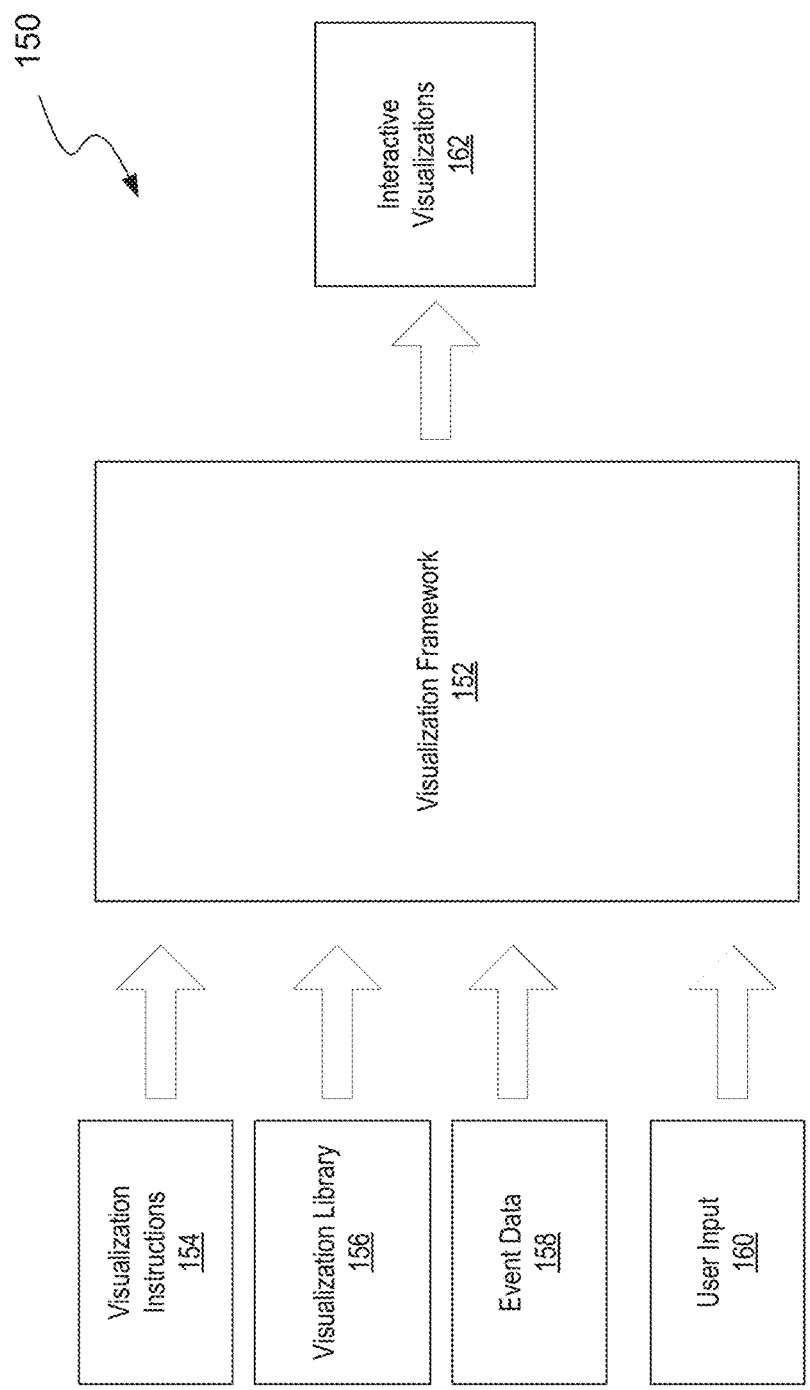
FIG. 1 is a flow diagram that schematically illustrates displaying interactive visualizations of data using modular visualization instructions based on static visualization libraries.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Interactive Visualizations—General Overview

Introduced herein are techniques for configuring, generating and displaying interactive visualizations of data, including but not limited to machine-generated data. Data visualization is generally understood to refer to a processing device presenting data to a user by displaying the data as one or more visual objects. A simple example is a bar graph that charts numerical values for certain variables by representing those values with bars of a varying length or width that correspond with the values. Other example visualization types include Sankey diagrams, punchcard plots, horizon charts, timelines, treemaps, Gantt charts, heat maps, and network diagrams. Some of these visualization types are described in more detail below. In some embodiments, the described techniques can be employed in or in conjunction with a computer system that indexes and stores machine-generated event data. The system that indexes and stores machine-generated data is also referred to herein as a data intake and query system.

In many cases, computer generated visualizations based on input data are static visualizations. In other words, the input data results in a static image that is representative of the data. For example, a bar graph may represent a static visualization of a particular set of numerical values for certain variables. Many resources and tools are available for producing computer-generated static visualizations of data. In many cases, software developers may access available open-source visualization libraries created by other developers that include instructions (i.e. code) for rendering static visualizations of data.

While useful to an extent in communicating to the user the underlying data, static visualizations are limited in that they do not allow a user to interact with the data to, for example, guide or focus their analysis. An interactive visualization, also called a dynamic visualization, can allow a user to modify a visual representation of the data. For example, consider again a bar graph. A displayed bar graph that is interactive may be dynamically modifiable in response to an input from a user. For example, the user may input a command to change the color, scale, or orientation, of any of the bars represented in the bar graph. Similarly, the user may input a command to omit certain underlying data that is not useful to the user from being represented in the bar graph. Further, the user may input a command to view the raw data associated with a given bar in the bar graph.

Generating the code to render such interactive visualizations can be complicated and/or time consuming for developers. Further, the code to render a particular type of interactive visualization may not be easily applied to other types of interactive visualizations or varying data types. Accordingly, some of the techniques introduced here are based on a framework through which modular visualizations, created by developers based on static visualization libraries, can be applied in various types of systems that process machine-generated data and/or other types of data, to produce rich visualizations of the processed data with various interactive features for end users. In this context, the visualization developers (i.e., those who create visualization modules for use within a visualization framework for displaying interactive visualizations) may be unaffiliated with the underlying computer system that processes the data to be visualized or a business entity that makes or operates that system. As used herein, the term "third-party developer" refers to such a software developer that is unaffiliated with development or the provision of the underlying computer system processing the data to be visualized. In other words, such as third-party developer would likely not have any knowledge of the underlying architecture of the computer system for processing the data (e.g. a system including the visualization framework).

FIG. 1 is a flow diagram 100 that illustrates at a high level the concept displaying interactive visualizations of data using modular visualization instructions based on underlying static visualization libraries (e.g. open source static visualization libraries). As shown in FIG. 1, a visualization framework 152 may include a control layer through which event data 158 is processed according to visualization instructions 154 (e.g. provided by a third-party developer) to generate and display interactive visualizations 162. In some embodiments, the interactive visualizations 162 are displayed by rendering the processed event data 158 by use of a visualization library 156 (e.g. an open source static visualization library). In some embodiments, the visualization instructions may include instructions to format raw event data 158 for use with the static visualization library 156, instructions to render the formatted event data 158 using the static visualization library 156, and in some cases information on options available to the user to modify (i.e. interact with) the resulting rendered visualization. Note that in some embodiments, the developer created instructions 154 may not include any logic on how to display to a user an interactive visualization, and may contain only logic on how to input a set of data and render a static visualization using the visualization library. In such embodiments, the visualization framework 152 includes the logic for, for example, displaying options to modify the interactive visualizations to users and modifying the displayed visualizations in response to detecting user inputs selecting such options. In other words, the visualization framework 152 operates as a control and transformation pipeline through which rendered static visualizations are continually updated in response to user inputs, resulting in a displayed interactive visualization from the point of view of a user. Through the use of, for example, a developer application programming interface (API), a developer of a software module (e.g. an application) can properly tailor the included visualization instructions 154 to be accessible to the visualization framework 152. This described technique has the benefit of simplifying the development process for a developer who wishes to create new interactive visualizations for use with existing data processing systems (e.g. a system that indexes and stores event data), because the developer does not need to code the interactive features of such a visualization. The described technique also has the benefit keeping control of the data underlying the interactive visualizations with the system that processes that data (e.g. a system that indexes and stores event data). In other words, the visualization framework 152 described herein can effectively limit the impact any developer-created visualization module may have on the underlying data being visualized or the systems processing that data.

As noted above, the techniques introduced here can be used to visualize or to facilitate visualization of machine-generated event data, among many other types of data. Accordingly, before further describing these visualization related techniques, it is useful to consider at least one example of a system and technique for storing and searching machine-generated event data. Note, however, that the system and techniques described here can be easily applied to or adapted for application to other kinds of data.

Storing and Searching Machine-Generated Data

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

Operating Environment—Example Computer System

Figure 2A:
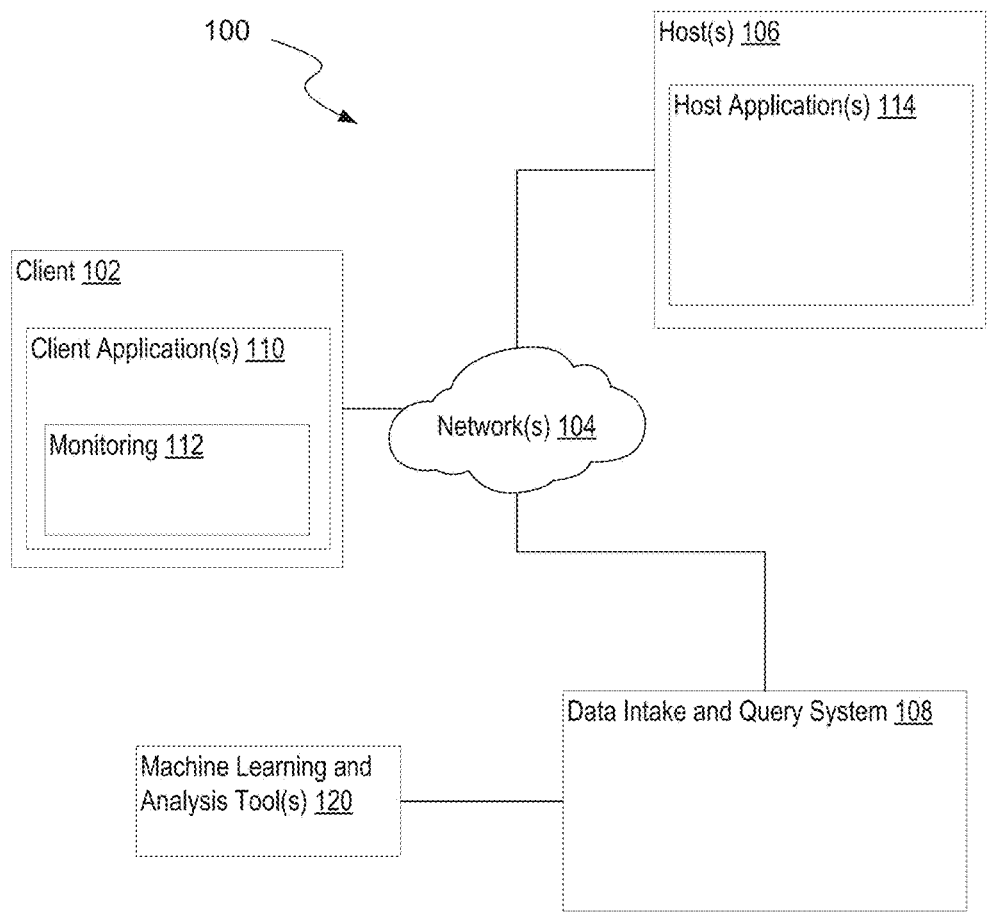
FIG. 2A is a block diagram that illustrates an example networked computer environment.

FIG. 2A illustrates a networked computer system 100 in which an embodiment may be implemented. Those skilled in the art would understand that FIG. 2A represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

Operating Environment—Host Devices

In the embodiment illustrated in FIG. 2A, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Operating Environment—Client Devices

Client devices 102 of FIG. 2A represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

Operating Environment—Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension. A client application 110 may also include a visualization application that can be used to visualize received machine-generated event data.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 2A) in which a value is stored. This field indicates a network latency measurement associated with one or more network requests. The data record may include a "state" field to store a value indicating a state of a network connection, and so forth for any number of aspects of collected performance data.

Operating Environment—Data Server System

Figure 2B:
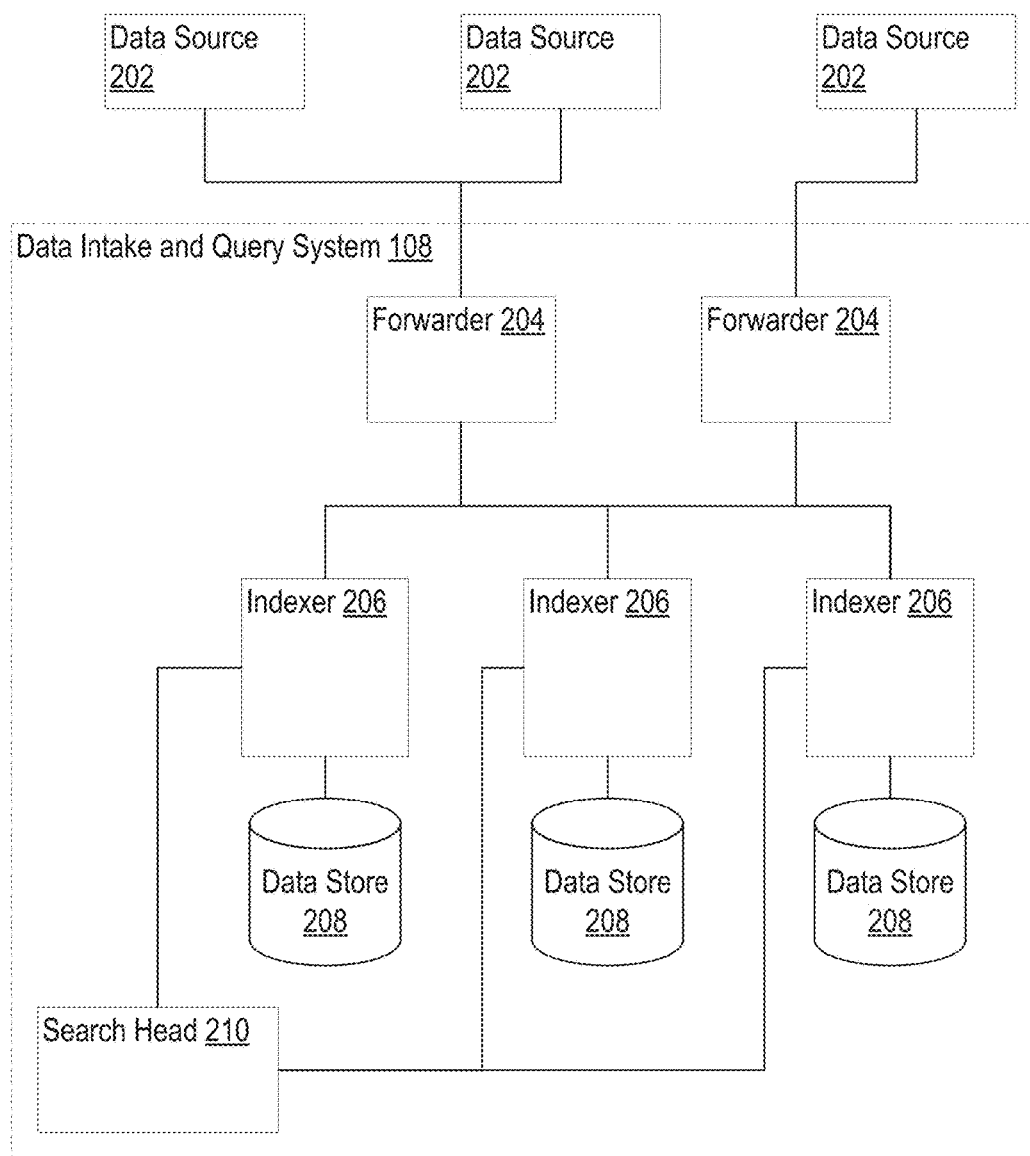
FIG. 2B is a block diagram that illustrates an example data intake and query system.

FIG. 2B depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

Figure 2C:
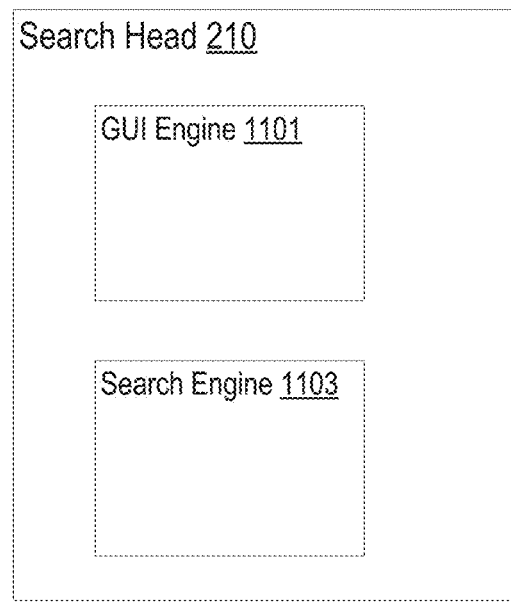
FIG. 2C is a block diagram illustrating an example of the functional elements of a search head of the data intake and query system such as described with respect to FIG. 2B.

FIG. 2C is a block diagram showing functional elements of the search head 210 of the data intake and query system 108, according to some embodiments. As shown, the search head 210 includes a GUI engine 1101 and a search engine 1104. The GUI engine 1101 can include or cooperate with a browser and is responsible for generating various GUI input and output features (e.g., as menus, user input fields, data listings (e.g., display of search results), graphical displays and other images, basic instructions for the user, etc.), such as those shown in FIGS. 5A-5B. The search engine 1103 receives queries input by a user via the search GUI, executes the queries against data previously processed by the data intake and query system 108, and returns the results to the GUI engine 1101, for output to the user.

Data Ingestion

Figure 3:
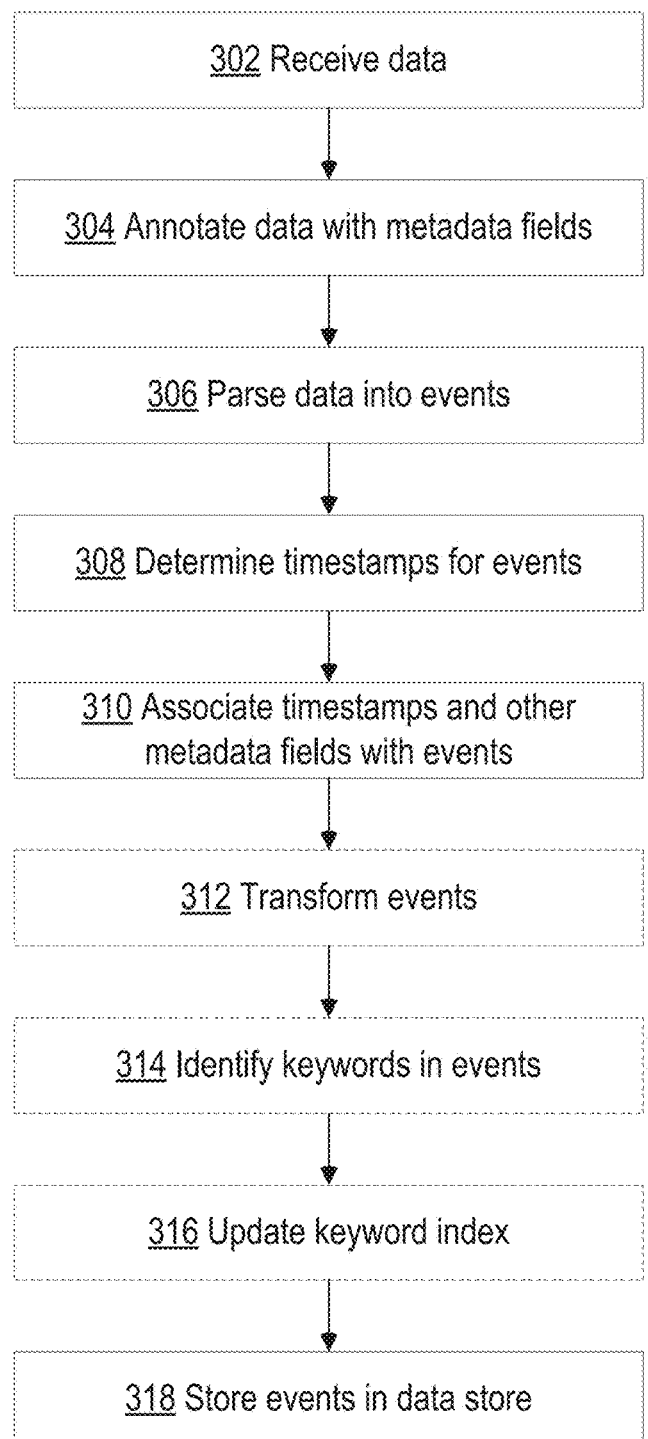
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. The forwarder can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. The forwarder can also index data locally while forwarding the data to another indexer.

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query. Moreover, events and buckets can also be replicated across different indexers and data stores to facilitate high availability and disaster recovery.

Query Processing

Figure 4:
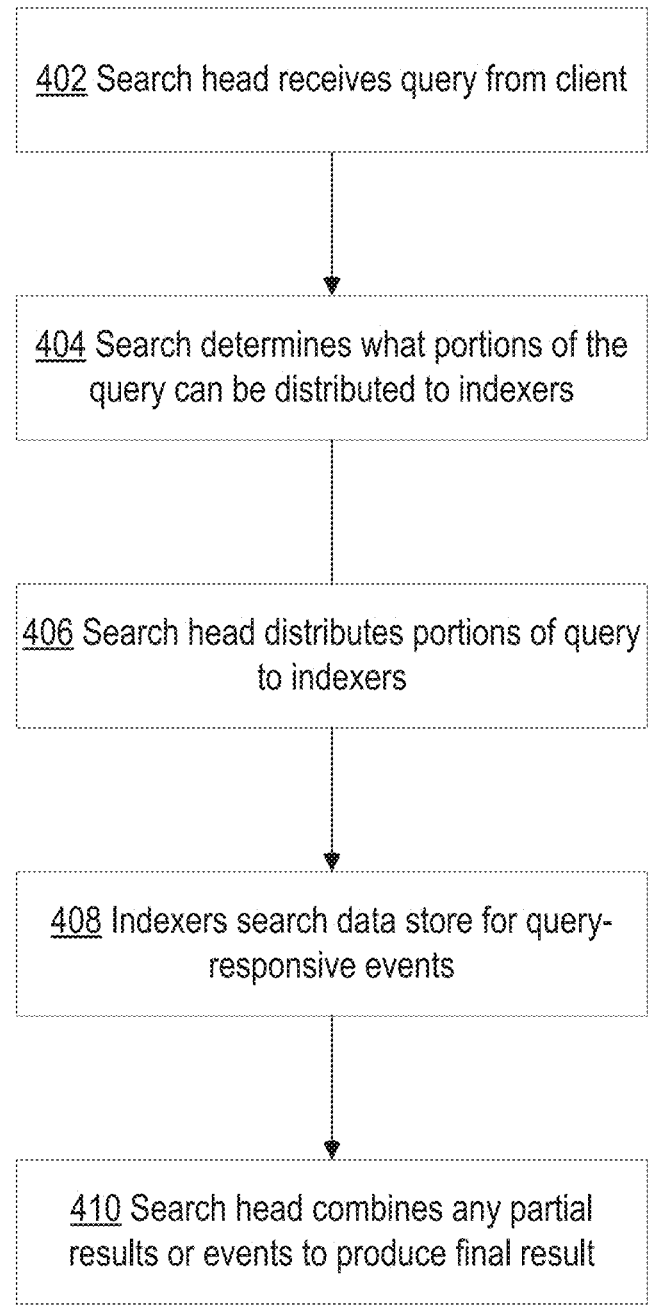
FIG. 4 is a flow diagram that illustrates an example of how a search head and indexers perform a search query.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

Field Extraction

The search head 210 can allow users to search and visualize event data extracted from raw machine data received from homogenous data sources. The search head 210 also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language (PSL) in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Query Interface

Figure 5A:
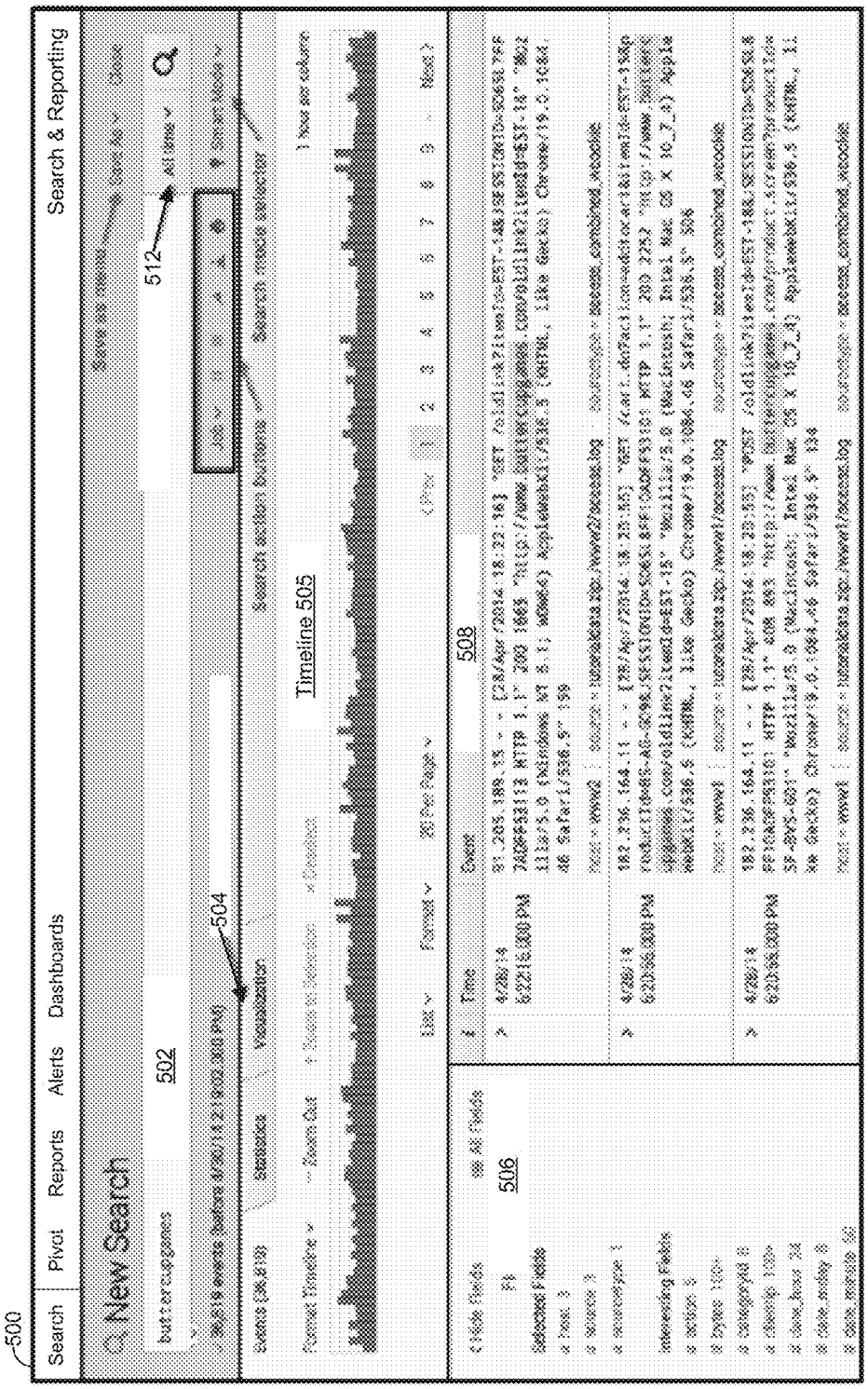
FIG. 5A illustrates an example of a search screen of a search graphical user interface (GUI)

FIG. 5A shows an example of a search screen 500 that may be generated by the search head 210 (e.g. by GUI Engine 1101) of data intake and query system 108. Search screen 500 includes a search bar 502 that accepts a user-input search query in the form of a search string (e.g., the string "buttercupgames" in the example of FIG. 5A). The search string can be in the form of a PSL query, although it is not shown as such in FIG. 5A.

Figure 5B:
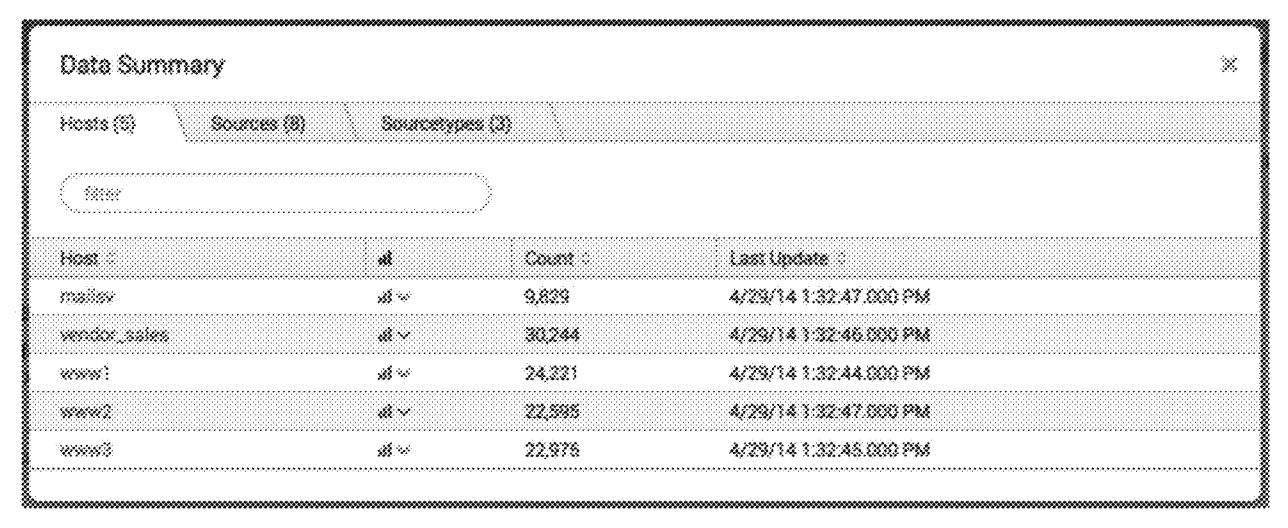

Search screen 500 also includes a time range picker 512 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 500 can also initially display a "data summary" dialog as is illustrated in FIG. 5B that enables the user to select from among different data sources for the event data, such as by selecting specific hosts and log files. In other cases, the data source may be selected via a command that is part of the search query itself, as described below.

After a search is executed, the search screen 500 in FIG. 5A can display the results through search results tabs 504, wherein search results tabs 504 includes: an "events tab" that displays various information about events returned by the search; a "statistics tab" that displays statistics about the search results; and a "visualization tab" that displays various visualizations of the search results. The events tab illustrated in FIG. 5A displays a timeline graph 505 that graphically illustrates the number of events that occurred in one-hour intervals over the selected time range. The search screen 500 displays an events list 508 that enables a user to view the raw data in each of the returned events. The search screen 500 additionally displays a fields sidebar 506 that includes statistics about occurrences of specific fields in the returned events, including "selected fields" that are pre-selected by the user, and "interesting fields" that are automatically selected by the system based on pre-specified criteria.

Visualization Framework

Figure 6:
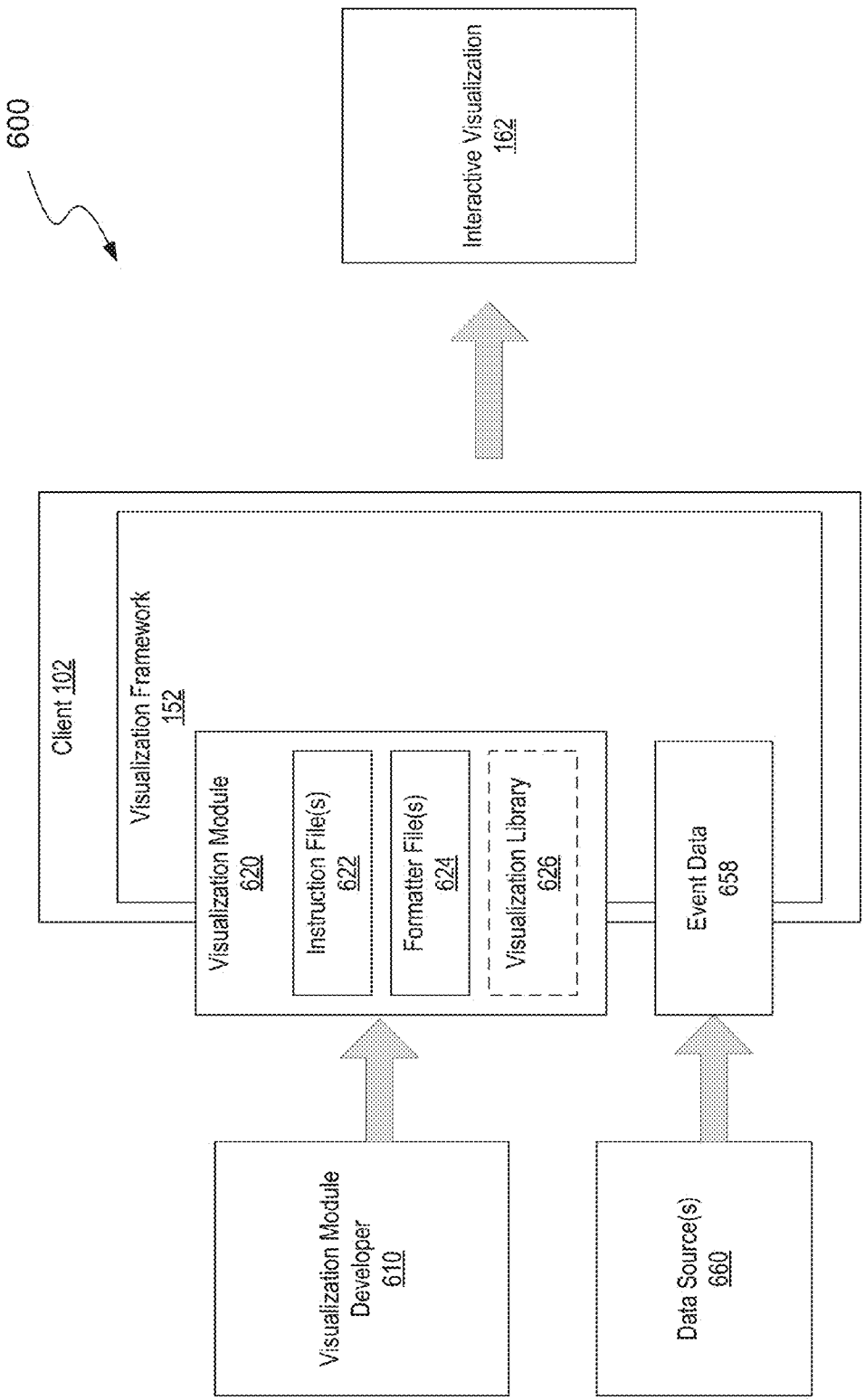
FIG. 6 is an architecture flow diagram that illustrates at a high level the processing of data to produce interactive visualizations using a visualization framework.

FIG. 6 is an architecture flow diagram 600 that illustrates at a high level the operation of the previously described visualization framework 152. The architecture flow diagram 600 of FIG. 6 is similar to that of flow diagram 100 shown in FIG. 1, but provides additional details on, for example, the components of a visualization module 620 may be organized, according to some embodiments. As shown in FIG. 6, visualization framework 152 may include hardware and/or software modules instantiated at a client device 102. A person having ordinary skill will appreciate that the architecture flow diagram 600 shown in FIG. 6 is an example provided for illustrative purposes. In other embodiments, visualization framework 152 may include software and/or hardware modules instantiated at one or more physical devices across the a computer system such as system 100 described with respect to FIG. 2A. For example, in some embodiments, components making up the visualization framework 152 may be instantiated at a one or more host devices 106 or at a search head 210 of a data intake and query system 108.

Returning to FIG. 6, in some embodiments, and as previously described, a visualization developer 610 (e.g. a third-party developer not affiliated with or operating data intake and query system 108) may create a visualization module 620 for use within a visualization framework 152. As shown in FIG. 6, visualization module 620 includes instruction file(s) 622, formatter file(s) 624 and optionally, the static visualization library 626 used to render the visualization. Instruction file(s) 622 include instructions to format event data 658 for use with the static visualization library 626 and instructions to render the formatted event data 658 using the static visualization library 626. The formatter file(s) 624 include information on options available to a user to modify (i.e. interact with) the resulting rendered visualization 162, but do not necessarily include the logic for providing such options. For illustrative purposes, the aforementioned options to modify an interactive visualization are described as being defined in a "formatter file," according to an embodiment, however this is not to be construed as limiting. For example, in some embodiments the options can be defined within an alternative data structure such as a database instead of a file. Accordingly, the "formatter file" can be more broadly understood as any data including a "formatter schema" or "formatter definition" that includes the defined options to modify an interactive visualization. In some embodiments, visualization module 620 is an application, for example similar to the client applications 110 or host applications 114 described with respect to FIG. 2A. In some embodiments, visualization module 620 is not independently executable but instead operates as an extension or plugin to other applications such as a web browser or the client applications 110 or host applications 114 described with respect to FIG. 2A. Visualization module 620 is described in more detail below.

Also as shown in FIG. 6, event data 658 (e.g. machine-generated event data) may be received from one or more data sources 660 and visualized using visualization framework 152 along with a visualization module 620 to generate and display an interactive visualization 162. Here, data source(s) 660 may refer to the one or more data sources 202 described with respect to FIG. 2B or to the search head 210 of data intake and query system 108 described with respect to FIG. 2B. For example, in an embodiment, in response to receiving a user search query in the form of a PSL query via the search bar 502 of example search screen 500 shown in FIG. 5A, the search head 210 of a data intake and query system 108 may return a set of final results in the form of event data 658. The interactive visualization 162 may accordingly be made available (i.e. displayed) to a user in response to the user selecting the visualization tab 504 in search screen 500. As previously mentioned, with respect to FIG. 5A, search screen 500 may be generated by the search head 210 (e.g. by GUI Engine 1101) of data intake and query system 108. In an embodiment where the visualization framework 152 is instantiated as part of one or more client applications 110 at client device 102 (e.g. as shown in FIG. 6), the resulting interactive visualization 162 may be separately generated at the client device 102 and integrated in into the search screen 500 as a window or frame within the interface.

Figure 7A:
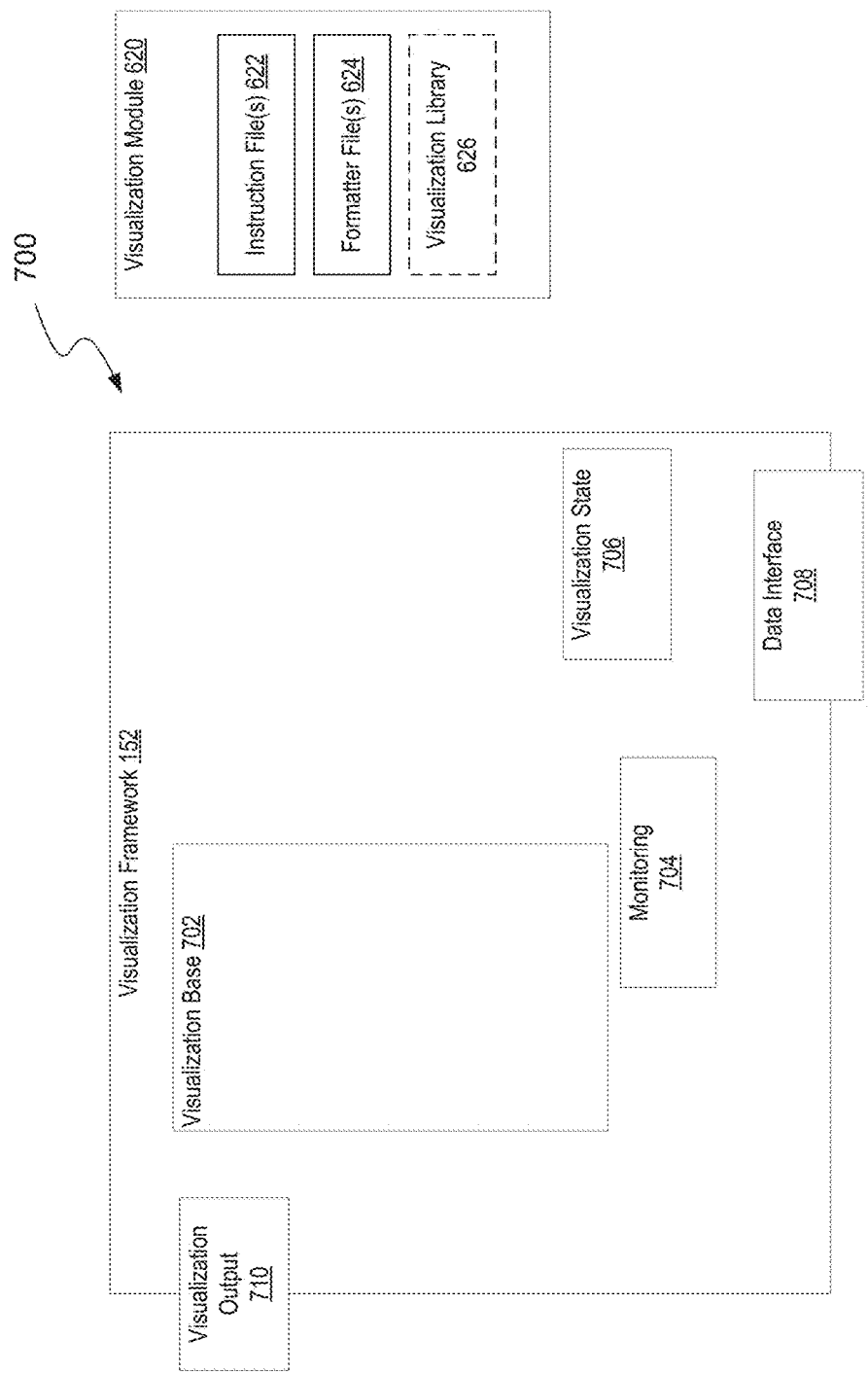
FIG. 7A is block diagram illustrating the functional components of a visualization module and visualization framework.
Figure 7B:
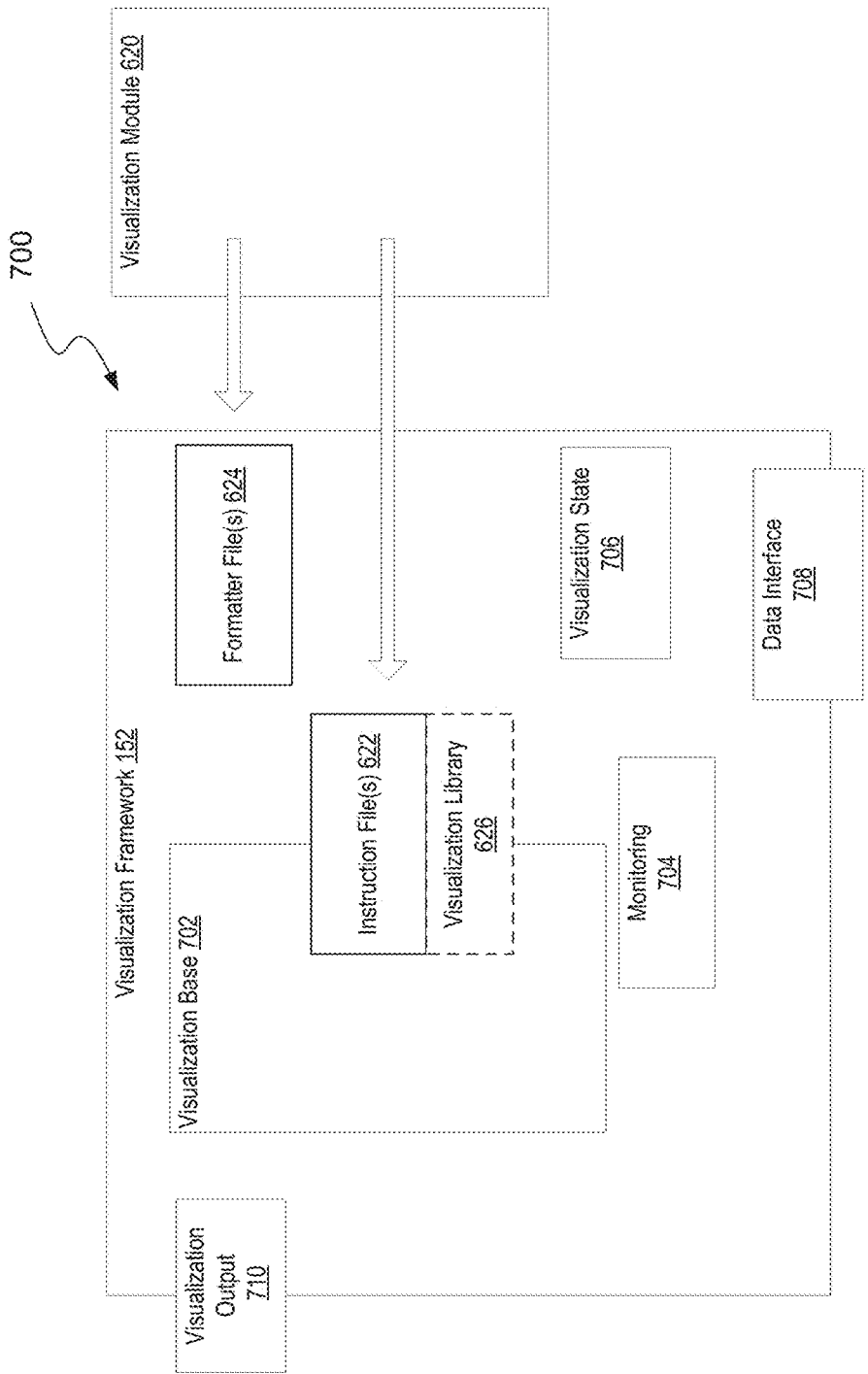
FIG. 7B is a block diagram illustrating the integration of a visualization module within a visualization framework.

FIGS. 7A-7B are architectural diagrams illustrating integration of a visualization module 620 within the visualization framework 152, according to some embodiments. As shown in FIG. 7A, visualization framework 152 includes a visualization based 702, a monitoring component 704 (e.g. similar to monitoring component 112 described with respect to FIG. 2A) a visualization state component 706, a data interface 708, and a visualization output interface 710. Data interfaces 708 and 710 conceptually represent points of entry and exit of data from the processing within framework 152 to other components of systems 100 and/or 108, but do not necessarily represent physical ports. The visualization state component 706 is a data representation of the current state of a displayed interactive visualization 162. As will be described in more detail later, the visualization state component 706 continually updates in response to user inputs modifying a displayed interactive visualization. In the context of the described framework 152, a visualization state component 706 also allows for persistence of a particular interactive visualization across multiple devices without transferring the rendered visualization itself. For example, a user at a first client device 102 may "save" an interactive visualization to a remote server (e.g. host device 106) by copying visualization state component 702 to the remote server. By accessing the copy of visualization state component 702 via another device, a user may access a previously displayed interactive visualization in its most recent state (i.e. incorporating any previously selected options to modify) at that other device without saving the rendered image of the interactive visualization.

Visualization module 620 is shown in FIG. 7A apart from the visualization framework 152. In some embodiments, visualization module 620 is downloaded from a remote server computer (e.g. from a host device 106) to a client computer system (e.g. client device 102). According to some embodiments, when loading a particular visualization module 620, components such as instruction file(s) 622, formatter file 624 and visualization library 626 are extracted and instantiated as part of the visualization framework 152 at the client 102, as shown in FIG. 7A. Note, that the architecture diagram 700, including the extraction of components 622, 624, 626 of visualization module 620, is shown as an example for illustrative purposes. A visualization framework similar to framework 152 may have more or fewer components and may combine or separate components differently than as shown in than as shown in FIGS. 7A-7B.

Visualization Base

In an embodiment, visualization base 702 operates to carry out the processes described herein. For example, visualization base 702 controls the ingestion of event data 658 (e.g. retrieved from data intake and query system 108) via data interface 708. Visualization base 702 also handles the timing and calling of functions provided in instruction files 622 to produce the interactive visualizations that are output via visualization output 710. For example, in an embodiment, as raw event data is received via data interface 708, visualization base 702 can call functions included in the instruction file(s) 622 to, for example, format the raw event data into a data object that is useable with the static visualization library 626 for rendering. Further, in response to detecting a change in the state of an interactive visualization 162 (e.g. caused by a user input selecting an option to modify the visualization), visualization base 702 can initiate a new search for event data 658, call the format function included in the instruction file(s) 622 to reformat the data, and/or call a render function included in the instruction file(s) 622 to update the displayed view of the interactive visualization 162.

In an embodiment, visualization base 702 can be instantiated, using an object-oriented programming language, as a superclass for visualizations created by visualization module developers. This superclass provides convenience for the visualization module developers as well as an entry point and communication channel for a data processing system (e.g. system 100 and/or 108) to interface with a visualization module 622. Classes inheriting from visualization base 702 can be registered in a component registry of system 100 and/or 108, allowing such as system to listen for changes made to visualization module 622, push updates to the visualization module 622 and provide search data, if necessary.

Visualization Modules

As previously mentioned, in some embodiments, visualization module 620 includes instruction file(s) 622. For example, in some embodiments, the instruction file(s) 620 are implemented as one or more Javascript files. The instruction file(s) 620 can include the encoded logic for formatting received event data for use with a static visualization library 626 and rendering the formatted event data using the static visualization library 626. In an embodiment, the instruction file(s) 620 extend the superclass of visualization base 702.

As mentioned, the instruction file(s) 620 can include the encoded logic for formatting received event data for use with a static visualization library 626. Such formatting may in certain situations be necessary because different visualization types require search results in specific formats or data structures. For example, many charting visualizations require search results to be structured as tables with at least two columns, where the first column provides x-axis values and subsequent columns provide y-axis values for each series represented in the chart. As another example, bubble charts visualize data in three dimensions using bubble positioning (in two dimensions) and bubble size. Consider an example of using a bubble chart to visualize earthquake events by a location. In such an example, event data 658 (e.g. from earthquake monitoring stations) can be formatted into three data series representing, for example, the magnitude, depth, and count for earthquakes at each earthquake location. As another example, scatter charts visualize data as scattered markers that include multiple y-axis values for each x-axis value. Such a visualization may require data to be formatted into a table with three columns, the first column including a series name and the next two columns containing the values to be plotted on the x- and y-axes, respectively, for that particular series.

Figure 8:
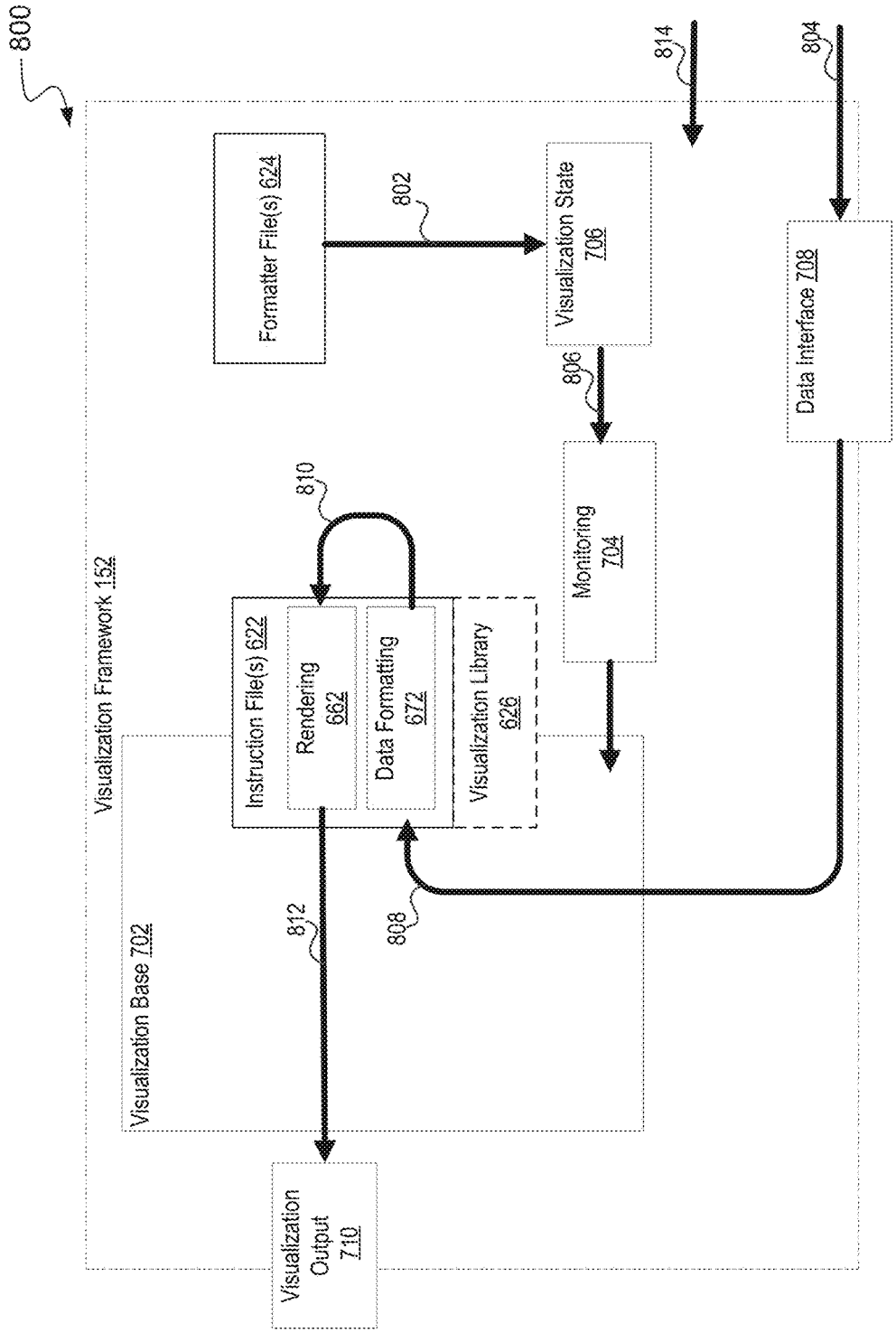
FIG. 8 is an architecture flow diagram illustrating an example process for displaying an interactive visualization of machine-generated event data using a visualization framework.

Accordingly, in some embodiments, instruction file(s) 622 may include data formatting instructions 672 (as shown in FIG. 8) for formatting the received raw event data 658 into a data object that can be used with a particular visualization library 626 to render a visualization of a particular type (e.g. a bar chart). Alternatively, in some embodiments, the data formatting instructions 672 may include a function that can be called by visualization based 720 to initiate a new search and retrieval of event data 658 from data intake and query system 108 in the required format. For example a search using a "timechart" reporting command in SPL returns event data 658 in the form of a table with time values in a first column. Data in this format may, in some cases, be used to generate certain visualizations (e.g. column, line, and area charts) with time varying along an x-axis.

In some embodiments, instruction file(s) 622 may include rendering instructions 662 (as shown in FIG. 8) for rendering the formatted event data 658 with the static visualization library 626. Note, that static visualization library 626 is shown in FIGS. 7A-7B as separate from the instruction file(s) 622 for illustrative purposes. In some embodiments, the code for rendering data included in the static visualization library 626 may be part of, for example the rendering instructions 672 included in the instruction file(s) 622. In some embodiments, the rendering instructions 672 may include a function that can be called by visualization based 720 to update the displayed view of the interactive visualization 162 (e.g. in response to a user input selecting an option to modify the interactive visualization 162).

In some embodiments, visualization module 620 includes formatter file(s) 624. Formatter file(s) 624 define one or more options that may be presented to a user to modify a displayed interactive visualization 162. These options to modify are also referred to as controls. Note, that in some embodiments, the formatter files include only data that define the options, but do not otherwise include encoded logic for displaying the options or updating the interactive visualization 162 in response to user selections of certain options. For example, in some embodiments, formatter file(s) 624 may include one or more html files that define one or more options to modify. In such embodiments, the visualization framework 152 (e.g. specifically visualization base 720) can handle displaying the options in a format configured, for example, to integrate with the example search screen 500 shown in FIG. 5A. For example, in the case of a simple user-selectable button, the visualization framework 152 will include instructions on how to render and display the button to a user. The formatter file(s) 624 only define that a button exists, the states that it can exist in (e.g. on/off), and what the states affect (i.e. how the interactive visualization 162 changes in each state). Stated differently, for a given option to modify, the formatter files(s) 624 can define 1) a modifiable parameter of the interactive visualization, 2) available user-selectable values for the modifiable parameter, and 3) a default a value for the modifiable parameter. Consider a simple example of defining an option to display labels in a given interactive visualization 162. In such an example, the formatter files(s) 624 may define the modifiable parameter as "show labels?," with available user selectable values being "yes" and "no," and the default value being "yes."

As mentioned, in an embodiment, the formatter files(s) 624 define one or more options to modify the interactive visualization 162. However, the formatter file(s) 624 do not change in response to user inputs selecting certain options. Instead, as previously mentioned, the current state of a given interactive visualization, including the states of available user-selectable options are represented in the visualization state component 706. Upon loading a visualization module 620 for a particular visualization, the default values for the one or more defined modifiable parameters in the formatter file(s) 624 are loaded into the visualization state component 706. These default values in turn inform visualization base 702 how to initially display the interactive visualization 162.

A defined option may be displayed to a user in the interactive visualization in a number of different ways, however this is handled by the visualization framework 152, and in some embodiments, specifically visualization based 720.

Interactive Visualizations—Example Process

FIG. 8 shows a flow diagram 800 illustrating an example process for displaying an interactive visualization 162 of data, according to some embodiments. As just mentioned, upon loading a visualization module 620 for a particular visualization, the default values for the one or more defined modifiable parameters in the formatter file(s) 624 of visualization module 620 may are loaded at step 802 into the visualization state component 706.

At step 804, raw data (e.g. machine-generated event data) is received into the visualization framework 152 via a data interface 708. As previously mentioned, the received data may be based on a user-search query, for example, entered via search screen 500 shown in FIG. 5A and returned by data intake and query system 108 shown in FIG. 2B.

At steps 808 and 810, a computer system implementing the visualization framework 152 accesses visualization library 626 and processes the received event data with the visualization library 626 according to instruction included in the instruction file(s) 622 of the visualization module 620. The computer system then at step 812 outputs the rendering visualization via output interface 710 thereby causing to display to a user an interactive visualization 162. Here the steps of accessing the visualization library 626 and processing the received event data may include first include calling a function included with the data formatting instructions 672 to format the received event data using data for use with the visualization library 626 before calling a function included in the rendering instructions 662 to render the formatted data object by use of the visualization library 626.

While all the aforementioned steps are occurring, the monitoring component 704 may at step 806 be continually monitoring visualization state component 706 for requested changes (e.g. specified via a user input) to the visualization state. The current state of the interactive visualization can inform visualization base 702 how to render and output the interactive visualization 162 for display to the user.

As previously mentioned, the interactive visualization is dynamically modifiable in response to a user input. At step 814, such a user input is received at the visualization framework 152, and in some embodiments, modifies the visualization state component 706. Monitoring component 704, while listening to the visualization state component 706, detects this change and informs visualization base 702. In response, visualization base 702 may call a function included in the rendering instructions 662 of instruction file(s) 622 to update the display of the interactive visualization 162 based on the detected modification indicated by the user input. In some cases, in response to receiving at step 814 a user input, visualization base 702 may discard the current set of event data (e.g. the formatted data object) and initiate receipt of a secondary set of event data. For example, a user may simply enter a new search via the search screen 500 shown in FIG. 5A. In response, the computer system implementing the visualization framework receives a second set of event data and causes to display to the user (e.g. after repeating the aforementioned formatting and rendering processes) an updated version of the interactive visualization based on the second set of event data.

As another example, a user may select an option to "drill down" into a specific portion of the visualized data and/or drill down to view specific events upon which the visualization is based. The specifics of this process of drilling down are described in more detail below, however drilling down can use the same or similar underlying concept as described with respect to the simple button selection. For example, a user may select an option to drill down to a specific portion of a displayed interactive visualization 162 (e.g. a particular geographic region in a bubble chart). A user can select an option to drill down via different types of input mechanisms. For example, a user may, via an input device such as a mouse, place a cursor over a portion of a visualization and click or right-click to drill down. In some embodiments, a user may simply hover a cursor over a portion of a visualization to drill down. In response, the monitoring component 704 detects the change registered in the visualization state 706 and informs the visualization base 702. In response, visualization base can update the displayed interactive visualization 162 in a number of ways. In some embodiments, visualization base may edit the already rendered interactive visualization to focus on a particular portion selected by the user. In other embodiments, visualization base 702 edits or replaces the visualized data object before calling a function (e.g. included in the rendering instructions 662 of instruction file(s) 622) to update the rendering based on the edited or new data object. For example, in some embodiments, in response to detecting a user selection to drill down to a particular portion of the visualization or the underlying data, visualization base 702 may discard the current set of event data (e.g. the formatted data object) and initiate receipt of a secondary set of event data that includes only the data pertaining to the user-selected portion of the visualization. Here, initiating receipt of the secondary set of data may include initiating a secondary search query (e.g. in SPL) to the search head 210 of the data intake and query system 108 to retrieve the secondary set of event data including only data pertaining to the user-selected portion of the visualization.

Interactive Visualizations—Displayed Options

FIGS. 9A-9E show a series of example user interface displays providing options to modify an interactive visualization that may be displayed, for example, in a visualizations tab of a search screen 500, according to some embodiments. As mentioned previously, a developer-generated formatter file 624 (e.g. an html file) may define the options to modify, however the code to display one to the interface examples shown in FIGS. 9A-9E, register user inputs via the interface examples, and initiate an update to the interactive visualization 162 may reside within the visualization framework 152 (e.g. visualization base 702). FIG. 9A shows an example option in the form of a drop down menu. In the example shown in FIG. 9A, a user is prompted to select form the drop down menu an overlay to apply to a particular visualization. FIG. 9B shows an example option in the form of selectable buttons. In the example shown in FIG. 9B, a user is presented with yes/no buttons for a couple of options (e.g. "show row numbers) and categorical buttons for selecting how to drill down (e.g. by row, cell, or no drill down). FIG. 9C shows an example option in the form of a drop down menu prompting a user to select a level of precision for displayed values in a particular interactive visualization. FIG. 9D shows an example option in the form of an editable text field prompting a user to enter a caption to be displayed in a particular visualization. FIG. 9E shows an example option in the form of drop down menu prompting a user to select a categorical color to be applied in a particular interactive visualization. For example, as shown in FIG. 9E, a user may select visual objects based on negative values to be displayed in red. FIG. 9F shows an example option in the form of a menu through which a user can select groupings of other options to display. For example, as shown in FIG. 9F, a user may select a set of options to display that pertain particularly to the "y-axis" in the interactive visualization.

Interactive Visualizations—Drill Down

As previously discussed, in some embodiments, users have the option to drill down into a displayed interactive visualization 162. In other words, in response to receiving a user selection of a particular portion of a displayed interactive visualization, the computer system implementing the visualization framework 152 can cause display to the user, of data of a particular event upon which the particular portion of the displayed interactive visualization is based, and/or an updated visualization that focuses on the selected particular portion of the displayed interactive visualization. Drill downs allow users to access additional details about a displayed interactive visualization.

Figures 10A, 10B:
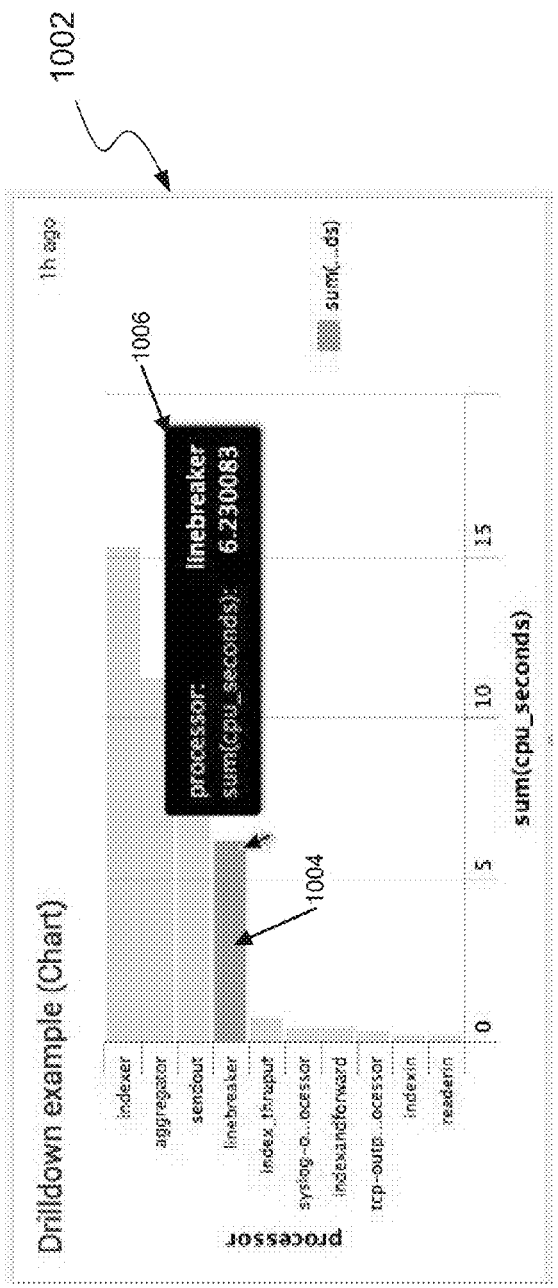
FIG. 10A shows an example display of an interactive visualization illustrating a first drill down behavior.
FIG. 10B shows an example display of an interactive visualization illustrating a second drill down behavior.

FIG. 10A shows an example display of an interactive visualization in the form of a bar chart 1002 that illustrates certain drill down behavior, according to some embodiments. As shown in FIG. 10A, in response to a user selection of (e.g., by clicking on) one of the horizontal bars 1004 in the bar chart 1002, the display of the bar chart 1002 is modified to highlight the selected bar 1004 (e.g. through changing its color and/or fading the non-selected bars). The display of the bar chart can be further modified to include an overlay 1006 including data pertaining to the selected bar 1004. For example, as shown in FIG. 10A, the selected bar 1004 pertains to processing the sum of processing times for a particular processor called "linebreaker." Here the particular value forming the bar, a summation of the processing times in seconds, is displayed to the user in the overlay 1006. In the given example, the displayed bar chart 1002 may be accessible to a user via the visualizations tab of search screen 500 after enter the following search in SPL: index="_internal" source="*metrics.log" group="pipeline"|chart sum(cpu_seconds) over processor-|sort 10−sum(cpu_seconds). As previously discussed, a user selection of an option to drill down may initiate a secondary search. Here, a selection of the bar 1004 based on the "linebreaker" processor may cause the visualization framework to initiate the following search in SPL: index="_internal" source="*metrics.log" group="pipeline" processor=linebreaker.

In some cases, a user may wish to drill down to the underlying event data upon which the visualization or a particular portion of the visualization is based. According to some embodiments, events can be visualized as any of a list of events, a table, or a display of the raw event data. FIG. 10B shows an example visualization in the form of a list 1020 of events that may be displayed to a user in response to a selection of an option to drill down. In some embodiments, each row in the list may include the raw event data. Alternatively, in some embodiments, the raw event data can be formatted to be more easily readable by a human user. For example, as shown in FIG. 10, each event includes a column entry showing the time as well as highlighted information such as "host," "source," and "source type."

The visualization framework 152 can include default drill down options that are available to a user regardless of the options defined in formatter file 624 of a developer created visualization module 620. For example, providing a drill down option to display a list of events underlying a visualization based on a search may be provided as a default. In some embodiments, third-party developers can define customized drill down behavior, for example in the formatter file 624 of a visualization module 620. In an embodiment, customized drill down behavior uses event tokens to customize the values captured from a particular visualization. For example for a geographic map visualization, event tokens can specify a field and value from a map marker as well as latitude and longitude values.

Dashboards

In general pages displayed via a client application (e.g. client application 110 in FIG. 2A) can be described as views. For example, a search timeline page in a search and reporting application can be included as a default view. Dashboards can be implemented in client applications as a type of view. In some embodiments, a dashboard includes one or more panels, each of which can include a display of a particular visualization (e.g. chart, table, events lists, maps, etc.). Each panel in a dashboard can include a visualization of a set of data based on the results of a base search. For example, each panel in a dashboard may include an interactive visualization based on a different visualization module 620, perhaps developed by different third-party visualization developers. In addition to creating customized visualizations through generating visualization modules, software developers can also create customized dashboards for their applications.

Dashboards can be customized for various use cases. Consider an example business enterprise seeking to provide business intelligence to various members of the enterprise. A customized dashboard can be set up, for example, for the CEO of the enterprise to provide a high level snapshot of the current state of the business. The CEO's dashboard may contain multiple visualizations (each based on a different visualization module) that provide a high-level view of various data affecting the business (e.g. product sales volume, transaction expenses, etc.). Visualization framework 152 provides a seamless way to set up customized dashboards with multiple modular visualizations. If the CEO requests a new type of visualization (e.g. a Sankey diagram) for a particular set of data, the dashboard can be customized to include the visualization without any knowledge of the underlying architecture of the data processing system (i.e. visualization framework 152). With information provided through an SDK and or an API, a software developer (e.g. within the enterprise or hired by the enterprise) can generate a visualization module based on a static visualization library for Sankey diagrams (e.g. an open source library). Using the previously described techniques, this newly created visualization module can be implemented within a visualization framework 152. Further, the aforementioned CEO dashboard can be modified to include in one of its panels, a display of an interactive Sankey diagram visualization.

Generating Visualization Modules

Techniques related to the visualization framework 152 allow developers to generate custom visualizations that can be applied within any data processing system without requiring that the developer have specific knowledge of the underlying architecture of the data processing system. As previously discussed, developers can create a visualization module 620 based on a static visualization library 626 that can be implemented within a visualization framework 152 to produce rich visualizations of data (e.g. machine-generated event data) with various interactive features for end users. Since specific knowledge of the underlying architecture of a visualization framework 152 is not required, a software developer generating a visualization module 620 may be unaffiliated with the development of any of the underlying data processing systems (e.g. visualization framework 152 and/or data intake and query system 108). Independent developers such as these may be referred to as "third-party developers."

Figure 11:
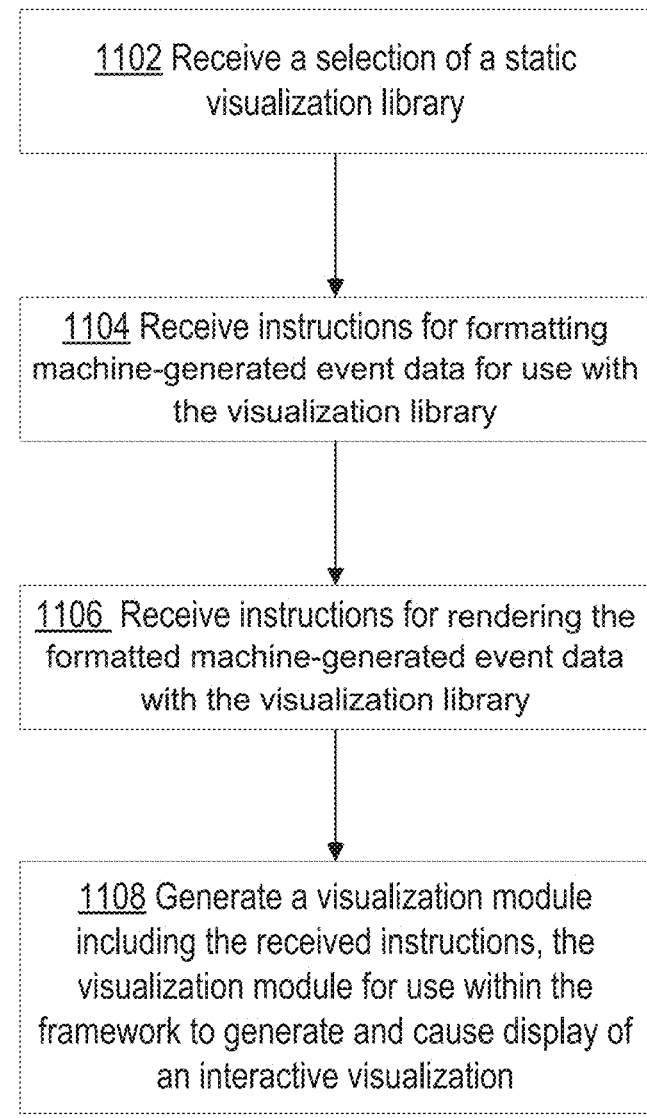
FIG. 11 is a flow diagram that illustrates an example process for generating a visualization module that can be used within a visualization framework to display interactive visualizations.

FIG. 11 is a flow diagram that illustrates an exemplary process that may be performed to generate a visualization module 620 that can be used within visualization framework 152 to display to users an interactive visualization. In some embodiments, the example process described with respect to FIG. 11 can be performed by a general computer system operated by a visualization developer to generate a visualization module 620. In some embodiments, the process may begin at step 1102 with receiving, by the computer system, a selection by the developer of a static visualization library 626 on which to base the visualization module 620 that is to be generated. Here, the static visualization module 626 selected by the developer may have been created by that same developer. In other words, the developer may have also written the code to render input data according to a certain visualization type (e.g. a bar chart). However, as previously discussed, in some embodiments, the visualization library 626 has been created by a another developer (i.e. a third party developer to the visualization module developer) and may be available via an open source license.

The example process continues at step 1104 with receiving instructions for formatting the data to be visualized (e.g. receive machine-generated even data) for use with a selected visualization library 626. Recall that different types of visualizations may require data to be input in a particular format. The instructions received at step 1104 may include a developer-defined data processing function that is configured to be called by the previously discussed visualization base 702 to correctly format received event data for use with a selected visualization library. Consider the simple example of a bar chart visualization. As previously described, in some embodiments, a bar chart visualization requires that data be structured in a table with at least two columns, where the first column provides x-axis values and subsequent columns provide y-axis values for each series represented in the chart. Therefore, if the visualization library 626 is for a bar chart visualization, step 702 may involve formatting received event data (e.g. received in response to a user query) into a data object configured as a table with at least two columns. In some embodiments, the instructions received at step 1104 are illustrated conceptually as data formatting instructions 672 in the instruction file(s) 622 shown at FIG. 8.

The example process continues at step 1106 with receiving instructions for rendering the formatted event data with the selected static visualization library 626. Again, in some embodiments, the instructions received at step 1106 may include developer-defined data processing function that is configured to be called by the previously discussed visualization base 702 to render a visualization using the static visualization library 626. The function may be called when by visualization base 702 determines that an updated view is necessary (e.g. in response to a user input to modify the view). In some embodiments, the instructions received at step 1106 are illustrated conceptually as rendering instructions 662 in the instruction file(s) 622 shown at FIG. 8.

Note that at least step 1102 may not be necessary in all embodiments. For example, in some embodiments, the instructions to render received at step 1106 may include the instructions to, for example, access and call certain functions from a selected visualization library 626. Further the described instruction steps 1104 and 1106 may, in some embodiments, comprise a single step or otherwise be performed in parallel.

The instructions received at steps 1104 and 1106 may be input by a developer of the visualization module 620 in a number of different ways. For example, in some embodiments, the developer may simply write the software code comprising the instructions. Here, the developer may have access to a software developer kit (SDK) or application programming interface (API) associated with the visualization framework 152 that provides information on how to tailor the instructions for use within the visualization framework 152. For example, as previously mentioned, when event data is received, visualization base 702 may call a function included in data formatting instructions 672 (e.g. called "format.data") to format the received data for use with the static visualization library 626. Accordingly, the developer can access an SDK or API associated with the visualization framework 152 to properly define the function so that it is usable within visualization framework 152. In some embodiments, an SDK may include template sets code for defining functions that a visualization developer may use to create instructions 662 and/or 672.

In some embodiments, a visualization developer may define the instructions 662 and/or 672 without independently generating much code. For example, in an embodiment, an SDK associated with visualization framework 152 may include a graphical developer interface through which a visualization developer may define instructions 662 and/or 672 without writing any software code, or at least with minimal writing of software code. For example, a graphical developer interface may include various interface functions (e.g. editable text fields, pull down menus, buttons, etc.) through which a developer can input information defining the characteristics of a function to be included in a set of instructions. Here, in the context of the process described with respect to FIG. 11, the received instructions may be in the form of information input via a graphical developer interface. In response to receiving inputs via the graphical user interface, the computer system may generate sets of instructions (e.g. instructions 662 and/or 672) that may be used within visualization framework 152.

At step 1108, in response to receiving the instructions at steps 1104 and 1106, a computer system generates a visualization module 620 configured for use within a visualization framework 152. The characteristics of visualization module 620 are described in greater detail above. Here, the process of generating the visualization module 620 may in some embodiments include packaging the received instructions into a file (e.g. an executable file) formatted to be recognizable by visualization framework 152. In some embodiments, the process of generating the visualization module may include any of incorporating the received instructions into a predefined visualization module template, incorporating the received instructions into a preexisting visualization module, or assembling the received instructions using a predefined file structure. In some embodiments, the generated file may simply include the packaged instructions. In some embodiments, the generated file may include additional instructions or information that may be necessary for proper operation of the visualization module 620 within the visualization framework 152. For example, in some embodiments, a generated visualization module 620 includes a file that upon loading of the module declares certain information (e.g. the name/type of visualization, description of the visualization, available functions, etc.) regarding the visualization to visualization base 702. Also, in some embodiments, the generated visualization module 620 can include a developer-generated formatter file that defines one or more user options to modify a resulting interactive visualization. The formatter file is described in more detail earlier in this disclosure. In some embodiments, the formatter file may be html-based.

Although not shown in FIG. 11, in some embodiments, the example process can continue with uploading (or otherwise transferring) the visualization module 620 to a server computer system (e.g. host 106) operating as part of or in conjunction with a system for indexing and searching machine-generated event data (e.g. data intake and query system 108). Here, the uploaded visualization module 620 may be one of multiple visualization modules 620 available for download to client devices 102 and for use by end users of client devices 102. Each of the hosted visualization modules may be for one of a number of different types of visualizations (e.g. Sankey diagram, punchcard plot, horizon chart, timeline, treemap, Gantt chart, heat map, network diagram, etc.).

Sankey Graph Visualization

The data intake and query system can provide a user interface for searching events based on certain criteria and for visualizing the search results as a flow diagram based on event data included in the search results. The data can be real-time event data that are updated in real time. The search results are continually updated as new search results are identified or generated. The system can continually update the visualization based on the updated search results and the associated real-time event data.

The system can generate the flow diagram using a code library for generating visualization based on the continually updated event data, such as described above. The system can further update the flow diagram dynamically using the code library for generating visualization. In some embodiments, the code library is an open source library.

The flow diagram can be, e.g., an alluvial diagram, a control flow diagram, a data or information flow diagram, a state diagram, or a Sankey diagram, etc. For example, the flow diagram can be a Sankey diagram including various nodes interconnected by one or more flows. Each node represents a state before and/or after certain events. Each flow represents one or more events that are indicative of relationships between the nodes. The width or other attribute of an individual flow can be indicative of the number of events represented by the flow. Thus, a Sankey diagram puts a visual emphasis on the major flows that have wider widths. In some alternative embodiments, the width or other attribute of the individual flow can be indicative of a result of a statistical aggregation from a field across the events represented by the flow.

Figure 12:
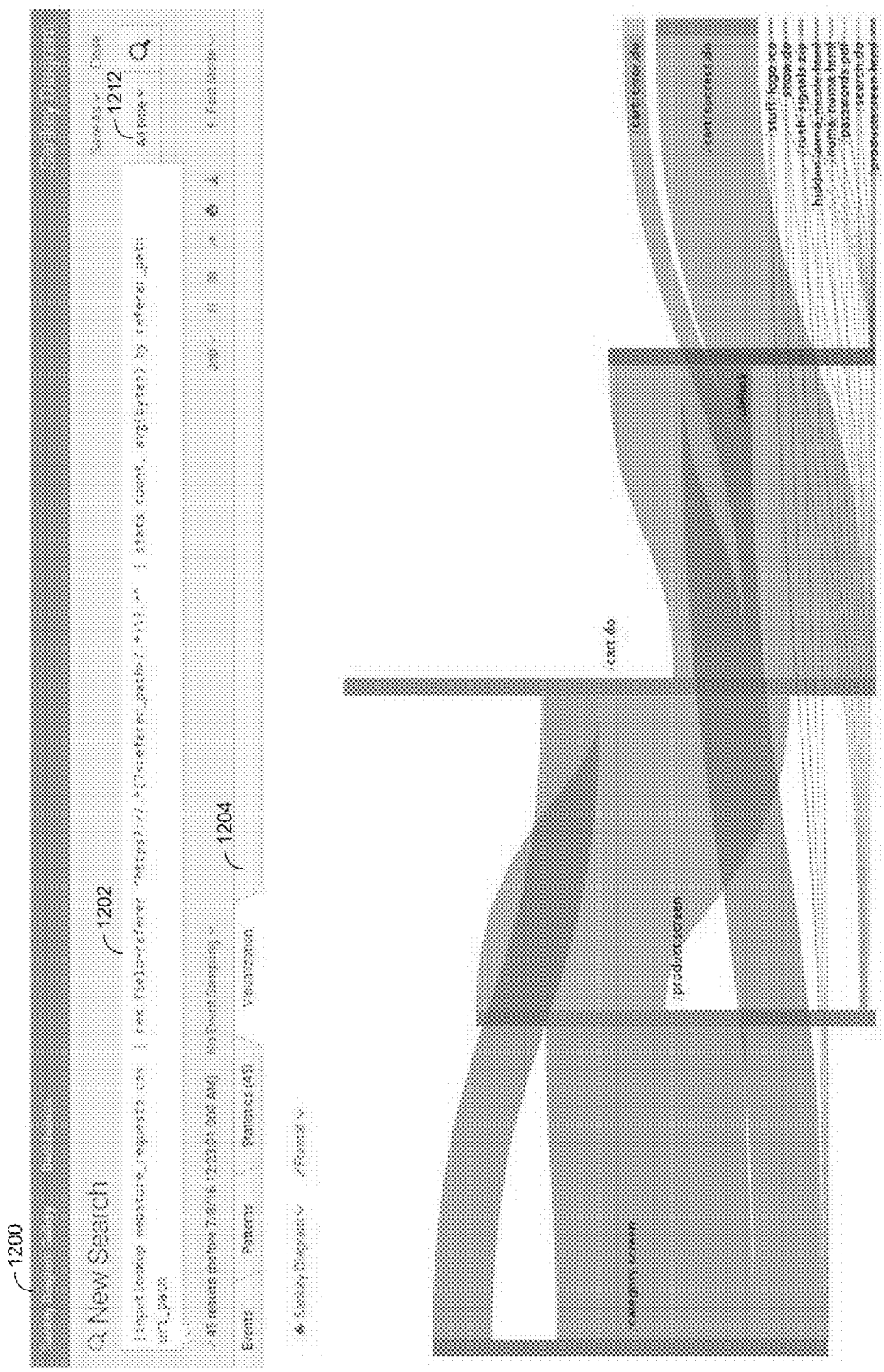
FIG. 12 illustrates an example of a search screen of a search GUI for a flow diagram.

FIG. 12 illustrates an example of a search screen of a search GUI for a flow diagram. The search screen 1200 can be generated by, e.g., the search head of the data intake and query system as illustrated in FIG. 2C. The search screen 1200 includes a search bar 1202 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Figure 13:
FIG. 13 illustrates choices of time ranges for the search.

Search screen 1200 also includes a time range picker 1212 that enables the user to specify a time range for the search. FIG. 13 illustrates choices of time ranges for the search. For example, for "historical searches" the user can select a specific time range, or alternatively a relative time range, such as "today," "yesterday" or "last week." For "real-time searches," the user can select the size of a preceding time window to search for real-time events.

Referring back to FIG. 12, after a search is executed, the search screen 1200 displays the results through search results section 1204, wherein search results section 1204 includes: an "events tab" that displays various information about events returned by the search; a "statistics tab" that displays statistics about the search results; and a "visualization tab" that displays various visualizations of the search results.

Figure 14:
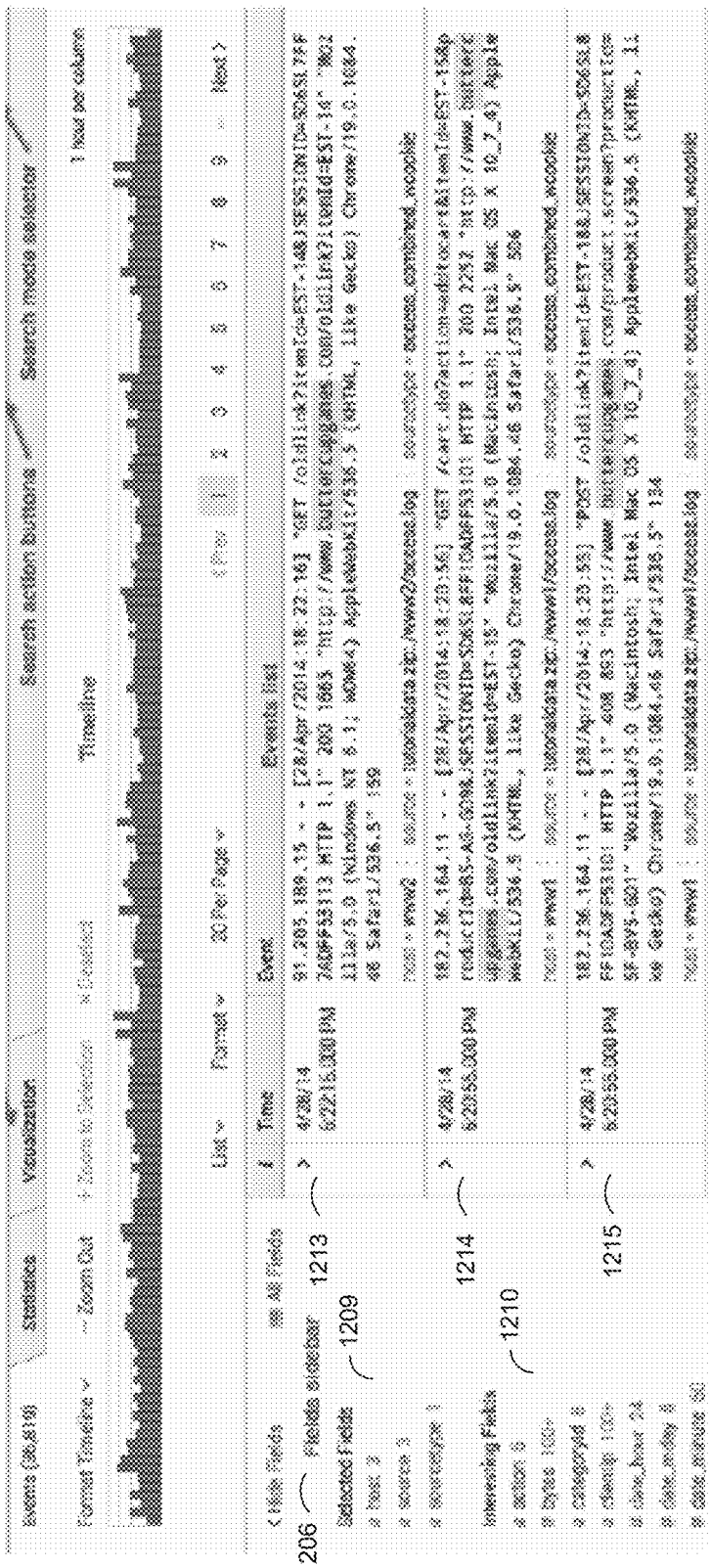
FIG. 14 illustrates an example of an events tab populated with search results data.

FIG. 14 illustrates an example of an events tab populated with search results data. The events tab illustrated in FIG. 14 displays a timeline graph 1205 that graphically illustrates the number of events that occurred in one-hour intervals over the selected time range, where each vertical bar corresponds to a separate one-hour interval. The events tab also displays an events list 1208 that enables a user to view the raw data in each of the returned events (e.g., events 1213-1215 as illustrated in FIG. 14). Additionally, the events tab displays a fields sidebar 1206 that includes statistics about occurrences of specific fields in the returned events, including "selected fields" 1209 that have been pre-selected by the user, and "interesting fields" 1210 that are automatically selected by the system based on pre-specified criteria.

Figure 15:
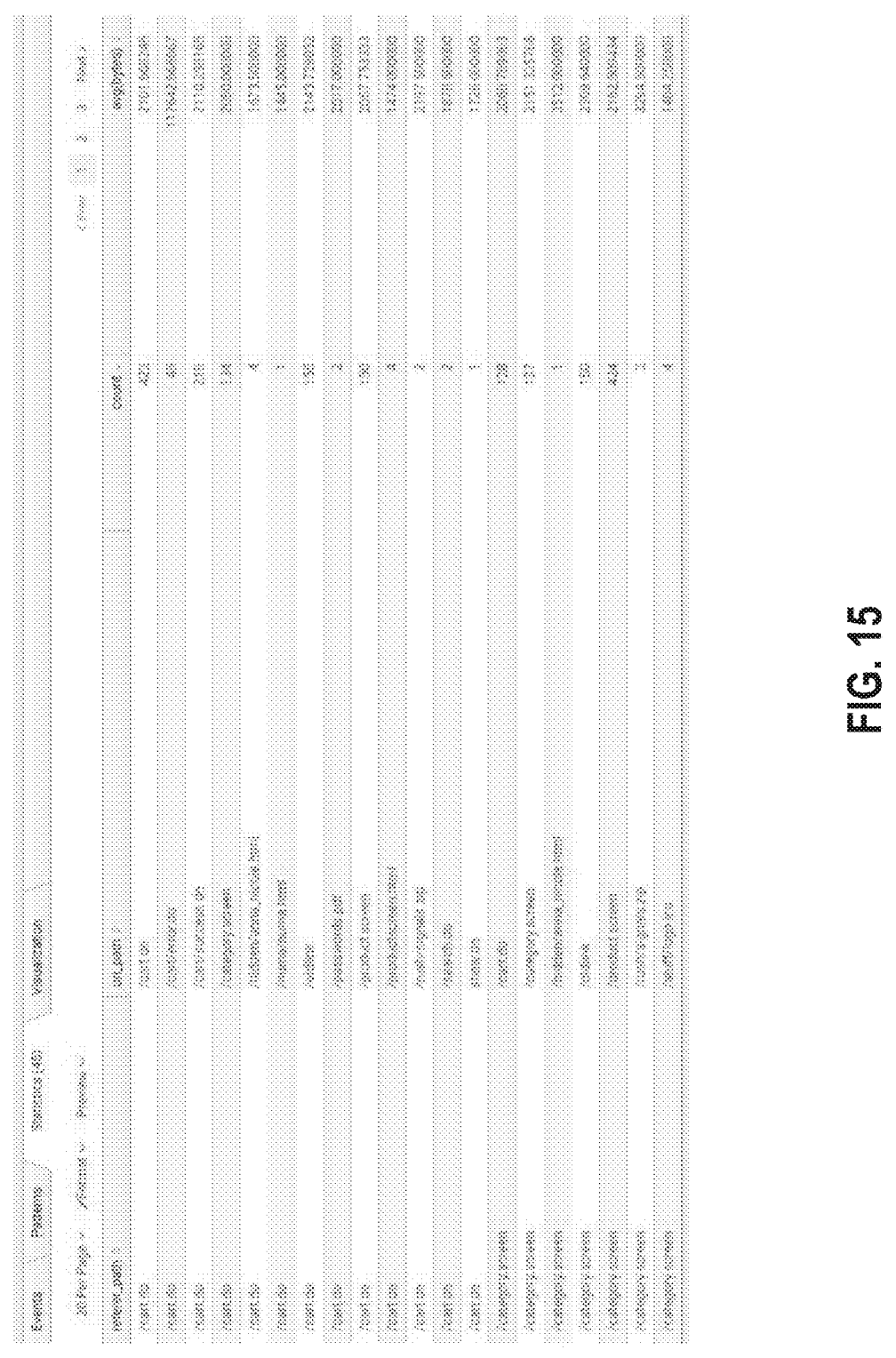

FIG. 15 illustrates an example of a statistics tab for a flow diagram. The statistics tab illustrated in FIG. 15 shows relevant statistics regarding the results of the search query, such as timestamps, amounts of data transmitted for events (in terms of, e.g., bytes), network resource identifiers (e.g., uniform resource identifiers or URIs), etc.

Figure 16:
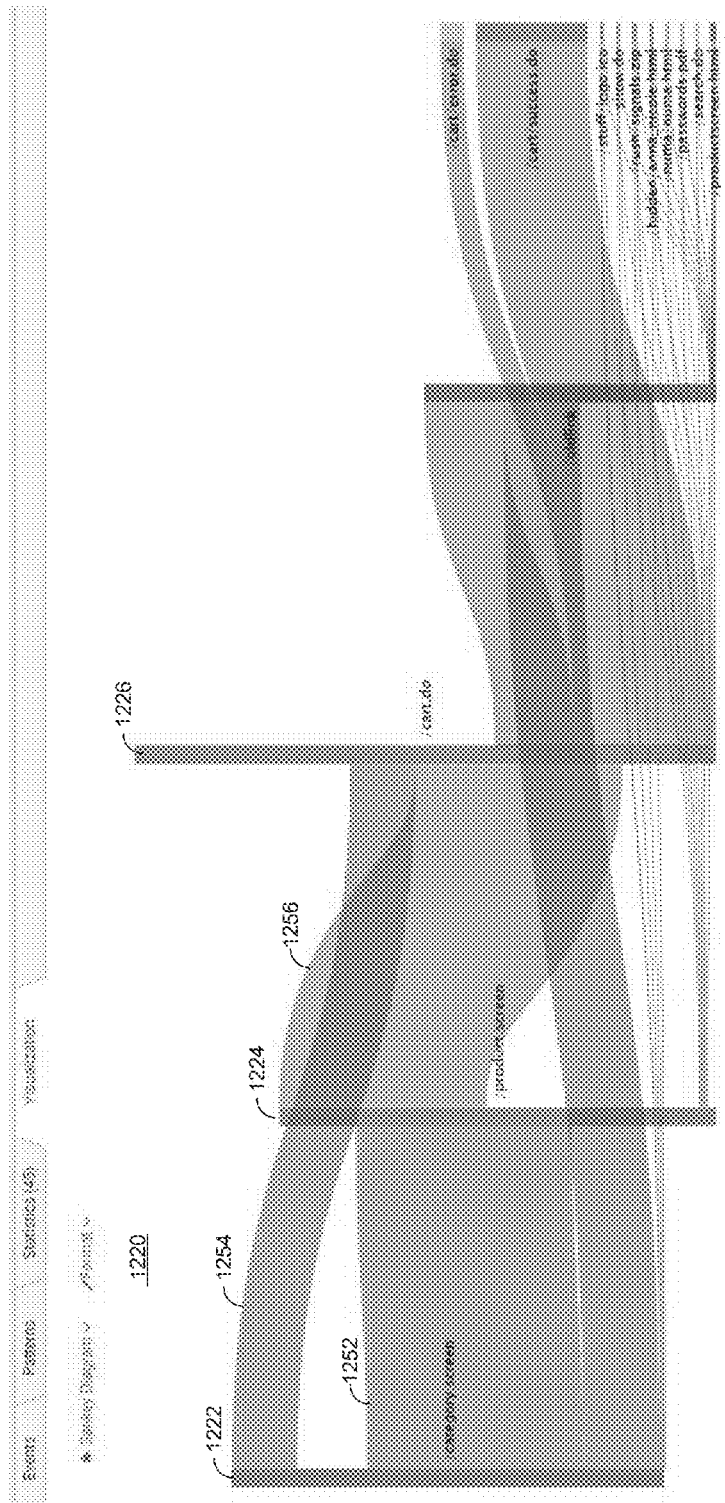
FIG. 16 illustrates an example of a visualization tab for a flow diagram.

FIG. 16 illustrates an example of a visualization tab for a flow diagram. The visualization tab illustrated in FIG. 16 displays a flow diagram 1220 visualizing the search results. The flow diagram 1220 can be, e.g., an alluvial diagram, a control flow diagram, a data or information flow diagram, a state diagram, or a Sankey diagram, etc. The flow diagram 1220 include multiple nodes (such as nodes 1222, 1224, 1226, etc.), which in the illustrated example are represented by vertical bars. The nodes represent states before or after certain events. For example, the nodes can represent network addresses where users currently browse. The flow diagram 1220 further include multiple flows (such as flows 1252, 1254, 1256, etc.), which are represented by curves between the nodes. Each flow interconnects two of the nodes. The events represented by the flows can be, e.g., information transfers, material transfers, energy transfers, money transfers, or human transfers. For example, a flow can represent a web browsing event by a user switching from one webpage to another webpage.

Each flow represents a collection of events (or a single event, in some embodiments) that have a particular relationship to the two nodes that form the flow's endpoints; while the nodes represent states before and after certain events. For example, flow 1252 can represent a group of events that have something in common. Before those events occur, the beginning state is represented by node 1222. After those events occur, the ending state is represented by node 1224. The size (also referred to as width) of a flow is indicative of a number of the events represented by the flow.

In some embodiments, the nodes in the flow diagram 1220 represent network addresses (e.g., uniform resource identifiers, or URIs). The flows represent network events in which a visitor switches from one network address to another network address. In other words, the size of a flow is indicative of the number of the events in which a visitor switched from one particular webpage (with a network address) to another webpage (with another network address).

Figure 17:
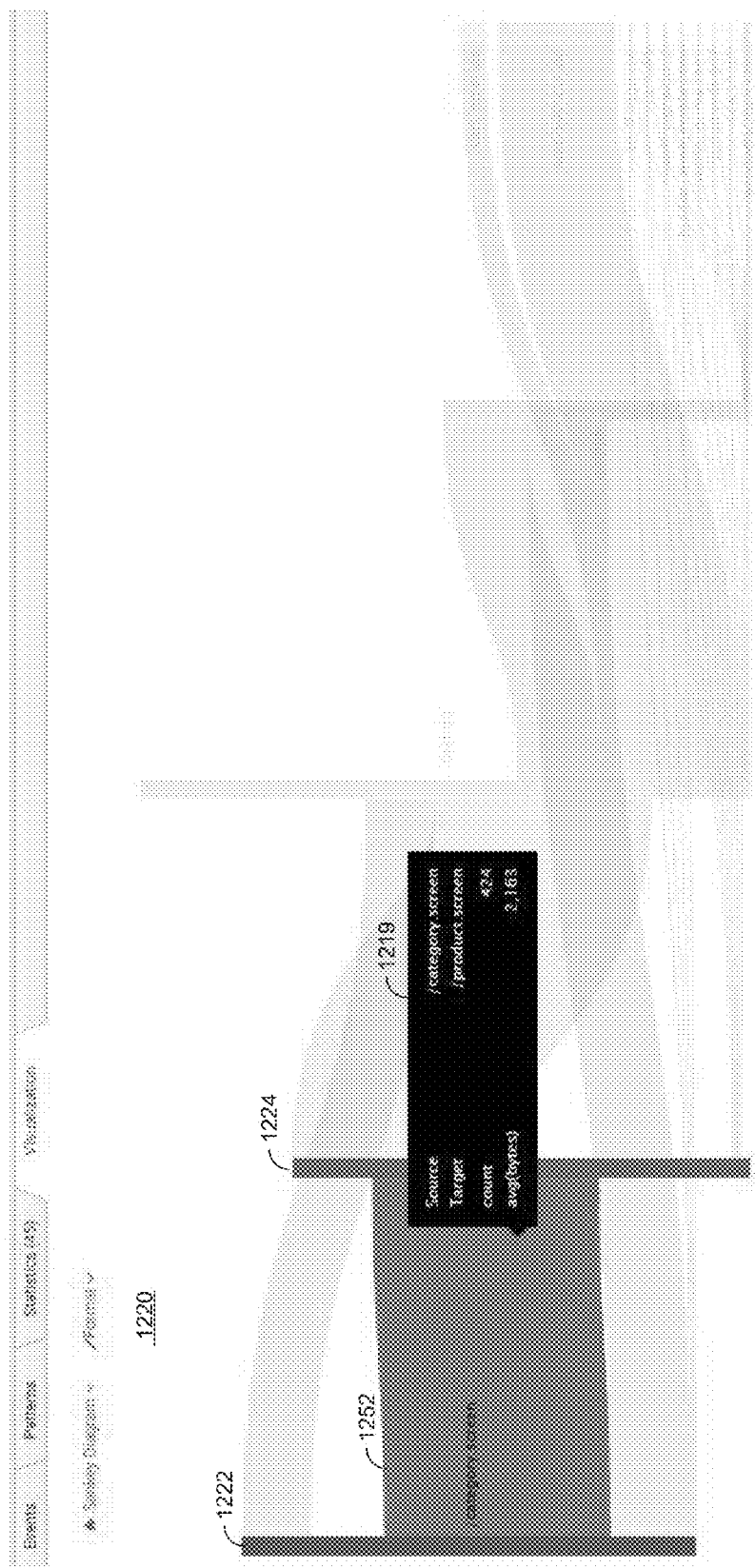
FIG. 17 illustrates an example of a visualization tab highlighting a flow.

When a user moves a cursor over a flow of the flow diagram 1220, the visualization tab can highlight the corresponding flow and display additional information related to the flow. FIG. 17 illustrates an example of a visualization tab highlighting a flow. As illustrated in FIG. 17, flow 52 is highlighted. An information block 1219 (also referred to as hovering window) is displayed to display relevant information about the selected flow, such as the source network address of the flow, the target network address of the flow, total count of events in the flow, and average amount of data being transmitted during the events in the flow. For example, an information block 1219 of FIG. 17 shows that the events of the flow 1252 include a total of 424 events, with an average of 2,163 bytes of data transmitted during each of the 424 events. All those 424 events relate to a browser transitioning from webpage/category.screen to webpage/product.screen.

If a user clicks a particular flow of the flow diagram 1220, the search screen 1200 can display an events tab or a statistics tab summarizing the events of that flow, similar to the events tab or statistics tab illustrated in FIGS. 14 and 15. In some embodiments, the visualization tab can generate another flow diagram visualizing data of the events represented by the clicked flow.

Figure 18:
FIG. 18 illustrates an example of a visualization of a flow diagram with colors.

In addition to the size of the flow, the flow diagram can further use colors to denote another characteristic of the events. FIG. 18 illustrates an example of a visualization of a flow diagram with colors. The size of a flow denotes a number of the events represented by the flow. In other words, a wider flow means a larger number of events represented by the flow. The colors of the flows can be used to denote a data range (called sequential coloring), e.g., the average amount of data being transferred during the events. For example, flow 1274 has an average amount of 117.642 bytes per event and is shown with a green color. Alternatively, different color intensities can be used to denote the data range as well in the sequential coloring. Flow 1272 has an average amount of 2,061 bytes per event and is shown with a yellow color. In some other embodiments, the colors of the flows can be used to denote various categories of the events.

Figure 19:
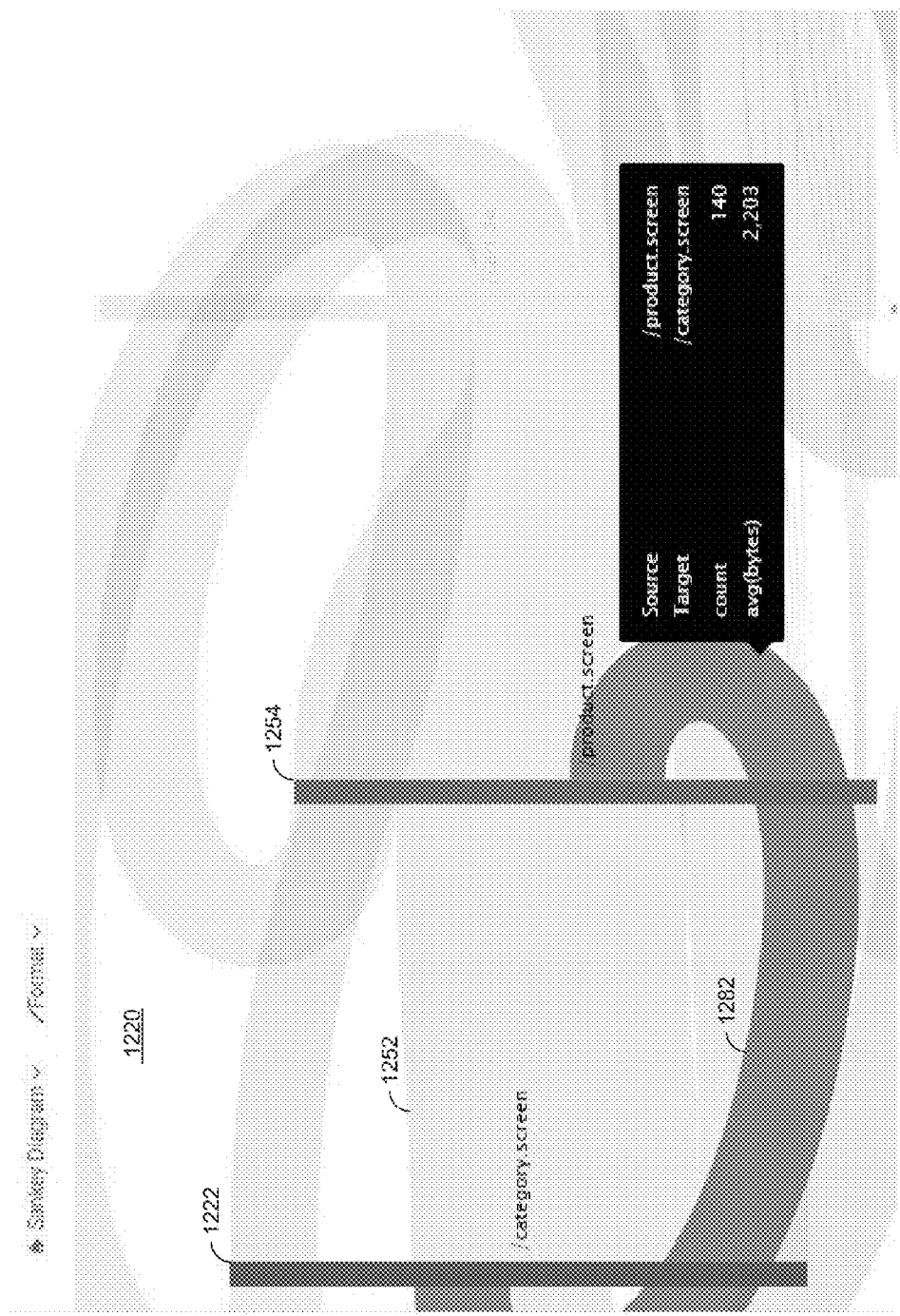
FIG. 19 illustrates an example of a visualization of a flow diagram including backward flows.

The flows illustrated in FIG. 16 are called forward flows, meaning that those flows are from source nodes on the left side to target nodes on the right side of the flow diagram. In some embodiments, a flow diagram can include backward flows. FIG. 19 illustrates an example of a visualization of a flow diagram including backward flows. For example, flow 1252 is a forward flow from node 1222 to node 1224. In contrast, flow 1282 (highlighted in FIG. 19) is a backward flow from node 1224 to node 1222.

The system can define forward and backward in relation to flows in any suitable way. For example, in some embodiments, the direction of the forward flows is defined as from a left side of the diagram to a right side of the diagram, and the direction of the backward flows is opposite to the direction of the forward flows. In some other embodiments, the direction of the forward flows is defined as from right to left.

In some embodiments, the directions of the forward and backward flows may depend on the order in which the nodes are arranged in the flow diagram. For example, the nodes can represent web addresses of webpages for a website. The system can put the node representing webpage in the root-level directory of the website at the left side of the diagram. The nodes representing webpages of second-level directories can be on the right side of the node representing the webpage of the root-level directory. Further, the nodes representing webpages of third-level directories can be on the right side of the nodes representing webpages of second-level directories, and so on. The system may define the direction of forward flows as left to right, meaning that the forward flows transition from webpages of higher-level directories to webpages of lower-level directories. On the other hand, the backward flows transition from webpages of lower-level directories to higher-level directories.

Figure 20:
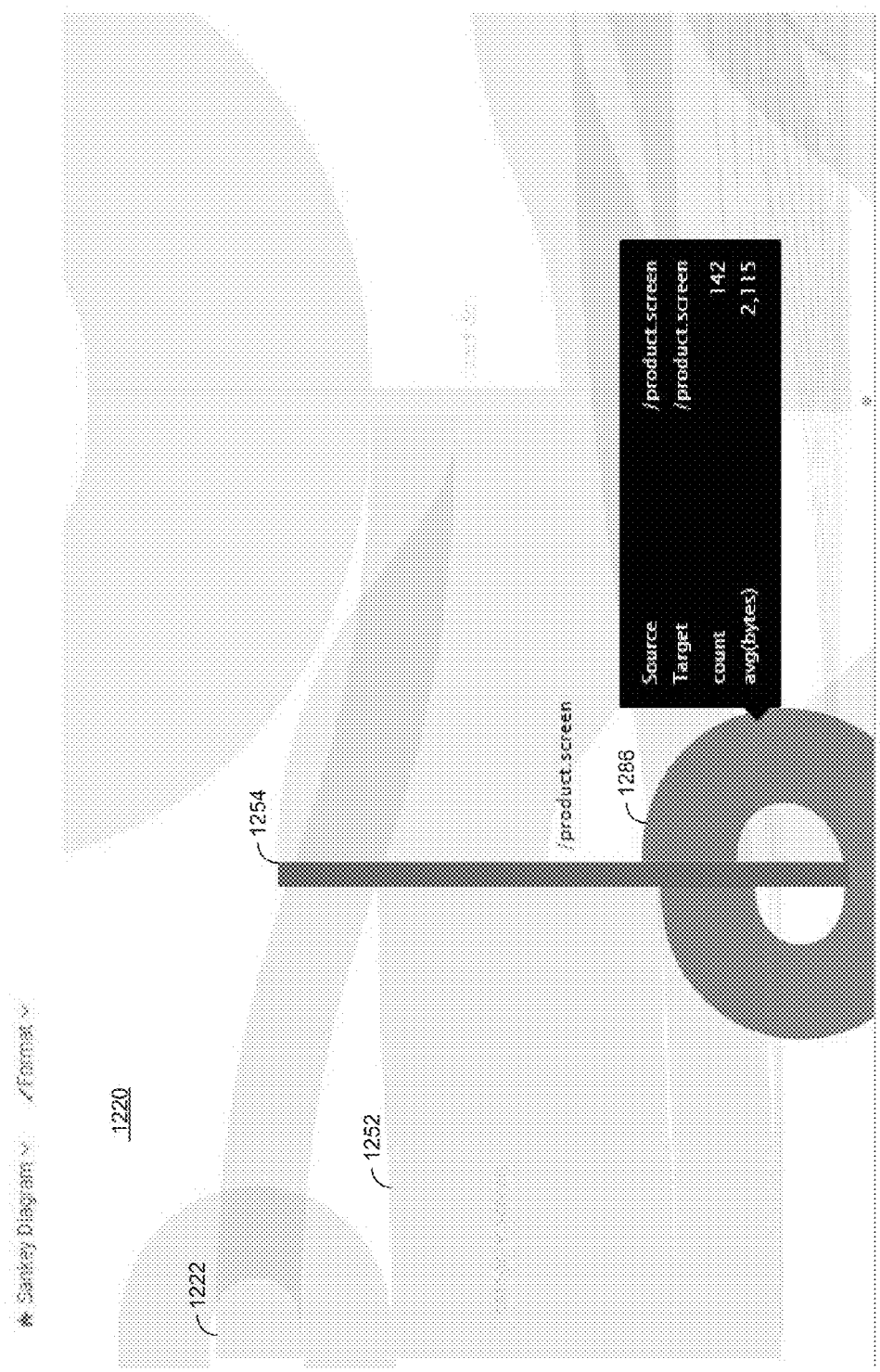
FIG. 20 illustrates an example of a visualization of a flow diagram including self-referential flows.

The flow diagram can also include self-referential flows. FIG. 20 illustrates an example of a visualization of a flow diagram including self-referential flows. A self-referential flow starts from a node and ends at the same node. For example, flow 1286 is a self-referential flow starting from node 1224 and ending at the same node 1224. In some embodiments, the self-referential flows represent events when the webpages are reloaded or refreshed. Thus, the self-referential flow can represent, for example, the reloading or refreshing event, where the reloading or refreshing event starts at a webpage represented by node 1224 and ends at the same webpage represented by node 1224.

Punchcard Visualization

The data intake and query system can use the real-time updated event data of the search results to generate a user-interactive "punchcard" chart as a visualization of the chart indicative of data. The data intake and query system can generate the punchcard chart by adapting a static library of software code, which in some embodiments is an open source library.

A punchcard chart, as the term is used herein, is a multi-dimensional chart (e.g., a two-dimensional chart) for visualizing the event data. The horizontal dimension (also referred to as "columns") and the vertical dimension (also referred to as "rows") correspond to two characteristics of the events. The punchcard chart includes a table of cells arranged into rows and columns. In some embodiments, each cell is visualized as a graphical object such as a dot. The size of the dot is indicative of a number of events (or a single event) represented by the cell. Thus, the punchcard chart puts a visual emphasis on larger dots, each of which represents a large number of events that share common characteristics corresponding to the row and column of the dot.

Figure 21:
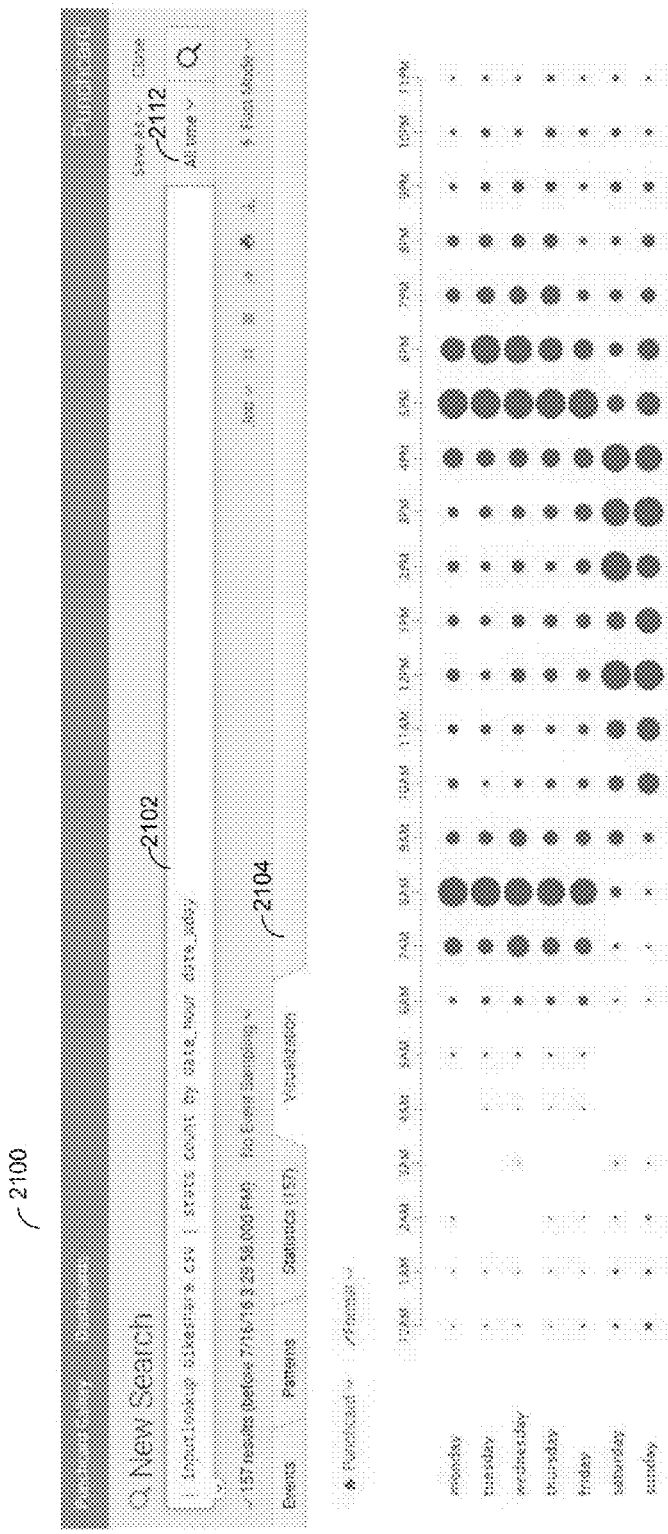
FIG. 21 illustrates an example of a search screen of a search GUI for a punchcard chart.

FIG. 21 illustrates an example of a search screen of a search GUI for a punchcard chart. The search screen 2100 can be generated by, e.g., the search head of the data intake and query system as illustrated in FIG. 2C. The search screen 2100 includes a search bar 2102 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 2100 also includes a time range picker 2112 that enables the user to specify a time range for the search. The time range picker 2112 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events. A real-time event, as the term is used herein, is an event whose event data are updated in a real time.

After a search is executed, the search screen 2100 displays the results through search results section 2104, wherein search results section 2104 includes: an "Events tab" that displays various information about events returned by the search; a "Statistics tab" that displays statistics about the search results; and a "Visualization tab" that displays various visualizations of the search results (e.g., punchcard chart).

Figure 22:
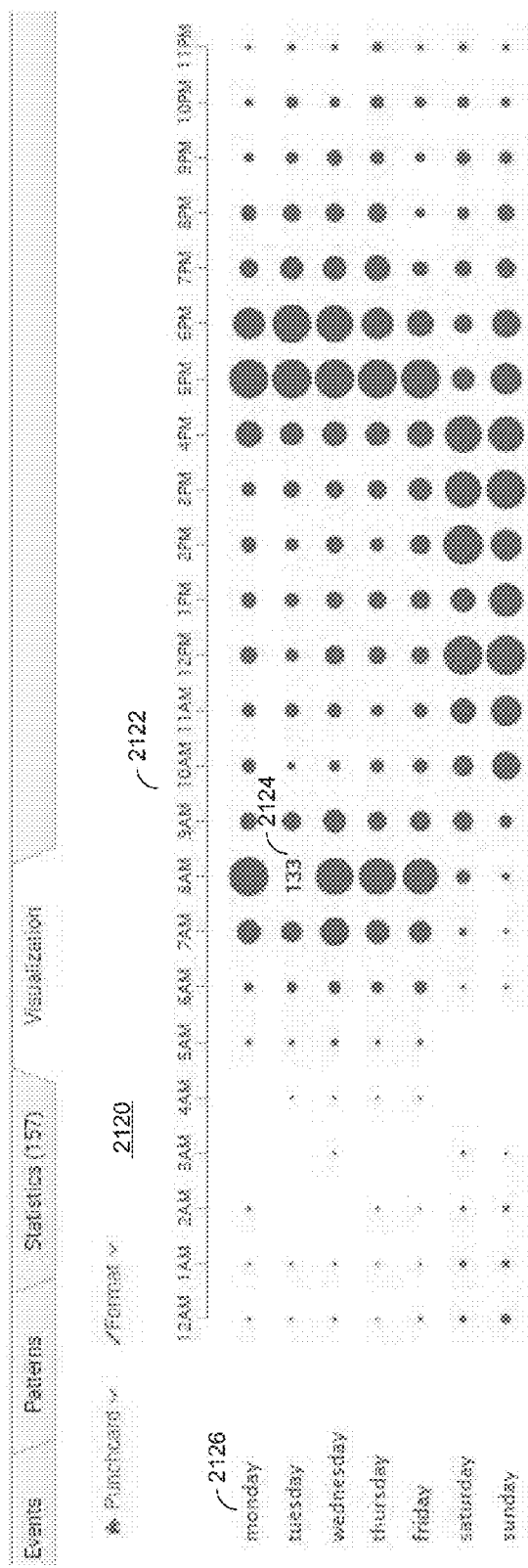
FIG. 22 illustrates an example of a visualization tab for a punchcard chart.

FIG. 22 illustrates an example of a visualization tab for a punchcard chart. The visualization tab illustrated in FIG. 22 displays a punchcard chart 2120 representing the search results. The horizontal dimension (columns) 2122 and the vertical dimension (rows) 2126 of the punchcard chart 2120 represent two types of characteristics of the events. For example, the horizontal dimension 2122 can represent the times of the day when the events occur; and the vertical dimension 2126 can represent the days of the week when the events occur.

The punchcard chart 2120 includes a table of cells arranged into rows and columns. As illustrated in FIG. 22, the cells can be depicted as graphic objects such as dots. Each individual dot presents one or more events that share common characteristics corresponding to the row and the column of that individual dot. For example, in FIG. 22, the dot at the column of "8 AM" and the row of "Wednesday" represents events that occur around Wednesday 8 AM.

The size of each individual dot can be indicative of another characteristic of the events. For example, the size of each individual dot can be indicative of a number of events (or a single event) represented by that individual dot. In some embodiments, an empty cell without a dot means that there is no corresponding event.

The punchcard chart is user-interactive. For example, the user can move a cursor over a dot, or click a dot. In some embodiments, when a user moves a cursor over a dot of the punchcard chart 2120, the visualization tab automatically displays additional information related to the dot. As illustrated in FIG. 22, for example, in response to a user input of moving a cursor over a dot 2124, the visualization table display a number at the place of the dot 2124. The number can be, e.g., the total number of events represented by the dot 2124. In other words, 133 events have occurred around Tuesday 8 AM in the example of FIG. 22. In some alternative embodiments, the number can be a result of a statistical aggregation from a field across the events represented by the dot 2124.

In some other embodiments, the visualization tab can provide other information in response to a user input. For example, the visualization table can generate an information block (also referred to as hovering window) to display relevant information about the dot, such as the average event occurring time.

If a user clicks a particular dot of the punchcard chart 2120, the search screen 2100 can display an events tab or a statistics tab summarizing the events of that dot. FIG. 23 illustrates an example of a statistics tab for a punchcard chart. The statistics tab illustrated in FIG. 23 shows relevant statistics regarding the results of the search query, such as the time of the day when an event occur (date_hour), the day of the week when an event occur (date_wday), and the total number events that have occurred at that time of the day and that day of the week (count).

Figure 24:
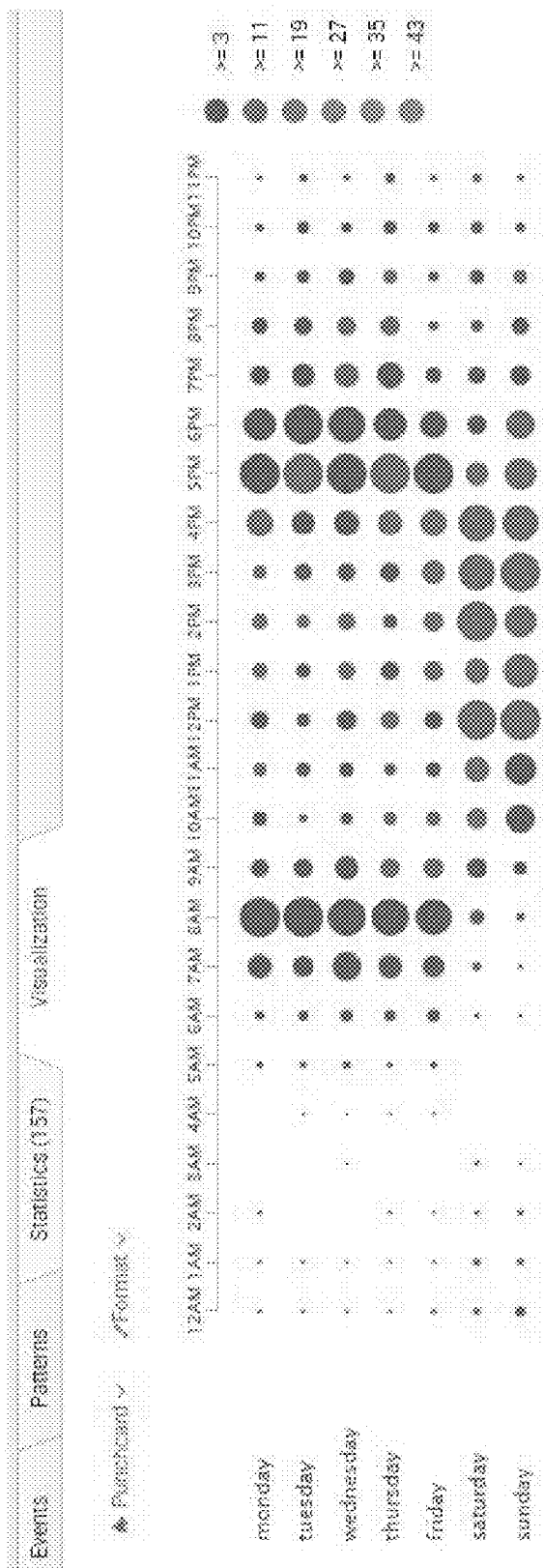
FIG. 24 illustrates an example of a visualization of a punchcard chart with colors.

In addition to the size of the dot, the punchcard chart can further use colors to denote yet another characteristic of the events. FIG. 24 illustrates an example of a visualization of a punchcard chart with colors. The size of a dot denotes a number of the events represented by the dot. In other words, a larger dot represents a larger number of events than a smaller dot. The colors of the dots can be used to denote data ranges (called sequential coloring), e.g., the duration of the events. Alternatively, different color intensities can be used to denote the data range as well in the sequential coloring. For example, as illustrated in FIG. 24, red dots represent events that have durations between 3 seconds and 11 seconds. Orange dots represent events that have durations between 11 seconds and 19 seconds. Brown, olive, emerald, and green dots represent events that have durations longer than 19 seconds (not available in FIG. 24). In some embodiments, the system, executing the static library of software code, automatically chooses dot colors and corresponding value ranges of the characteristic based on the data of the event, without human intervention.

Figure 25:
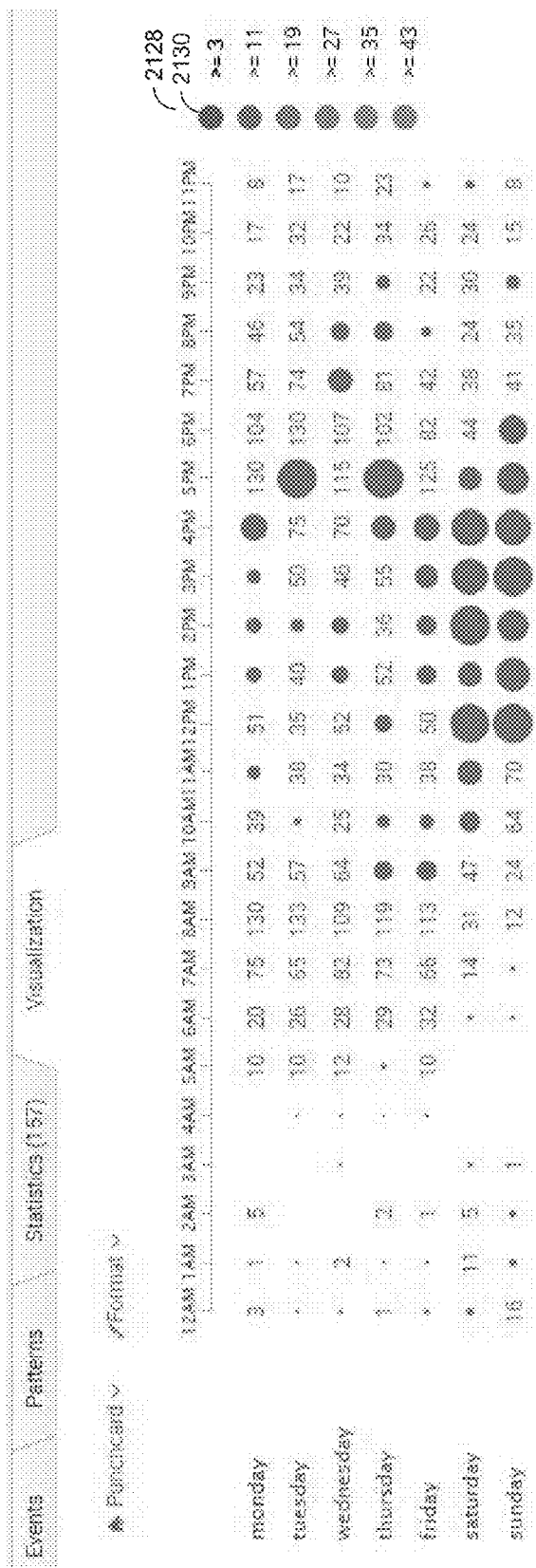
FIG. 25 illustrates an example of a visualization of a punchcard chart in response to a user input.

In some embodiments, when a user moves a cursor over a colored dot in the legend section, the punchcard chart can change the appearance of the dots of that color. FIG. 25 illustrates an example of a visualization of a punchcard chart in response to a user input. The legend section 2128 of the punchcard chart includes colored dots and the associated value ranges. When a user moves a cursor over, e.g., the red dot in the legend section 2128, the visualization tab changes appearance of the corresponding red dots in the punchcard chart. For example, as illustrated in FIG. 25, all red dots are replaced with numbers. The numbers are, e.g., the total numbers of events represented by the individual red dots being replaced. Similarly, if the user moves the cursor over orange dots, the orange dots can be replaced with the total numbers of events represented by the individual orange dots being replaced.

Figure 26:
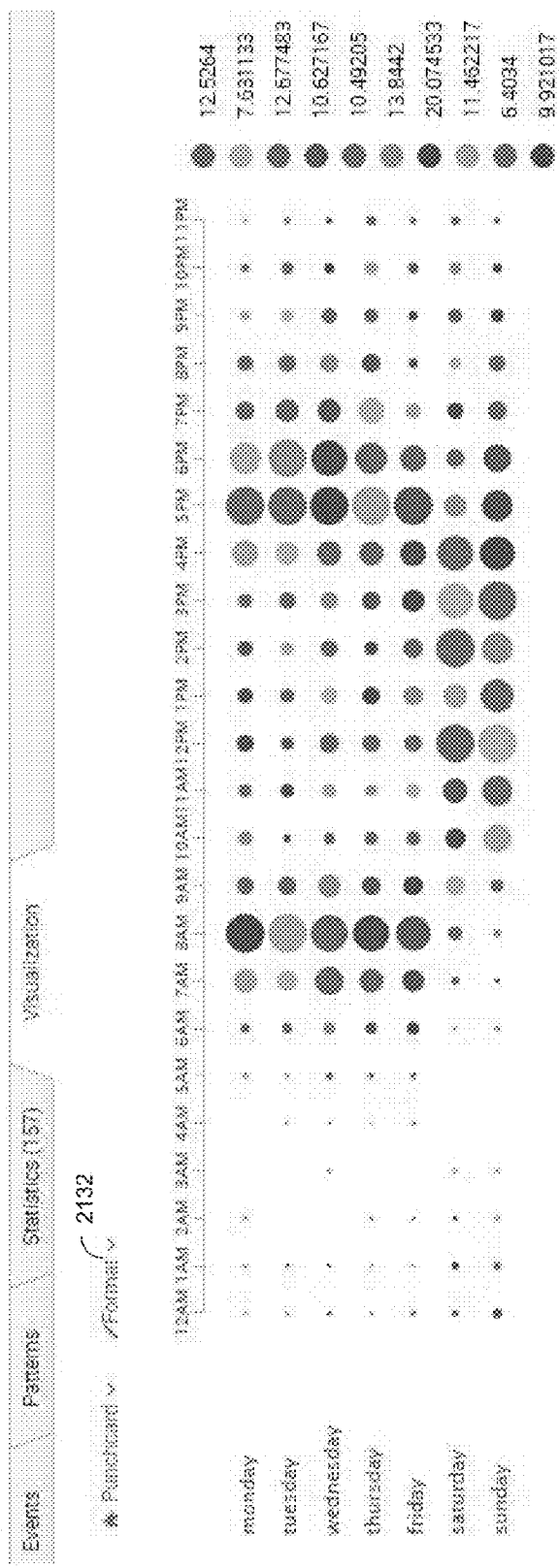
FIG. 26 illustrates another example of a visualization of a punchcard chart with colors.

FIG. 26 illustrates another example of a visualization of a punchcard chart with colors. The colors of the dots can be used to denote categories (called categorical coloring), e.g., duration values of the events. For example, as illustrated in 216, red dots represent events that have durations of about 12.6 seconds; and purple dots represent events that have durations of about 9.9 seconds. In some embodiments, the system, executing the static library of software code, automatically chooses dot colors and corresponding categories based on the data of the event, without human intervention. Although FIG. 26 shows numerical values (event durations)

as categories, the punchcard chart can also use different textual objects (e.g., words or phrases) extracted from the event data as categories.

Figure 27:
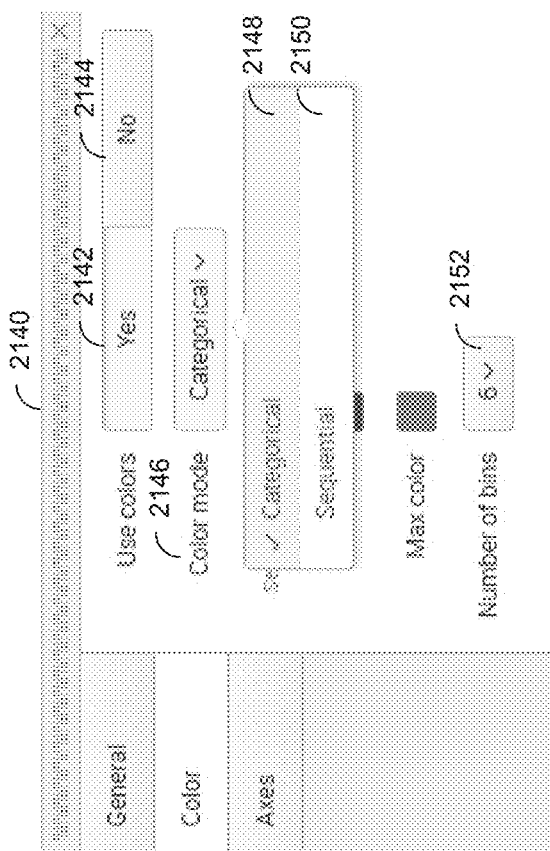
FIG. 27 illustrates an example of a visualization format interface for a punchcard chart.

A user may choose between sequential coloring and categorical coloring. For example, a user can click a "format" button 2132. In response, the visualization tab can display a visualization format interface. FIG. 27 illustrates an example of a visualization format interface for a punchcard chart. The visualization format interface 2140 includes a "yes" button 2142 and a "no" button 2144. When a user clicks the "no" button 2144, the visualization tab renders the dots of the punchcard chart using a single color (e.g., as illustrated in FIG. 22). When a user clicks the "yes" button 2142, the visualization tab renders the dots of the punchcard chart using different colors (e.g., as illustrated in FIGS. 24 and 26).

The visualization format interface 2140 further includes a "color mode" drop-down menu 2146, which includes a "categorical" element 2148 and a "sequential" element 2150. When a user selects the "categorical" element 2148, the visualization tab renders colors of the dots of the punchcard chart to denote categories (categorical coloring) as illustrated in FIG. 26. When a user selects the "sequential" element 2150, the visualization tab renders colors of the dots of the punchcard chart to denote data ranges (sequential coloring) as illustrated in FIG. 24.

The visualization format interface 2140 also includes "number of bins" drop-down menu 2152. A user can use the menu 2152 to specify the total numbers of different colors for the dots of the punchcard chart.

A user can select a subset of the search results and the visualization tab can then visualize of the subset (e.g., using a punchcard chart). Referring back to FIG. 22, a user can click the dot 2124 to select the 133 events that occurred around 8 AM Tuesday for a further analysis. In response to the user selection, the visualization tab can generate a new punchcard chart to visualize the event data for the selected 133 events that occurred around 8 AM Tuesday. The process of visualizing a user-selected subset is referred to as "drill down."

Figure 28:
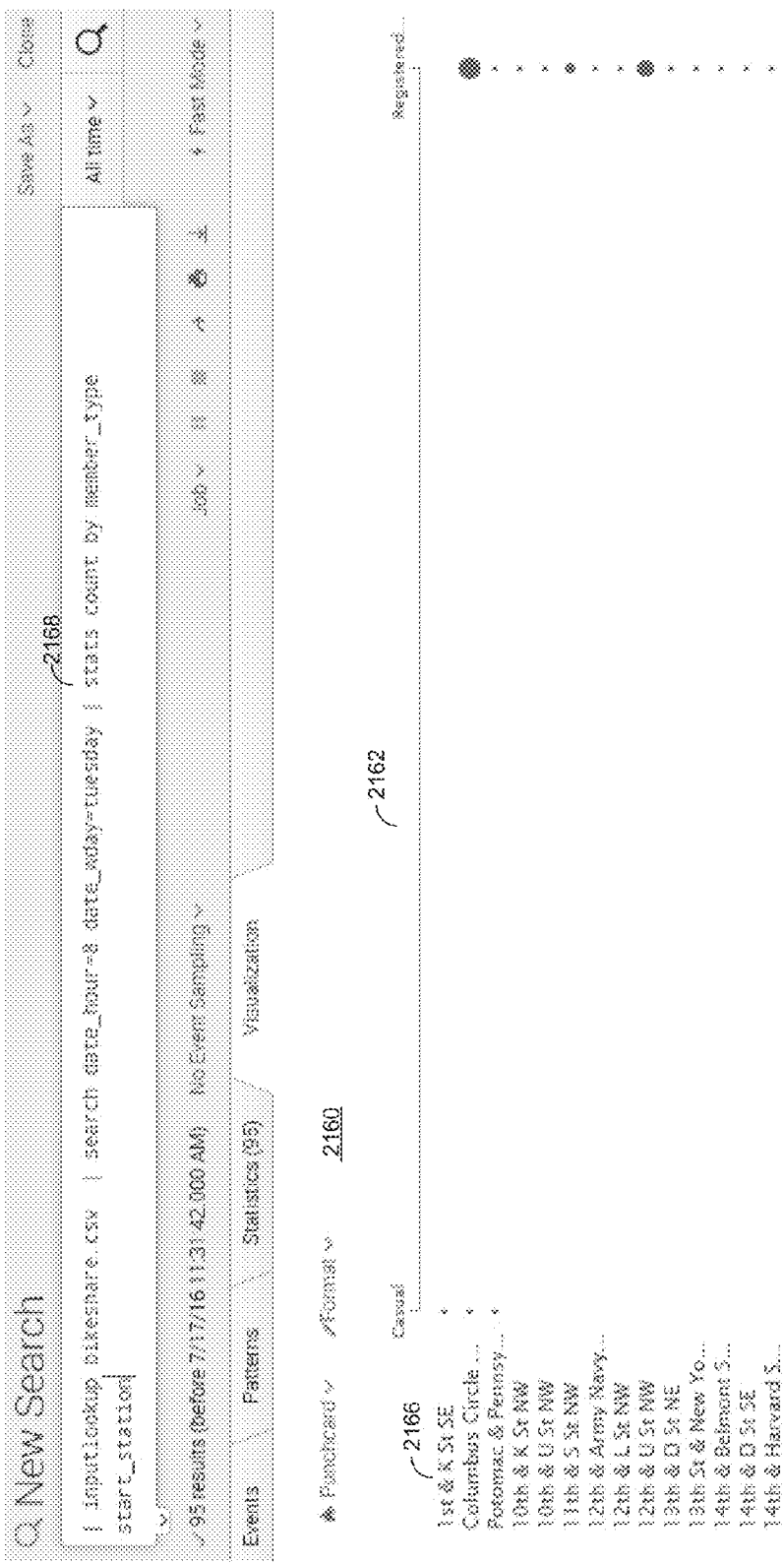
FIG. 28 illustrates a punchcard chart visualized using a user-selected subset of search results.

FIG. 28 illustrates a punchcard chart visualized using a user-selected subset of search results. Similarly to the punchcard chart 2120 in FIG. 22, the drilled-down punchcard chart 2160 has a horizontal dimension (columns) 2162 and a vertical dimension (rows) 2166 that represent two types of characteristics of the subset. For example, as illustrated in FIG. 28, the vertical dimension 2166 can represent locations where bike share events start. The horizontal dimension 2162 can represent the types of membership (casual or registered membership) for persons involved in the bike share events.

In some embodiments, the system automatically selects the horizontal and vertical dimensions 2162 and 2166 by analyzing the event data of the subset without human intervention. In some other embodiments, the system allows a user to specify types of characteristics that are represented by the horizontal and vertical dimensions 2162 and 2166. For example, the user can use the search bar 2168 to input a search query. The search query includes instructions specifying that the horizontal dimension 2162 represents the types of membership (member type) and that the vertical dimension 2166 represents the locations where bike share events start (start station).

Parallel Coordinates Visualization

The data intake and query system can use the real-time updated event data of the search results to generate a multiple-dimensional chart (e.g., parallel coordinates chart) as a visualization of the real-time updated event data. The data intake and query system can generate the multiple-dimensional chart by adapting a static library of software code, which in some embodiments is an open source library.

To depict a set of events (or generally, data points) in an n-dimensional space, the parallel coordinates chart includes n parallel lines (also referred to as parallel axes). Each event (or data point) in the n-dimensional space is represented as a polyline with vertices on the parallel axes. A polyline is an object including a series of connecting straight lines. The position of the vertex of the polyline on the i-th axis corresponds to the i-th coordinate of the event (or data point). In some embodiments, the parallel axes are vertical and equally spaced in the parallel coordinates chart.

Figure 29:
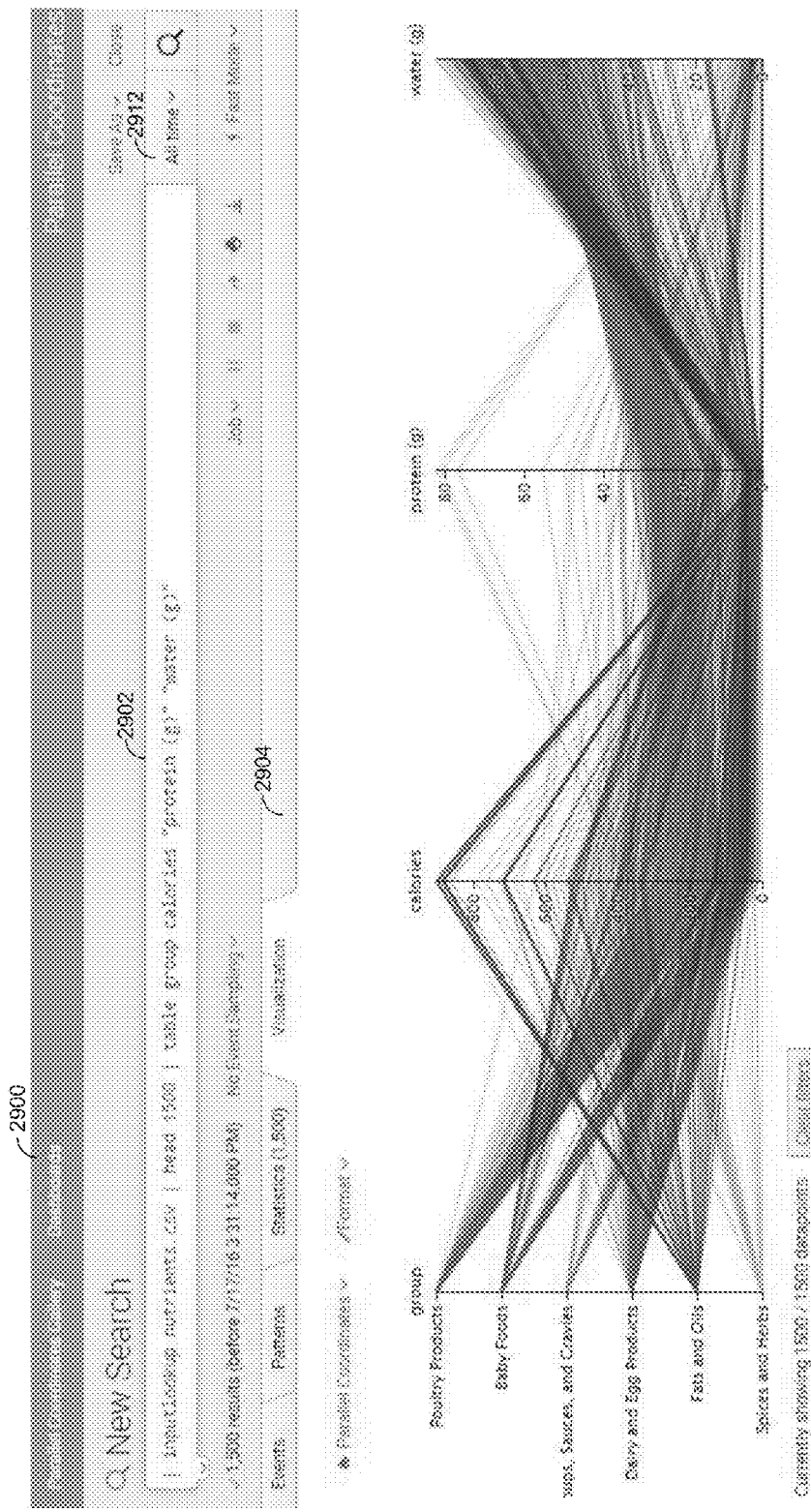
FIG. 29 illustrates an example of a search GUI for a parallel coordinates chart.

The data intake and query system can generate a user-interactive "parallel coordinates" chart based on real-time event data of search results. FIG. 29 illustrates an example of a search GUI for a parallel coordinates chart. The search screen 2900 can be generated by, e.g., the search head of the data intake and query system as illustrated in FIG. 2C. The search screen 2900 includes a search bar 2902 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 2900 also includes a time range picker 2912 that enables the user to specify a time range for the search. The time range picker 2912 can provide a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 2900 displays the results through search results section 2904, wherein search results section BB04 includes: an "events tab" that displays various information about events returned by the search; a "statistics tab" that displays statistics about the search results; and a "visualization tab" that displays various visualizations of the search results (e.g., parallel coordinates chart).

Figure 30:
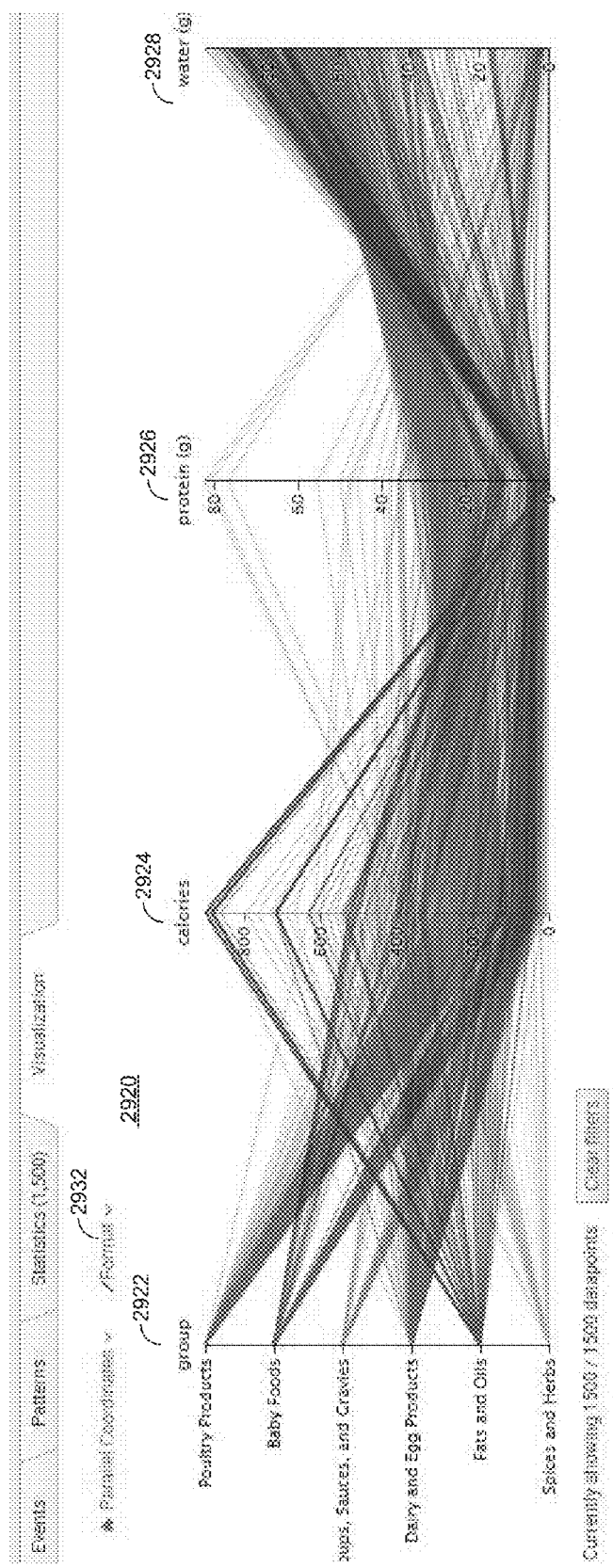
FIG. 30 illustrates an example of a visualization tab for a parallel coordinates chart.

FIG. 30 illustrates an example of a visualization tab for a parallel coordinates chart. The visualization tab illustrated in FIG. 30 displays a parallel coordinates chart 2920 visualizing the search results. The search results include a plurality of events (or data points). Each of the events (or data points) has characteristics in multiple dimensions. In other words, each event is a n-dimensional data point. For example, each event can represent a food product. Each food product has associated characteristics such as type of food (e.g., poultry product, dairy and egg product, fats and oils, etc.), calories, proteins, water, etc.

The parallel coordinates chart 2920 includes a plurality of parallel axis 2922, 2924, 2926 and 2928. Each of the plurality of parallel axes 2922, 2924, 2926 and 2928 represents a type of characteristic, such as type of food (group), calories, protein, and water. Each food product (also referred to as event or data point) is represented by a polyline with vertices on the parallel axes 2922, 2924, 2926 and 2928. For an individual axis, the position of the vertex of the polyline on the individual axis corresponds to the corresponding characteristic of the food product (event or data point). For example, a polyline has a vertex at a position of "fats and oils" on the parallel axis 2922 and another vertex at a position of 700 on the parallel axis 2924. That polyline represents a food product that belongs to the fats and oils group and has 700 calories per serving. In some embodiments, the user can reorder the axes of the parallel coordinates chart 2920. For example, the user can instruct to recorder the axes by interacting with the parallel coordinates chart 2920 or making changes to the search query. In response to the user instruction, the visualization tab can recorder the axes of the parallel coordinates chart 2920. The polylines can also be updated based on the reordering of the axes.

The parallel coordinates chart can use colors to denote certain characteristics of the events (or data points). For example, the colors of polylines can be used to denote data ranges of characteristics (called sequential coloring), or categories (called categorical coloring). For example, as illustrated in FIG. 30, blue polylines represent dairy and egg products; while purple polylines represent fats and oils products. In some embodiments, the system, executing the static library of software code, automatically chooses polyline colors and corresponding categories based on the data of the events, without human intervention. In some other embodiments, the system allows a user to select a parallel axis for categorization. The system divides the events (or data points) into different categories with different colors based on the characteristic values (e.g., coordinates on the parallel axis).

Figure 31:
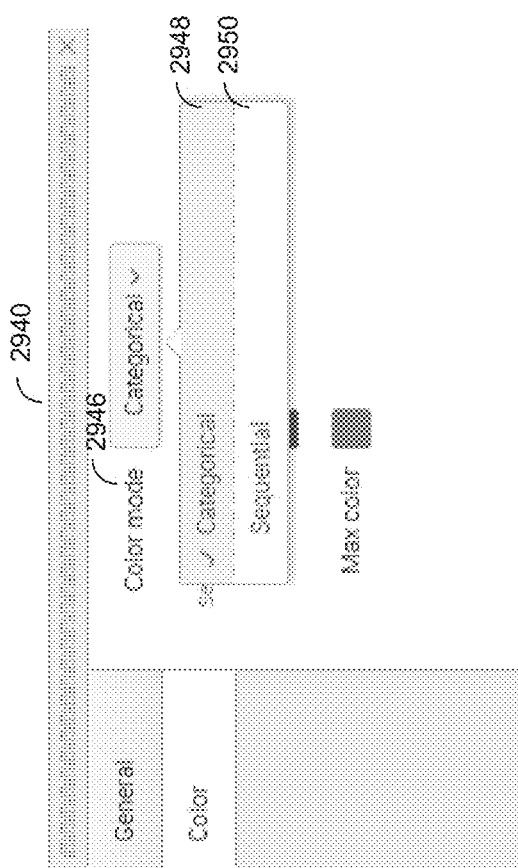
FIG. 31 illustrates an example of a visualization format interface for a parallel coordinates chart

A user may choose between sequential coloring and categorical coloring. For example, a user can click a "format" button 2932 as illustrated in FIG. 30. In response, the visualization tab can display a visualization format interface. FIG. 31 illustrates an example of a visualization format interface for a parallel coordinates chart. The visualization format interface BB40 includes a "color mode" drop-down menu 2946, which includes a "categorical" element 2948 and a "sequential" element 2950. When a user selects the "categorical" element 2948, the visualization tab renders colors of polylines of the parallel coordinates chart to denote categories (categorical coloring) as illustrated in FIG. 30. When a user selects the "sequential" element 2950, the visualization tab renders colors of the polylines of the parallel coordinates chart to denote data ranges (sequential coloring) as illustrated in 32.

Figure 32:
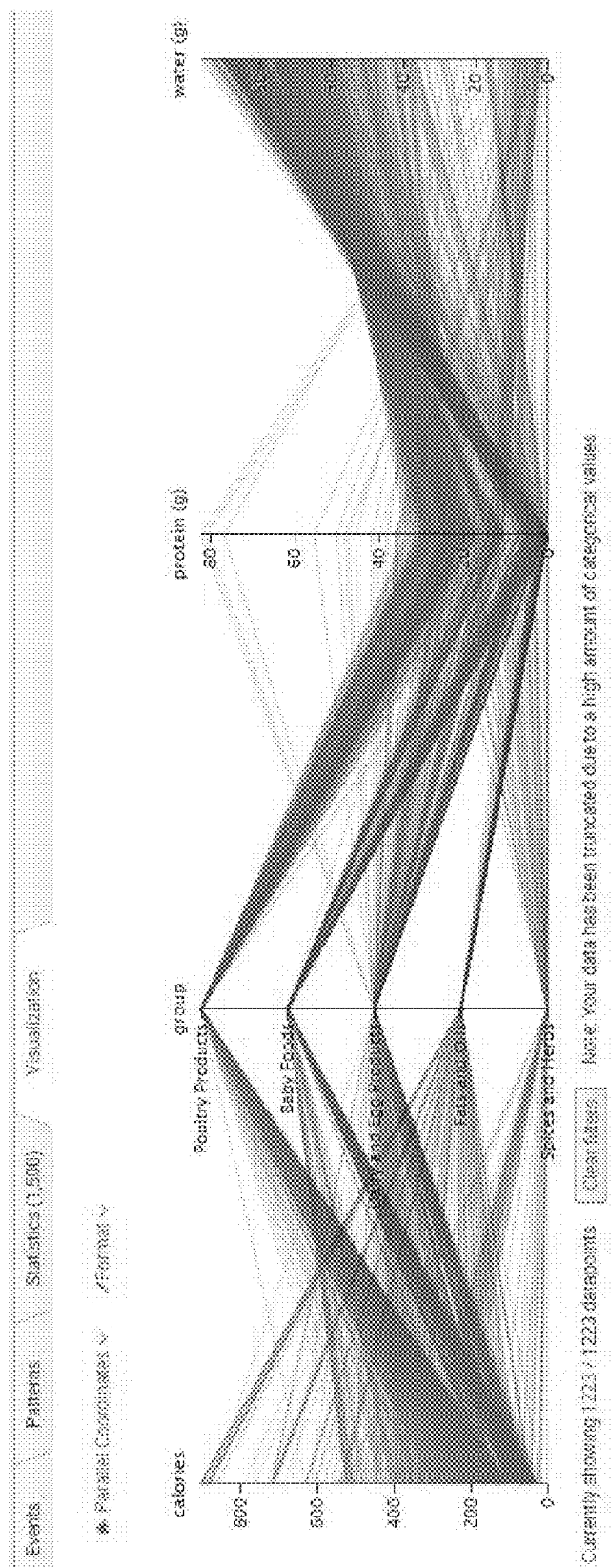
FIG. 32 illustrates a parallel coordinates chart with sequential coloring.

FIG. 32 illustrates a parallel coordinates chart with sequential coloring. For example, the system can use the calories values (e.g., coordinates on the calories axis) to divide the polylines into different data ranges. Each data range is assigned with a different color. As illustrated in FIG. 32, the polylines with calories around 800 are blue. The polyline with calories around 0 are red. The polyline with calories between 0 and 800 are assigned with various colors between blue and red depending on the corresponding calories.

Figure 33:
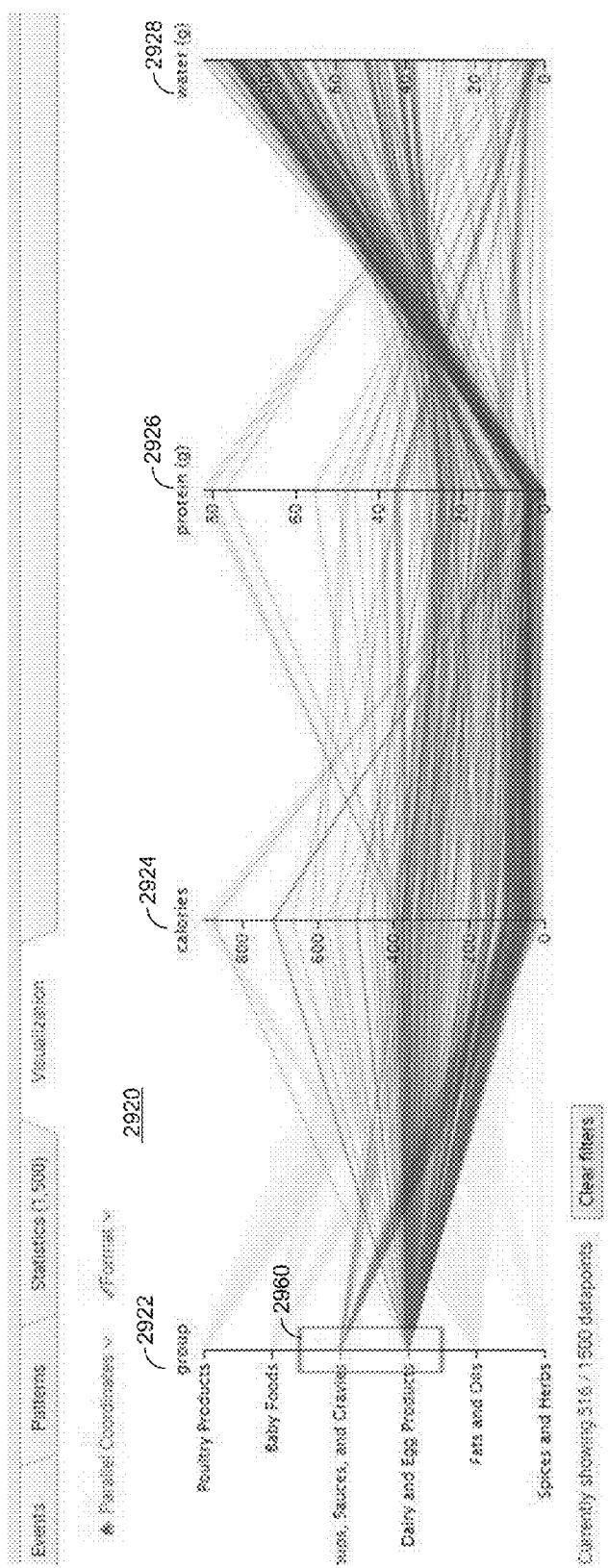
FIG. 33 illustrates an example a parallel coordinates chart with a filter.

A user can interact with the parallel coordinates chart. For example, the user can drag a cursor over a parallel axis to create a filter for that parallel axis. FIG. 33 illustrates an example a parallel coordinates chart with a filter. For example, a user can create a filter 2960 by drag a cursor over a parallel axis 2922. The trace of the cursor dragging determines a range of the filter 2960. As illustrated in FIG. 33, the filter 2960 selects the polylines for the categories of "soups, sauces, and gravies" (orange polylines) and "dairy and egg products" (blue polylines). The parallel coordinates chart highlights the data points selected by the filter 2960, by reducing the color intensity of the remaining polylines. In some embodiments, the parallel coordinates chart can remove the remaining polyline that is not selected by the filter 2960.

Figure 34:
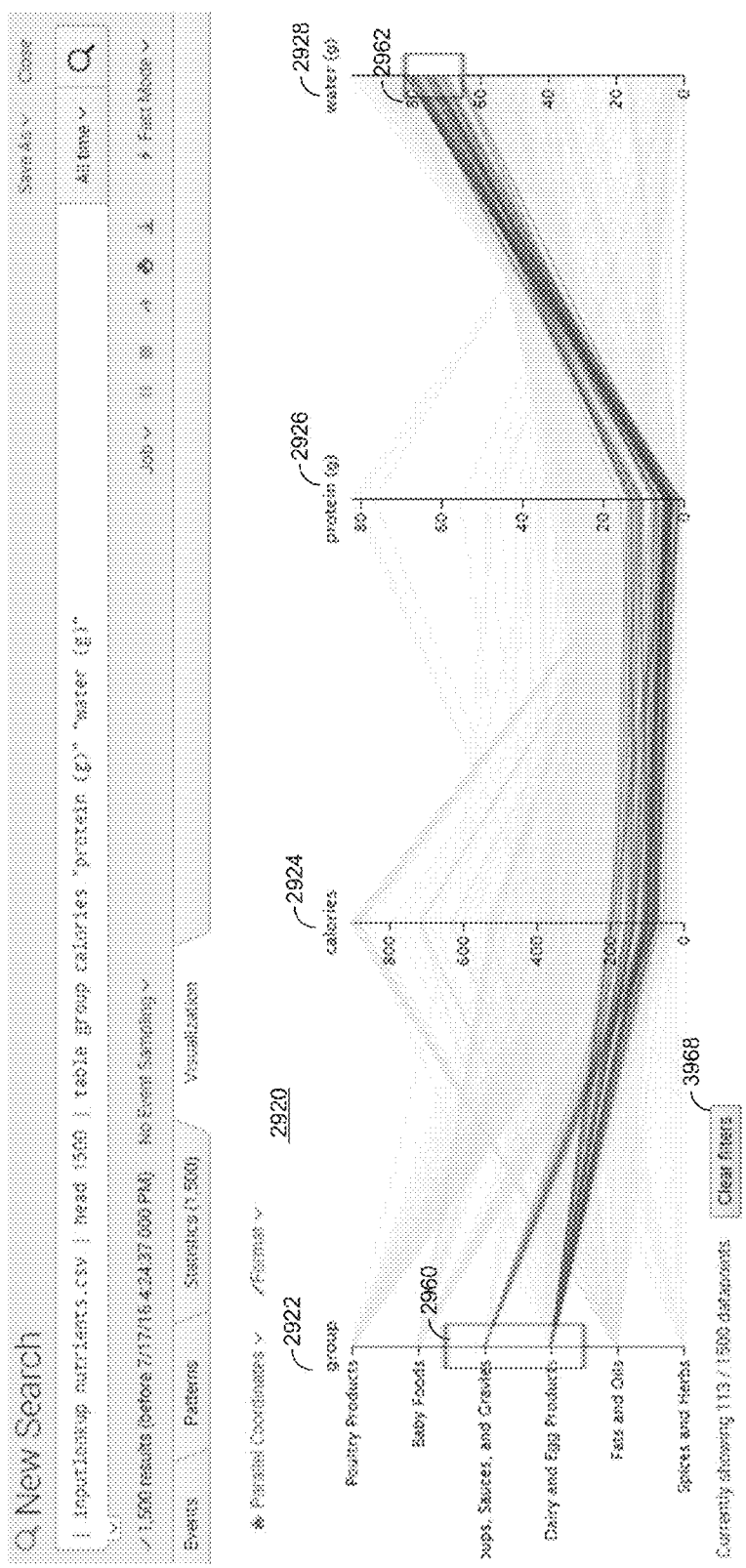
FIG. 34 illustrates an example a parallel coordinates chart with multiple filters

The user can create multiple filters. FIG. 34 illustrates an example a parallel coordinates chart with multiple filters. A user can create a filter 2960 by drag a cursor over a parallel axis 2922 and another filter 2962 by dragging a cursor over another parallel axis 2928. The traces of the cursor dragging determine ranges of the filters 2960 and 2962. As illustrated in FIG. 34, the filter 2960 selects the polylines for the categories of "soups, sauces, and gravies" (orange polylines) and "dairy and egg products" (blue polylines). The filter 2960 selects the polylines having water of around 65~82 grams. The parallel coordinates chart highlights the data points selected by the filters 2960 and 2962, by reducing the color intensity of the remaining polylines excluded by the filters 2960 and 2962.

If a user clicks a "clear filters" button 2968, the parallel coordinates chart clears all filters. For example, the parallel coordinates chart can revert back to the chart as illustrated in FIG. 30.

A user can define a subset of the search results using the filters for a further analysis. For example, the filters 2960 and 2962 as illustrated in FIG. 34 define a subset of food products (events or data points) that belong to the categories of "soups, sauces, and gravies" (orange polylines) and "dairy and egg products" (blue polylines) and that contain water of around 65~82 grams per serving. In response to the user selection, the visualization tab can generate a new parallel coordinate chart to visualize the data for the selected subset. The process of visualizing a user-selected subset is referred to as "drilling down."

Figure 35:
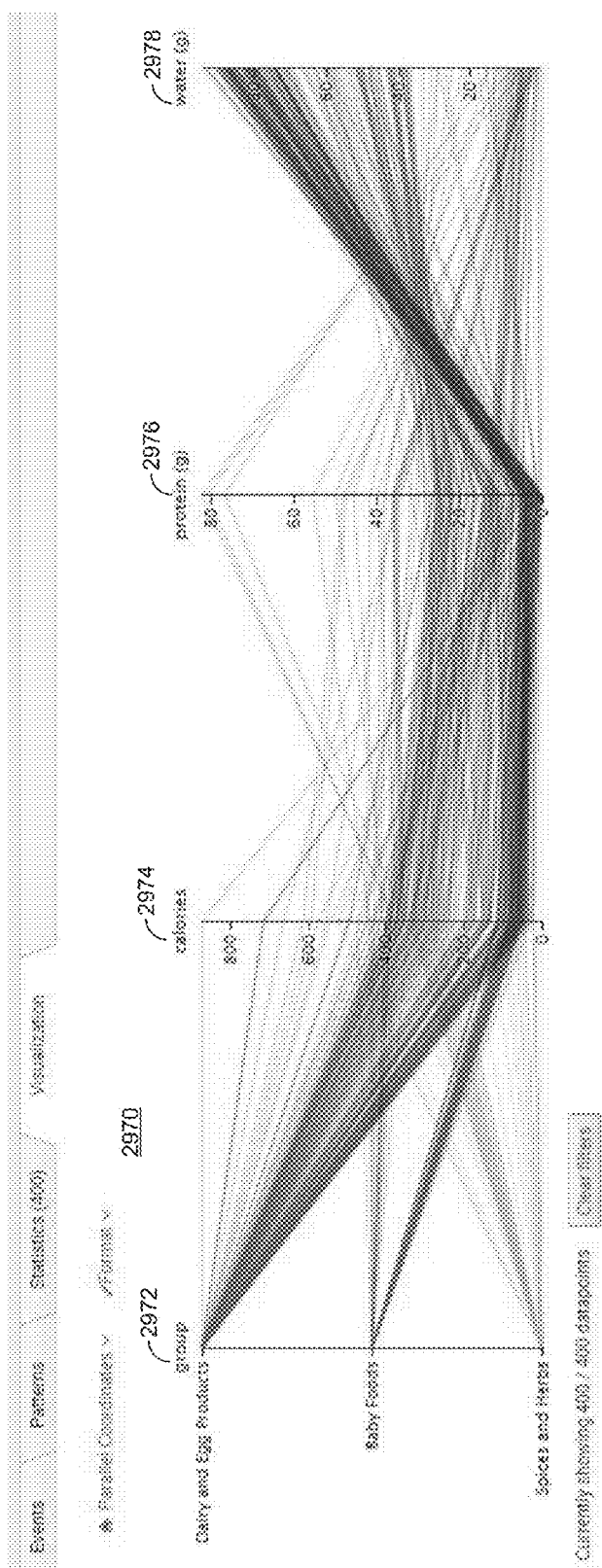
FIG. 35 illustrates a parallel coordinates chart visualized using a user-selected subset of search results.

FIG. 35 illustrates a parallel coordinates chart visualized using a user-selected subset of search results. For example, a user has defined two filters. One filter is for the categories of "dairy and egg products," "baby foods," and "spices and herbs." Another filter is for products having water of around 10~88 grams per serving. Based on the subset selected by those two filters, the parallel coordinates chart 2970 (also referred to as drilled-down parallel coordinates chart) visualizes the data of the subset.

In some embodiments, the drilled-down parallel coordinates chart 2970 retains the parallel axis of the original parallel coordinates chart 2920. The coordinate ranges of the parallel axis are adjusted based on the data ranges of the subset. For example, the coordinate range of the parallel axis 2978 (water) is reduced from 0~100 to 10~88 grams per serving. The coordinate range of the parallel axis 2972 (group) is also reduced from 6 categories to 3 categories. In some embodiments, the subset can be drilled down as a statistics tab. For example, a "Statistics" tab (e.g., as illustrated in FIG. 29) can show relevant statistics regarding the events within the selected subset.

Horizon Chart Visualization

The data intake and query system can use the real-time updated event data of the search results to generate a user-interactive "horizon" chart as a visualization of a chart indicative of data. The data intake and query system can generate the horizon chart by adapting a static library of software code, which in some embodiments is an open source library.

A horizon chart, as the term is used herein, is a two-dimensional chart showing a charging characteristic of the events over time. A horizontal axis of the chart denotes the time; while a vertical axis of the chart denotes a current value of the characteristic at a specific time point. The horizon chart uses different colors to reduce vertical space of the chart without losing resolution. Values that are less than a threshold are plotted as a first band in the horizon chart. Larger values are overplotted as other bands that have different colors (e.g., successively darker colors). In other words, the horizon chart can reduce the vertical space of the chart by accommodating multiple bands for different data ranges.

Figure 36:
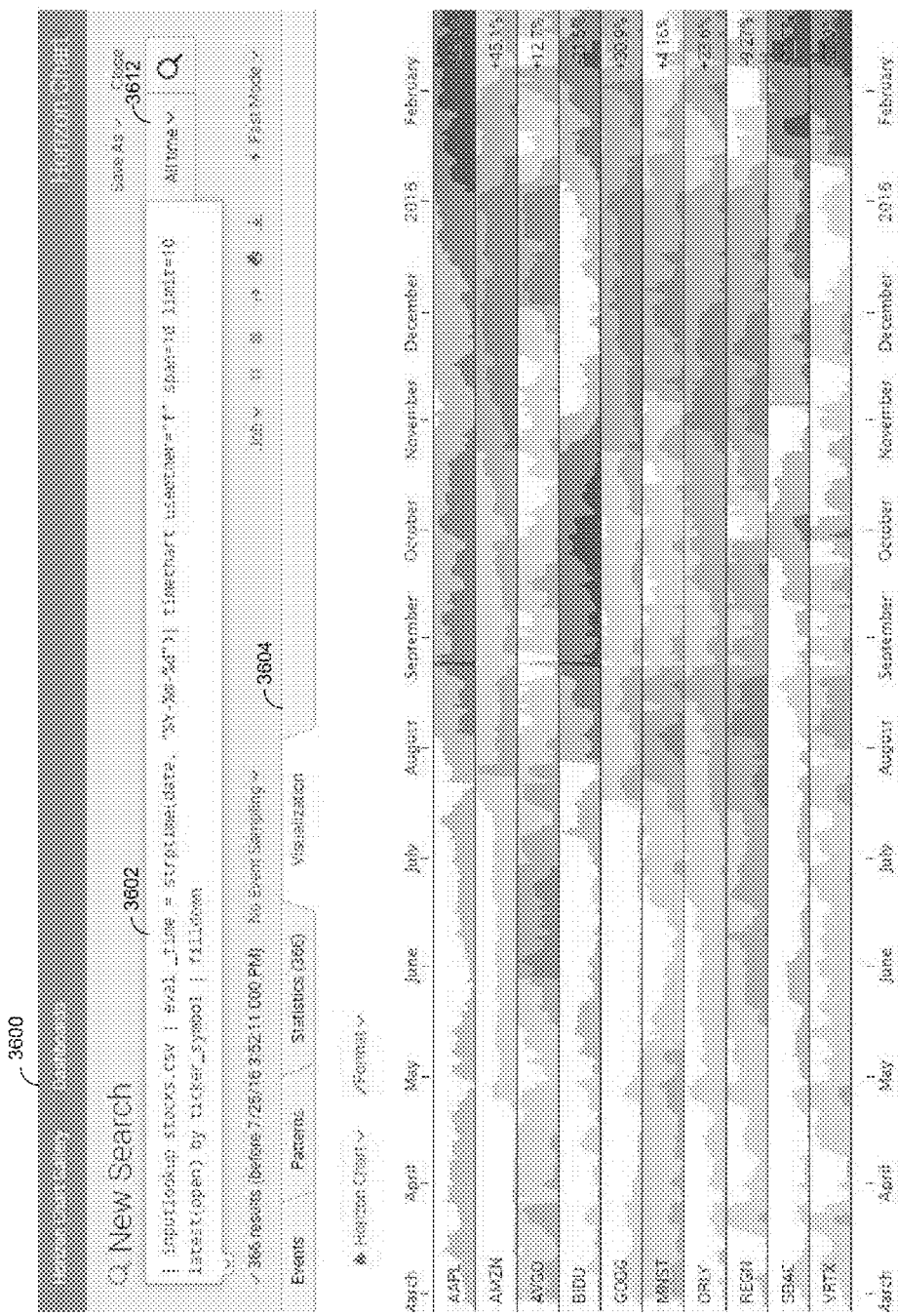
FIG. 36 illustrates an example of a search screen of a search GUI for a horizon chart.

FIG. 36 illustrates an example of a search screen of a search GUI for a horizon chart. The search screen 3600 can be generated by, e.g., the search head of the data intake and query system as illustrated in FIG. 2C. The search screen 3600 includes a search bar 3602 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 3600 also includes a time range picker 3612 that enables the user to specify a time range for the search. The time range picker 3612 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 3600 displays the results through search results section 3604, wherein search results section 3604 includes: an "Events tab" that displays various information about events returned by the search; a "Statistics tab" that displays statistics about the search results; and a "Visualization tab" that displays various visualizations of the search results (e.g., a horizon chart).

Figure 37:
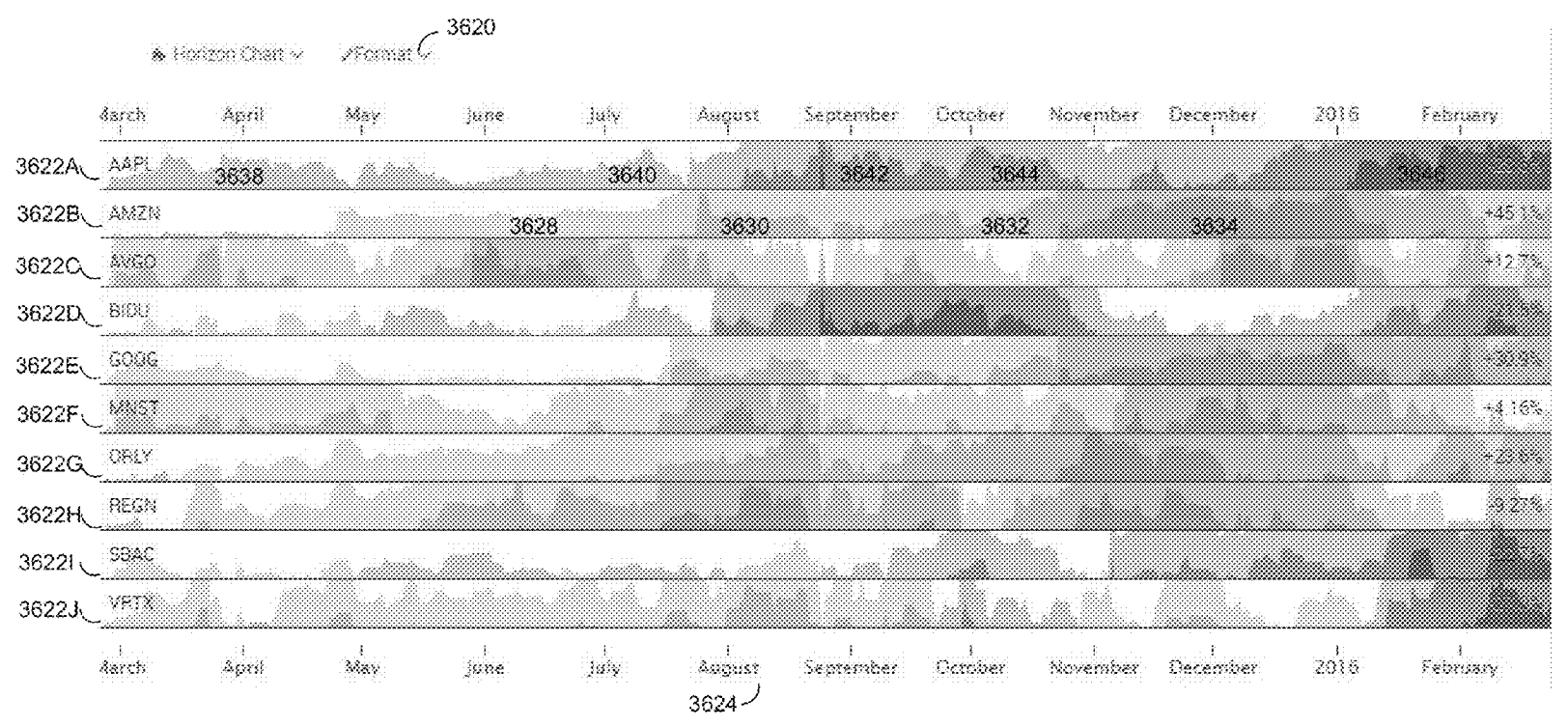

FIG. 37 illustrates an example of a visualization tab displaying horizon charts. The FIG. 3620 can include a plurality of horizon charts 3622A-3622J. Each of the horizon charts 3622A-3622J displays a type of events included in the search results. For example, each horizon chart can display stock price changes for an individual stock as illustrated in FIG. 37.

In some embodiments, the horizon charts can share a horizontal axis as illustrated in FIG. 37. For example, the common horizontal axis 3624 of the horizon charts 3622A-3622J represents a time period (e.g., from March 2015 to March 2016). In some alternative embodiments, each horizon chart can include a separate horizontal axis.

The vertical axis of each horizon chart 3622A-3622J represents the value of the characteristic for the events. For example, the vertical axis of each horizon chart 3622A-3622J represents a percentage change (increase or decrease) of price of an individual stock. In order to save vertical space of the FIG. 3620, values (e.g., stock price changes) that are less than a first threshold are plotted as a first type of band in a first color. In some embodiments, the system automatically determines the value of the first threshold without human intervention. For example, the system determines the first threshold as 30% for the horizon chart 3622B for AMZN stock. Thus, all price increases for less than 30% for the AMZN stock price are plotted as a first type of band in the light blue color, such as band 3628.

Similarly, values (e.g., stock price changes) that are larger than the first threshold and less than a second threshold are plotted as a second type of band in a second color on a background of the first color. The background of the first color suggests that the value has exceeded the first threshold. For example, the system determines the second threshold as 60% for the horizon chart 3622B for AMZN stock. Thus, all price increases for larger than 30% and less than 60% for the AMZN stock price are plotted as a second type of band in the medium blue color with a light blue color background, such as band 3630 and 3632.

Furthermore, values (e.g., stock price changes) that are larger than the second threshold and less than a third threshold can also be plotted as a third type of band in a third color on a background of the second color. The background of the second color suggests that the value has exceeded the second threshold. For example, the system determines the second threshold as 90% for the horizon chart 3622B for AMZN stock. Thus, all price increases for larger than 60% and less than 90% for the AMZN stock price are plotted as a third type of band in the dark blue color with a medium blue color background, such as band 3634.

A horizon chart can have any suitable number of types of bands. For example, a horizon chart similar to the horizon chart 3622B can have more than three types of bands with different colors.

Furthermore, a horizon charts can use different colors to differentiate between positive and negative values. For example, the horizon chart 3622B uses light blue, medium blue and dark blue colors to represent stock price percentage increases (positive), and uses a light red color to represent stock price percentage decreases (negative) less than 30%. Since different colors are used for positive and negative values, the bands for negative values do not need to be opposite to the bands for positive values for differentiation purpose.

Similarly, the system can determine first, second and third thresholds as 10%, 20% and 30% for negative values of the horizon chart 3622A (for AAPL stock). Bands (e.g., 3638 and 3640) in light red color represent stock price decreases of less than 10%. Bands (e.g., 3642 and 3644) in medium red color on a light red color background represent stock price decreases of less than 20% and larger than 10%. Bands (e.g., 3646) in dark red color on a medium red color background represent stock price decreases of less than 30% and larger than 20%.

Figure 38:
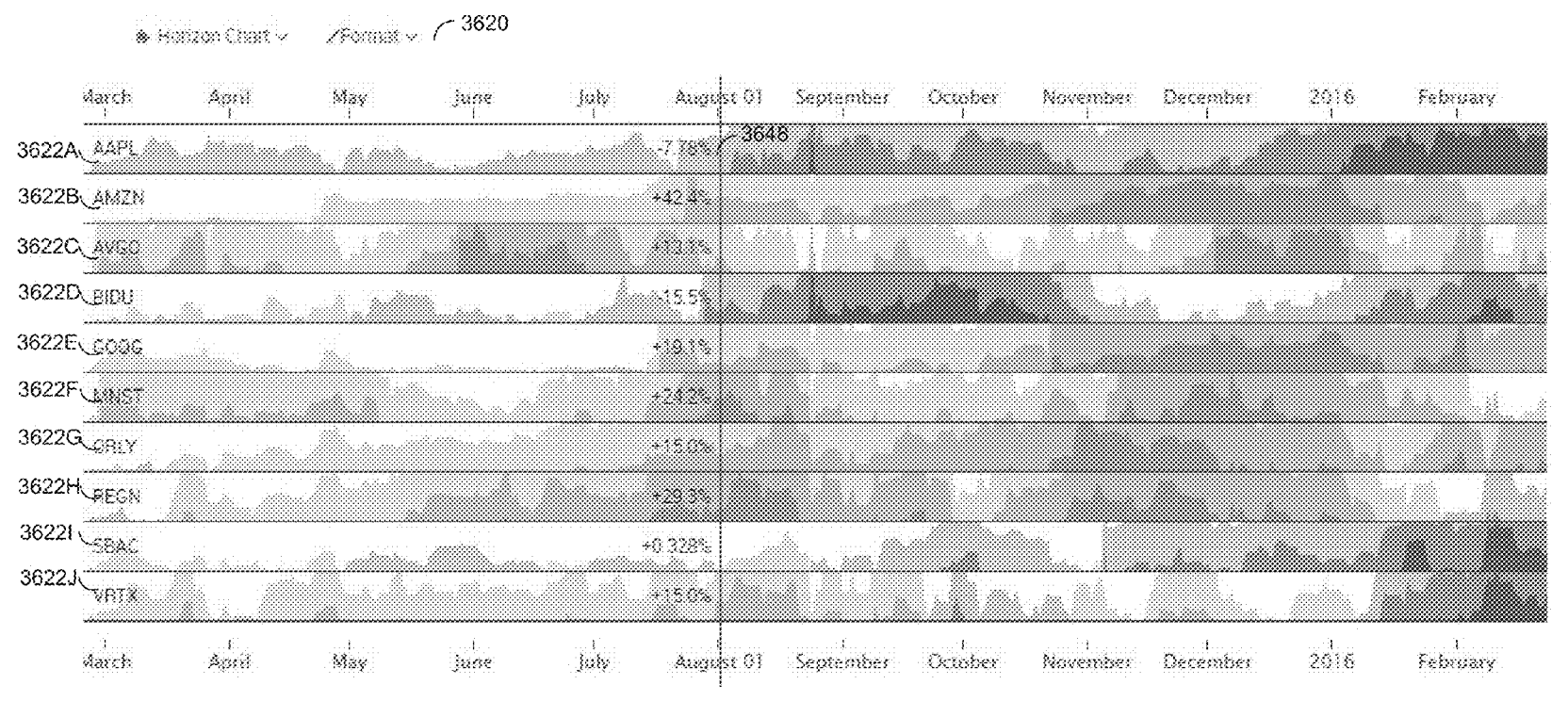

The horizon chart is user-interactive. For example, the user can move a cursor over a horizon chart. In some embodiments, when a user moves a cursor over a band of a specific time point, the visualization tab automatically displays additional information related to the events of the specific time point. FIG. 38 illustrates an example of a horizon chart displaying additional information in response to a user interaction. For example, when a user moves a cursor over a band of horizon chart 3622A at a location 3648 corresponding to the stock price change of AAPL on a specific time point (e.g., Aug. 1, 2015), the visualization tab displays a vertical line representing the position of the cursor on the horizon chart 3622A and displays the value (−7.78%) of the stock price percentage change of AAPL on Aug. 1, 2015. For a figure including multiple horizon charts that share a common horizontal axis such as FIG. 3620, the visualization tab can simultaneously display values for the multiple horizon charts at a specific time point, as illustrated in FIG. 38.

Figure 39:
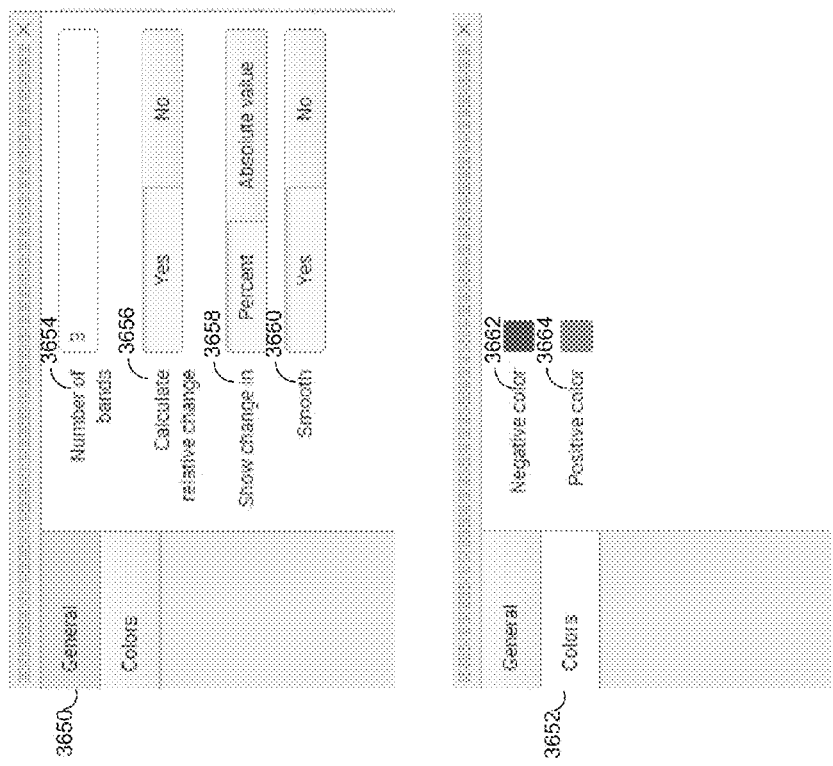
FIG. 39 illustrates an example of a visualization format interface for a horizon chart.

A user may change the format of the horizon chart. FIG. 39 illustrates an example of a visualization format interface for a horizon chart. The visualization form interface includes a "General" tab 3650 and a "Colors" tab 3652. The "General" tab 3650 includes a "Number of bands" text field 3654. The user can specify the total number of types of bands by inputting the number in the text field 3654. For example, if a user enters "5" in the text field 3654, the horizon chart 3622B can display 5 types of bands of different colors for the stock price increases.

The "General" tab 3650 includes a "Calculate relative change" radio button 3656 with two options "Yes" and "No." If the user chooses "Yes," the horizon chart displays percentage changes of the values (e.g., percentage changes of the stock prices). If the user chooses "No," the horizon chart displays the values themselves (e.g., the stock prices).

The "General" tab 3650 includes a "Show change" radio button 3658 with two potions "Percent" and "Absolute value." If the user chooses "Percent," the horizon chart displays percentage changes of the values (e.g., percentage changes of the stock prices). If the user chooses "Absolute value," the horizon chart displays absolute values of the changes of the values themselves (e.g., absolute values of the changes of the stock prices).

The "General" tab 3650 includes a "Smooth" radio button 3660 with two potions "Yes" and "No." If the user chooses "Yes," the horizon chart applies a smoothing function to the bands so that the bands appear smoother. If the user chooses "No," the horizon chart does not apply any smoothing function.

The "Colors" tab 3652 includes a "Negative color" option 3662 and a "Positive color" option 3664. The user can click the "Negative color" option 3662 or the "Positive color" option 3664 to pick a particular color for the negative or positive bands. The user can even enter a HEX value of the color code to specify a color for positive or negative bands. In some embodiments, the system, adapting the static library of software code, automatically chooses different shades of the color picked by the user for the different types of bands, without human intervention.

A user can drag a cursor over a horizon chart to select a subset of the search results and the visualization tab can then visualize of the subset (e.g., using another horizon chart). For example, a user can drag a cursor over the horizon chart 3622A to select the stock AAPL over a time period from June 2015 to December 2015. In response, the visualization tab can generate a new horizon chart to display the stock price changes of stock AAPL for the selected time period. The process of visualizing a user-selected subset of event is referred to as "drill down."

Timeline Visualization

The data intake and query system can use the real-time updated event data of the search results to generate a user-interactive "timeline" chart (also referred to as simply "timeline") as a visualization of a chart indicative of data. The data intake and query system can generate the timeline chart by adapting a static library of software code, which in some embodiments is an open source library.

A timeline chart, as the term is used herein, is a chart showing a characteristic of the events over time. A horizontal axis of the chart denotes the time. The timeline chart can include multiple objects such as dots and bars. The lengths of the objects represents durations of the events (or collections of events). In some embodiments, the colors of the objects represent certain characteristics of the events.

Figure 40:
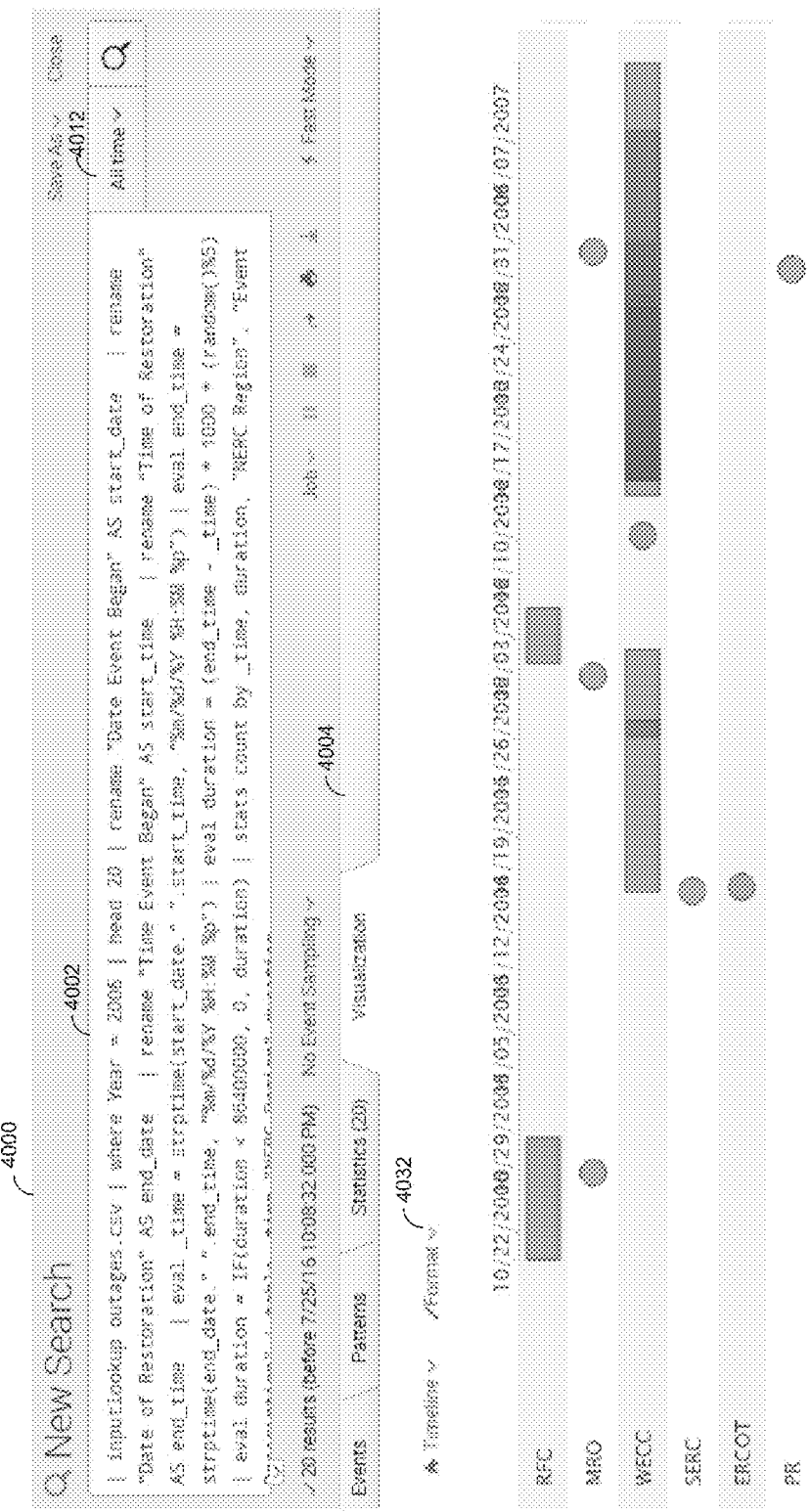
FIG. 40 illustrates an example of a search screen of a search GUI for a timeline chart.

FIG. 40 illustrates an example of a search screen of a search GUI for a timeline chart. The search screen 4000 can be generated by, e.g., the search head of the data intake and query system as illustrated in FIG. 2C. The search screen 4000 includes a search bar 4002 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 4000 also includes a time range picker 4012 that enables the user to specify a time range for the search. The time range picker 4012 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 4000 displays the results through search results section 4004, wherein search results section 4004 includes: an "Events tab" that displays various information about events returned by the search; a "Statistics tab" that displays statistics about the search results; and a "Visualization tab" that displays various visualizations of the search results.

Figure 41:
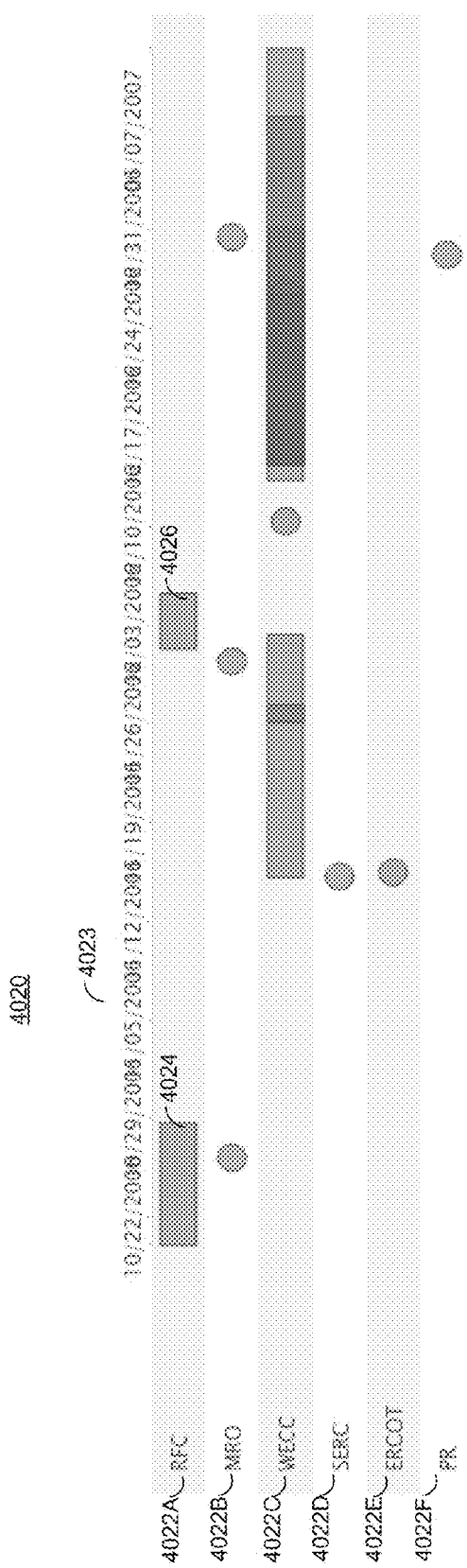
FIG. 41 illustrates an example of a visualization tab displaying timeline charts.

FIG. 41 illustrates an example of a visualization tab displaying timeline charts. The FIG. 4020 can include a plurality of timeline charts 4022A-4022F. Each of the timeline charts 4022A-4022F displays a type of events included in the search results. For example, each timeline chart can display weather events that occurred in an individual region defined by the North American Electric Reliability Corporation (NERC) authority, illustrated in FIG. 41.

In some embodiments, the timeline charts can share a horizontal axis as illustrated in FIG. 41. For example, the common horizontal axis 4023 of the timeline charts 4022A-4022F represents a time period (e.g., from 2006 to 2007). In some alternative embodiments, each timeline chart can include a separate horizontal axis.

The horizontal axis 4023 denotes the time. Each timeline chart can include multiple objects such as dots and bars. For example, the time line chart 4022A for RFC region includes a bar 4024 and a bar 4026. The lengths of the objects are indicative of durations of events.

Figure 42:
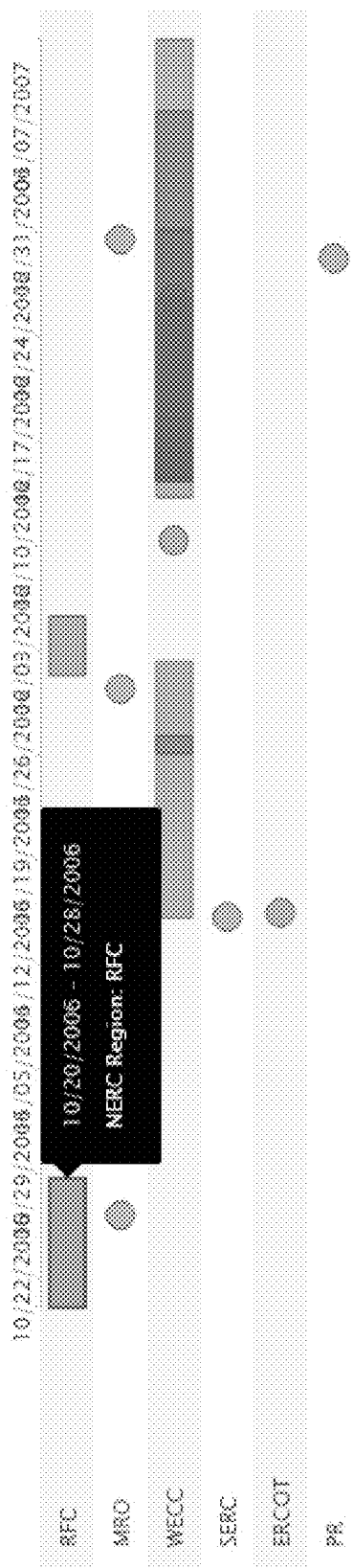
FIG. 42 illustrates an example of a timeline chart showing additional information in response to a user interaction.

The timeline chart is user-interactive. For example, the user can move a cursor over an object (e.g., a dot or a bar), or click an object. In some embodiments, when a user moves a cursor over an object of a timeline chart, the visualization tab automatically displays additional information related to the dot. FIG. 42 illustrates an example of a timeline chart showing additional information in response to a user interaction. As illustrated in FIG. 42, for example, in response to a user input of moving a cursor over a bar 4024, the visualization tab can generate an information block (also referred to as hovering window) that includes the time period of the event (e.g., Oct. 20, 2006-Oct. 28, 2006) and the region where the even occurred (e.g., RFC region).

In some other embodiments, the visualization tab can provide other information in response to a user input. For example, the visualization tab can generate an information block (also referred to as hovering window) to display the type of the event such as a type of the weather event (e.g., wet snow or wind storm).

Figure 43:
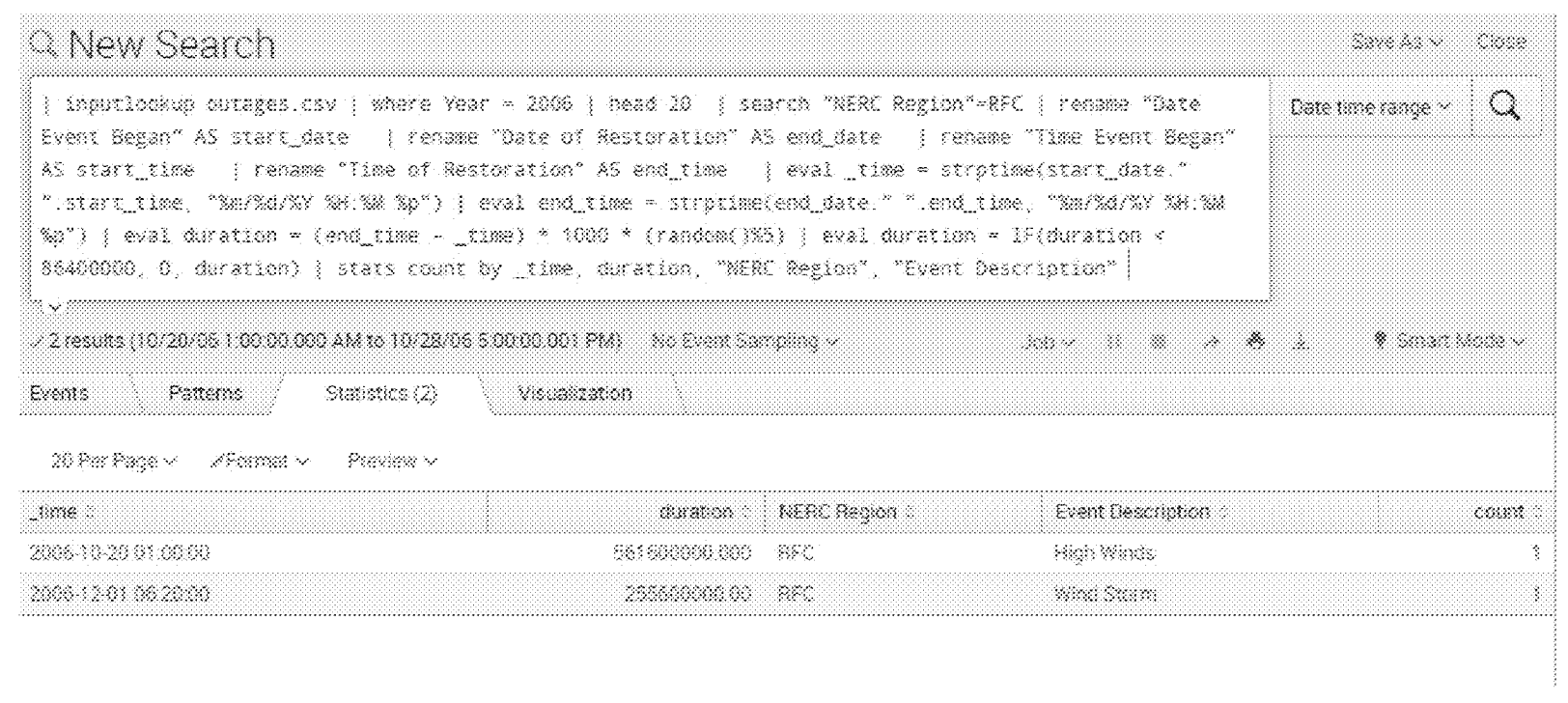

If a user clicks a particular object of a timeline chart, the search screen can display an "Events" tab or a "Statistics" tab summarizing the events corresponding to that object. FIG. 43 illustrates an example of a statistics tab for a timeline chart. The statistics tab illustrated in FIG. 43 shows relevant statistics regarding the events corresponding to the clicked object, such as timestamp of the events, time durations of the events, NERC regions where the events occurred, descriptions of the events, counts of the event occurrences, etc.

Figure 44:
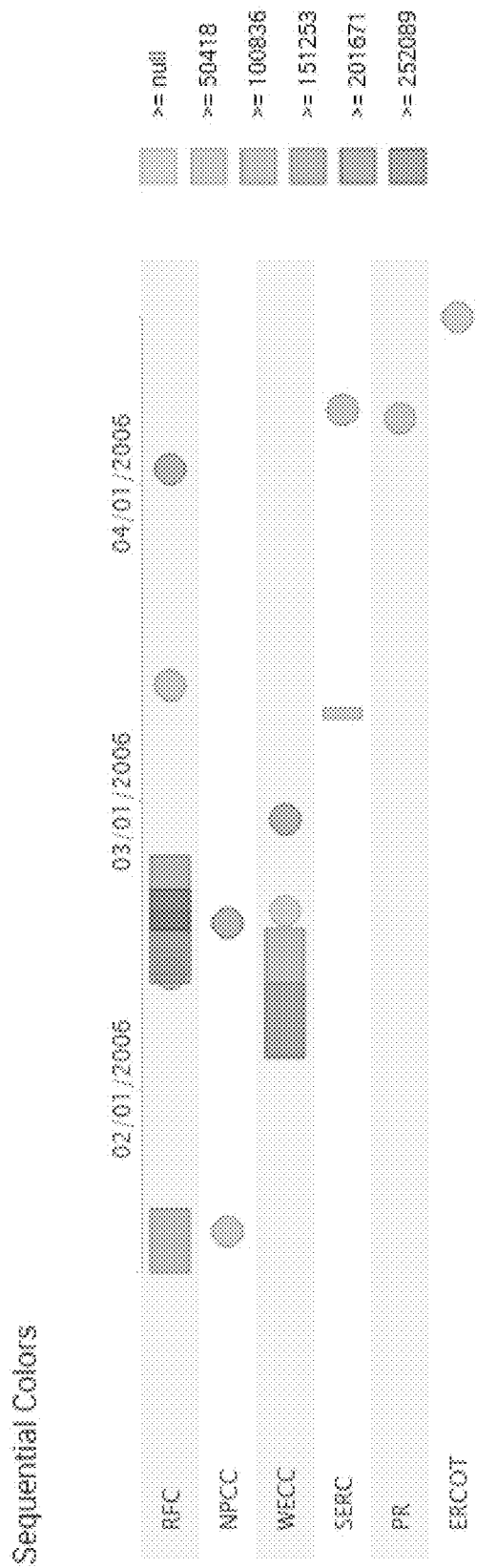
FIG. 44 illustrates an example of a visualization of a timeline chart with colors.

In addition to the lengths of the objects, the timeline chart can further use colors to denote another characteristic of the events. FIG. 44 illustrates an example of a visualization of a timeline chart with colors. The lengths of the objects denote the time durations of the events (or collections of events) represented by the objects. The colors of the objects can be used to denote data ranges (called sequential coloring), e.g., the number of households affected by the weather event (or a collection of multiple weather events). For example, as illustrated in FIG. 44, different colors are used to denote events with different numbers of affected households. The ranges of numbers of affected households are divided by different numbers, e.g., 50418, 100836, 151253, 201671, 252089. In some embodiments, the system, adapting the static library of software code, automatically chooses colors of the objects or corresponding value ranges of the characteristic based on the data of the event, without human intervention.

Figure 45:
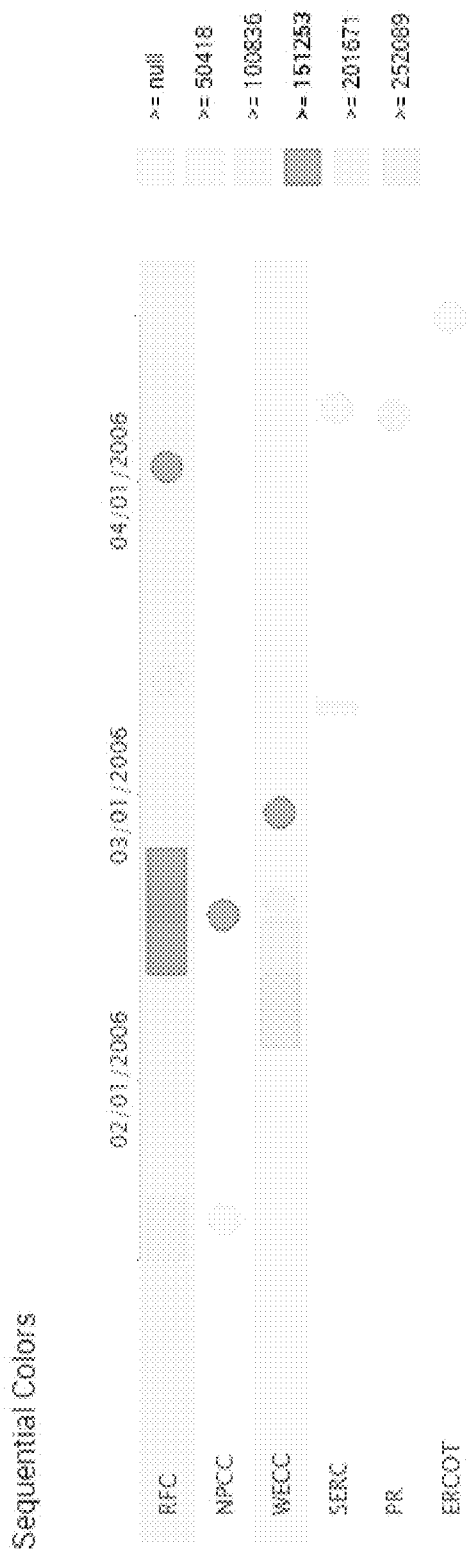
FIG. 45 illustrates an example of a visualization of a timeline chart with colors in response to a user input.

In some embodiments, when a user moves a cursor over a colored object in the legend section, the timeline chart can change the appearance of the timeline chart (and other relevant timeline charts in the same figure). FIG. 45 illustrates an example of a visualization of a timeline chart with colors in response to a user input. The legend section 4028 of the timeline chart includes colored objects and the associated value ranges. When a user moves a cursor over, e.g., the red object in the legend section 4028, the visualization tab changes appearance of the timeline charts. For example, as illustrated in FIG. 45, FIG. 4020 emphasizes the objects with red colors by removing (or fading) other objects with colors different from the red color. Similarly, if the user moves the cursor over the orange object, FIG. 4020 emphasizes the orange objects by removing non-orange objects illustrated in FIG. 45.

Figure 46:
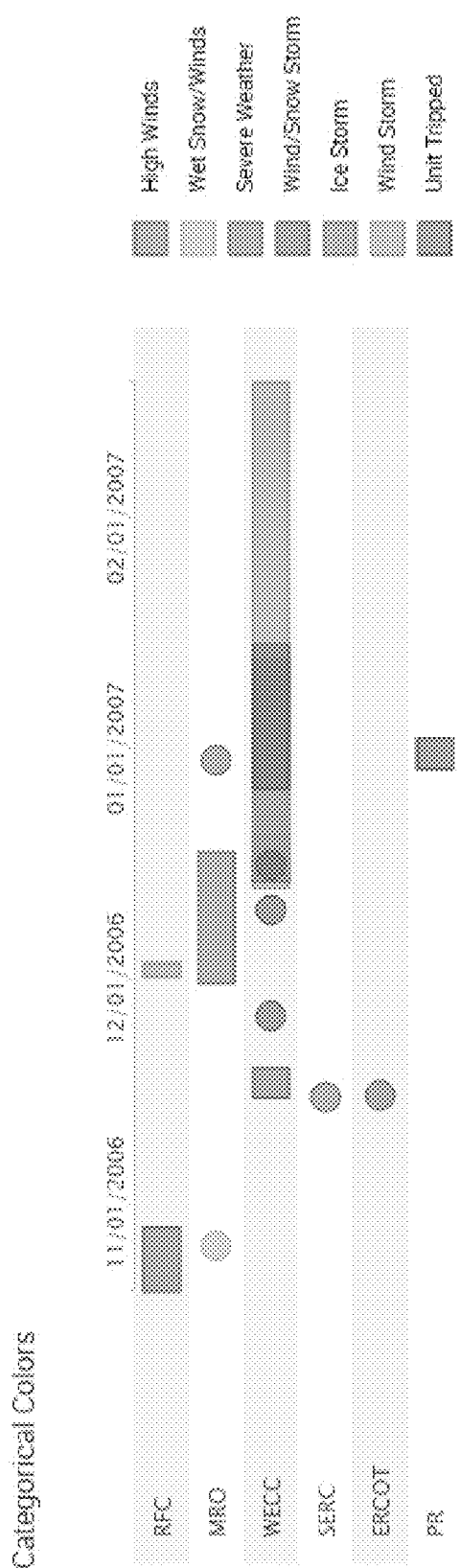
FIG. 46 illustrates another example of a visualization of a timeline chart with colors.

FIG. 46 illustrates another example of a visualization of a timeline chart with colors. The colors of the objects can be used to denote categories (called categorical coloring), e.g., types of weather events represented by the objects. For example, as illustrated in FIG. 46, blue objects represent high wind events. Purple objects represent wind storms or snow storms. Green objects represent ice storms.

In some embodiments, the system, adapting the static library of software code, automatically chooses colors of the objects and corresponding categories based on the data of the event, without human intervention. The timeline chart can also use different textual objects (e.g., words or phrases) extracted from the event data as categories.

Figure 47:
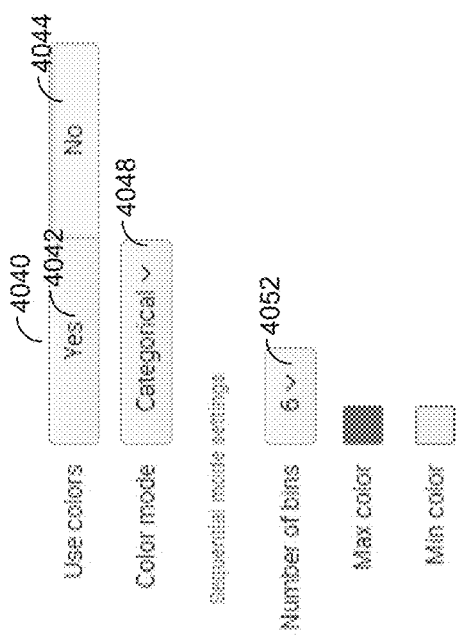
FIG. 47 illustrates an example of a visualization format interface for a timeline chart.

A user may choose between sequential coloring and categorical coloring. For example, a user can click a "format" button 4032 (as illustrated in FIG. 40). In response, the visualization tab can display a visualization format interface. FIG. 47 illustrates an example of a visualization format interface for a timeline chart. The visualization format interface 4040 includes a "Yes" button 4042 and a "No" button 4044. When a user clicks the "No" button 4044, the visualization tab renders the objects of the timeline chart using a single color (e.g., as illustrated in FIG. 41). When a user clicks the "yes" button 4042, the visualization tab renders the objects of the timeline chart using different colors (e.g., as illustrated in FIGS. 44 and 46).

The visualization format interface 4040 further includes a "color mode" drop-down menu 4046, which includes a "Categorical" element 4048 and a "Sequential" element 4050 (not shown). When a user selects the "Categorical" element 4048, the visualization tab renders colors of the objects of the timeline chart to denote categories (categorical coloring) as illustrated in FIG. 46. When a user selects the "Sequential" element 4050, the visualization tab renders colors of the objects of the timeline chart to denote data ranges (sequential coloring) as illustrated in FIG. 44.

The visualization format interface 4040 also includes "Number of bins" drop-down menu 4052. A user can use the menu 4052 to specify the total numbers of different colors for displaying the objects of the timeline chart.

A user can select a subset of the search results and the visualization tab can then visualize of the subset (e.g., using another timeline chart). Referring back to FIG. 41, a user can click the bar 4024 to select the weather events corresponding to the bar 4024. In response to the user selection, the visualization tab can generate a new timeline chart to visualize the event data for the selected events corresponding to the clicked bar 4024. The process of visualizing a user-selected subset is referred to as "drill down." In some embodiments, the system automatically selects ranges of the horizontal axis of the new timeline chart without human intervention.

Treemap Visualization

The data intake and query system can use the real-time updated event data of the search results to generate a user-interactive "treemap" chart (also referred to as simply "treemap") as a visualization of a chart indicative of data. The data intake and query system can generate the treemap by adapting a static library of software code, which in some embodiments is an open source library.

A treemap, as the term is used herein, is a figure displaying hierarchical (e.g., tree-structured) data by using nested rectangles (or other types of objects). In the tree map, each branch of a tree structure is represented by a rectangle. The rectangle in turn includes smaller rectangles representing sub-branches. In some embodiments, an area of a rectangle is indicative of a specific characteristic of data (or events) corresponding to that rectangle. For example, the rectangles can represent computer files or computer directories. The areas of the rectangles are indicative of the sizes of the computer files or computer directories.

Figure 48:
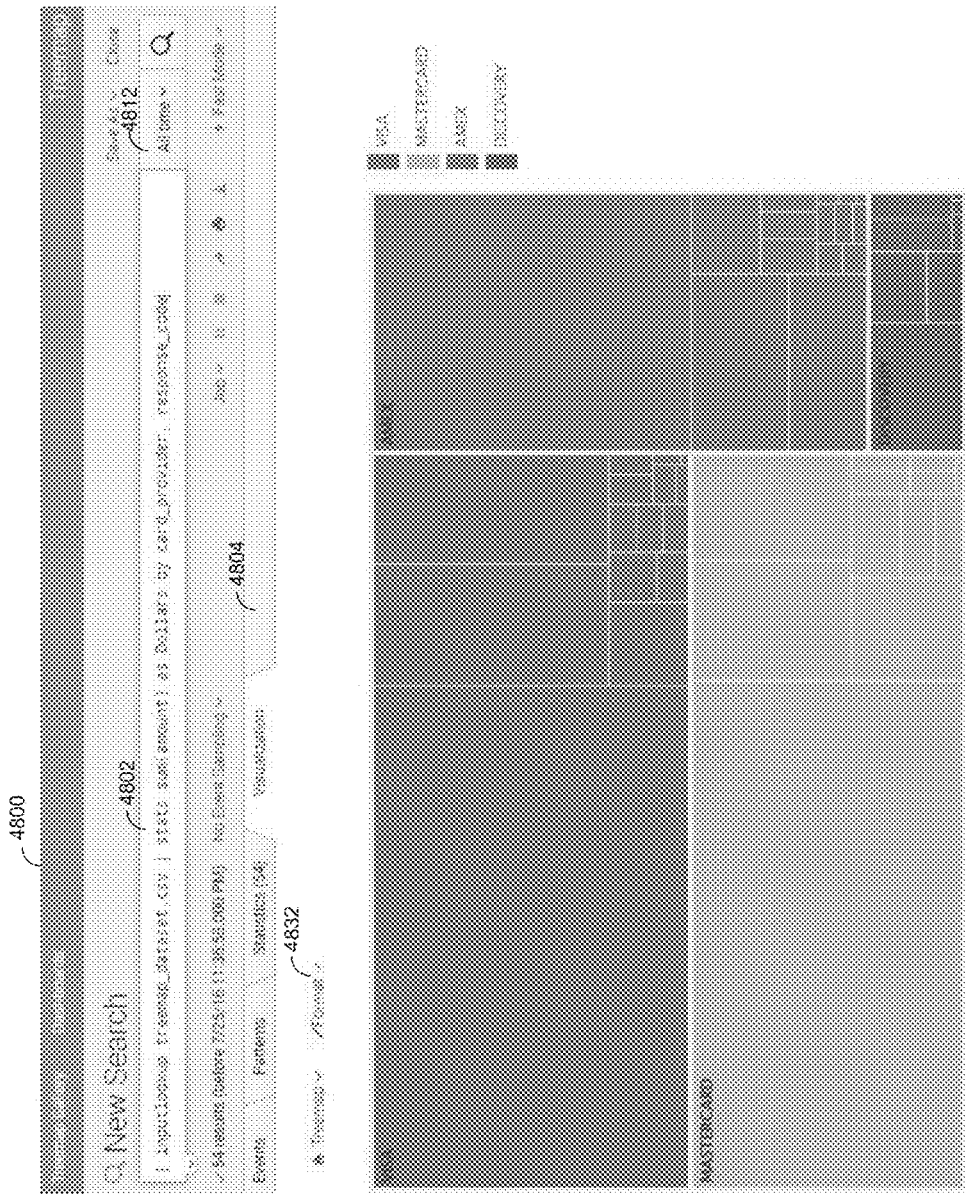
FIG. 48 illustrates an example of a search screen of a search GUI for a treemap.

FIG. 48 illustrates an example of a search screen of a search GUI for a treemap. The search screen 4800 can be generated by, e.g., the search head of the data intake and query system as illustrated in FIG. 2C. The search screen 4800 includes a search bar 4802 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 4800 also includes a time range picker 4812 that enables the user to specify a time range for the search. The time range picker 4812 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 4800 displays the results through search results section 4804, wherein search results section 4804 includes: an "Events tab" that displays various information about events returned by the search; a "Statistics tab" that displays statistics about the search results; and a "Visualization tab" that displays various visualizations of the search results (e.g., a treemap).

Figure 49:
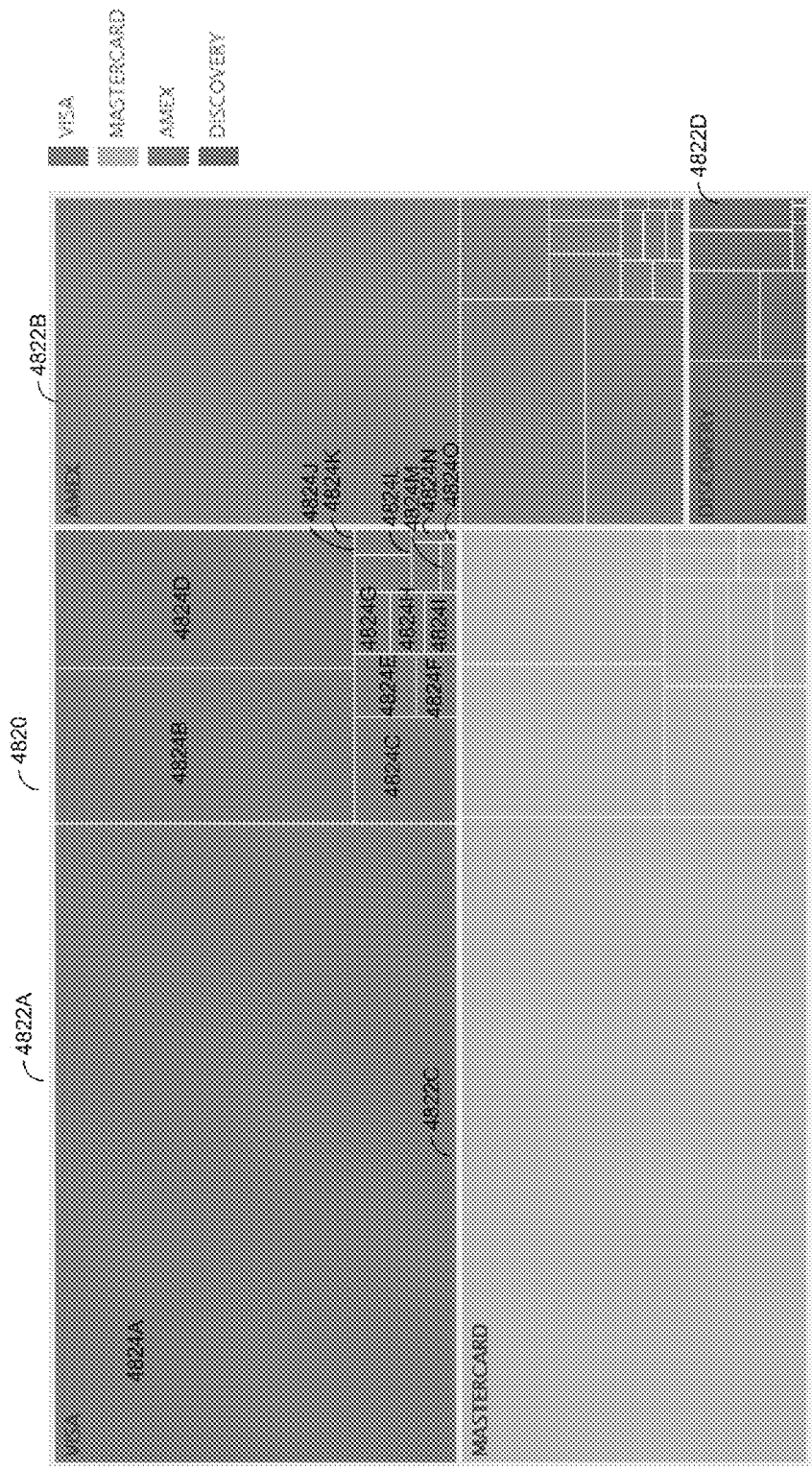
FIG. 49 illustrates an example of a visualization tab displaying a treemap.

FIG. 49 illustrates an example of a visualization tab displaying a treemap. The treemap 4820 can include a plurality of first-level rectangles 4822A-4822D. Each of the first-level rectangles 4822A-4822D represents events with a different characteristic of a first level. For example, the first-level rectangles 4822A-4822D can represent credit card transactions involving VISA® cards, MASTERCARD® cards, AMEX® cards, and Discovery® cards respectively.

Each first-level rectangle is displayed using a unique color. Although the treemap 4820 includes rectangles, other treemaps can include other types of objects with different shapes.

Each of the first-level rectangles 4822A-4822D further includes a plurality of second-level rectangles. For example, the first-level rectangles 4822A includes second-level rectangles 4824A-4824O. Each of the second-level rectangles 4824A-4824O represents events with a different characteristic of a second level. For example, the second-level rectangles 4824A represents VISA card transactions that are approved. The second-level rectangles 4824B represents VISA card transactions that the payer account does not have sufficient funds. The second-level rectangles 4824C represents VISA card transactions involving incorrect PINs (personal identification numbers).

An area of a rectangle is indicative of a specific characteristic of data (or events) corresponding to that rectangle. For example, as illustrated in FIG. 49, an area of a rectangle (either a first-level rectangle or a second-level rectangle) is indicative of (e.g. proportionate to) a total dollar amount of the credit card transactions represented by the rectangle.

Figure 50:
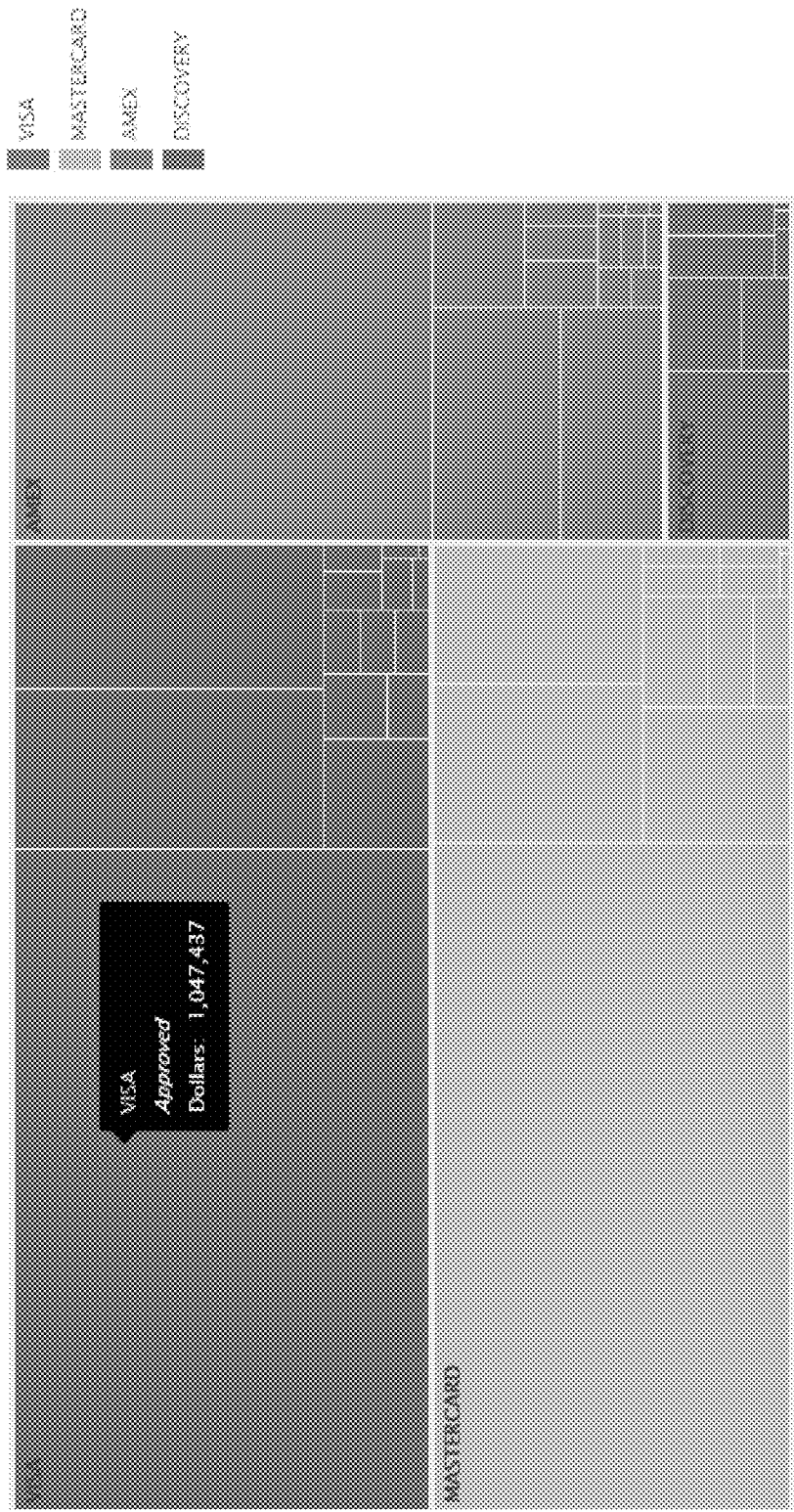
FIG. 50 illustrates an example of a treemap showing additional information in response to a user interaction.

The treemap is user-interactive. For example, the user can move a cursor over a rectangle, or click a rectangle. In some embodiments, when a user moves a cursor over a rectangle of a treemap, the visualization tab automatically displays additional information related to the rectangle. FIG. 50 illustrates an example of a treemap showing additional information in response to a user interaction. As illustrated in FIG. 50, for example, in response to a user input of moving a cursor over a second-level rectangle 4824A, the visualization tab can generate an information block (also referred to as hovering window) that includes, e.g., the characteristic of the first level (e.g., VISA), the characteristic of the second level (e.g., approved transactions), the total dollar amount of the transaction represented by the rectangle, etc.

A user can select a subset of the search results and the visualization tab can then visualize of the subset (e.g., using another treemap). For example, if a user clicks a first-level rectangle (or any second-level rectangle within the first-level rectangle), the visualization tab can generate another treemap display data or events represented by that first-level rectangle. The process of visualizing a user-selected subset is referred to as "drill down."

Figure 51:
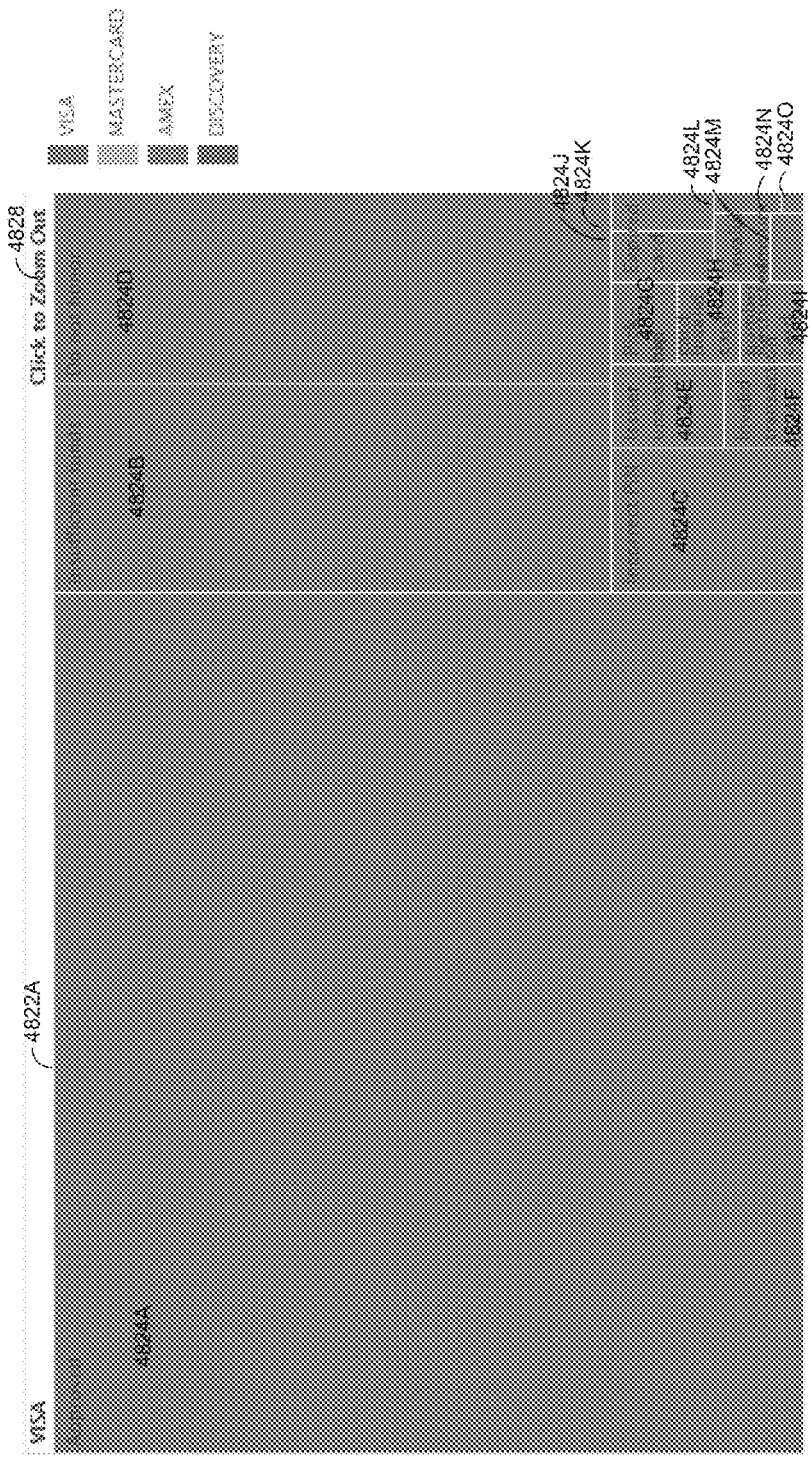
FIG. 51 illustrates an example of a treemap displaying second-level rectangles.

Referring back to FIG. 49, a user can select a subset of events by clicking the first-level rectangle 4822A. In response to the user selection, the visualization tab can generate a new treemap to visualize the VISA credit card transactions represented by the first-level rectangle 4822A. FIG. 51 illustrates an example of a treemap displaying second-level rectangles. The treemap displays second-level rectangles 4824A-4824O that include descriptions of the characteristic of the second level, such as "Approved," "Insufficient funds," "Incorrect PIN," etc. The user can click the "Zoom Out" link 4828 leading back to the treemap displaying the first-level rectangles (e.g., the treemap 4820 as illustrated in FIG. 49).

Figure 52:
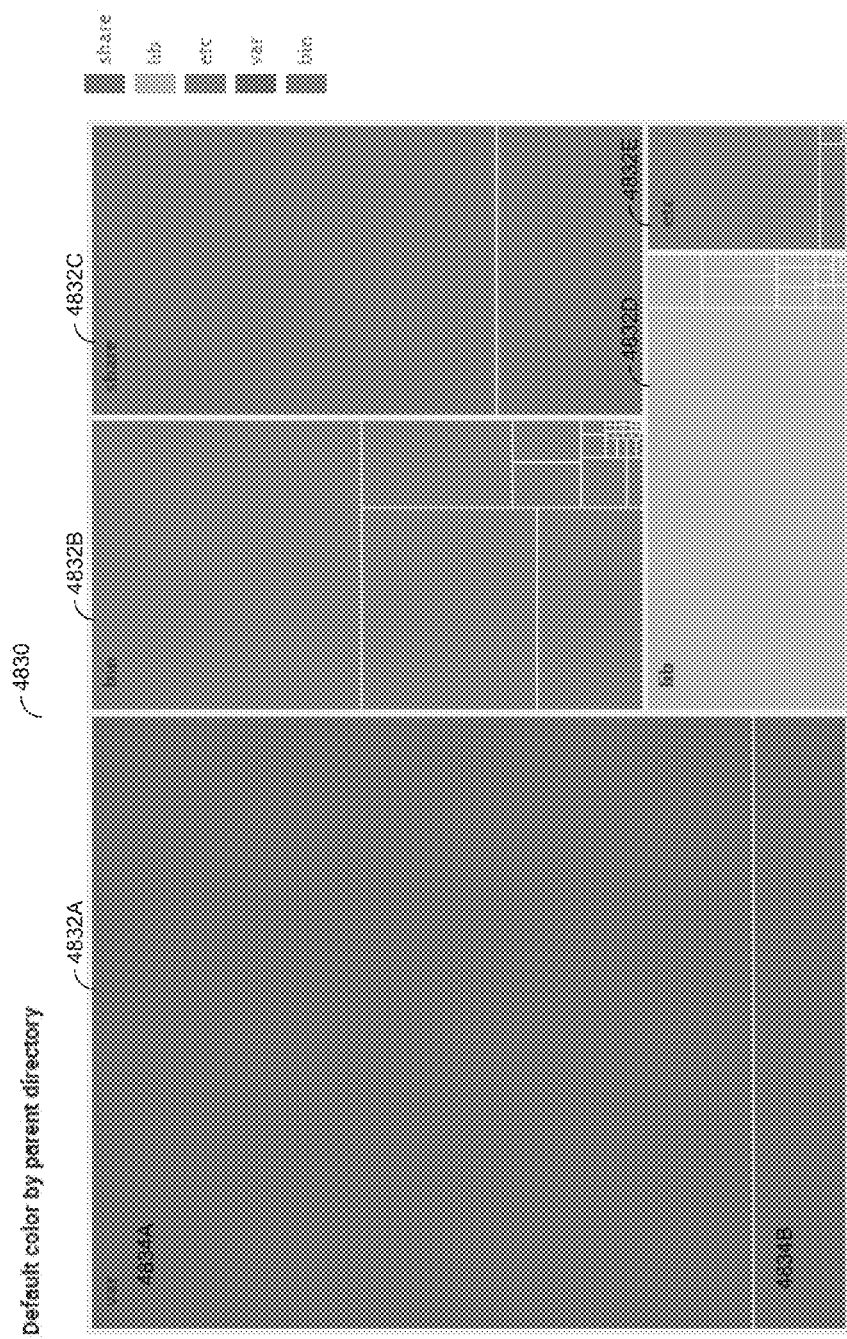
FIG. 52 illustrates another example of a visualization tab displaying a treemap.

FIG. 52 illustrates another example of a visualization tab displaying a treemap. The treemap 4830 can include a plurality of first-level rectangles 4832A-4832E. Each of the first-level rectangles 4832A-4832E represents a computer directory of a first level (e.g., top level directories). Each first-level rectangle is displayed using a unique color. An area of a first-level rectangle is indicative of (e.g. proportionate to) a total size of files and directories included in the corresponding first-level directory.

Each of the first-level rectangles 4832A-4832E further includes a plurality of second-level rectangles. For example, the first-level rectangles 4822A includes second-level rectangles 4834A-4834B. Each of the second-level rectangles 4834A-4834B represents a sub-directory (i.e., a second-level directory) within the first-level directory represented by the first-level rectangle 4832A. An area of a second-level rectangle is indicative of (e.g. proportionate to) a total size of files and directories included in the corresponding second-level directory. Similarly, a user can click a first-level rectangle to generate a new treemap for the second-level directories (or files) within the corresponding first-level directory.

Figure 53:
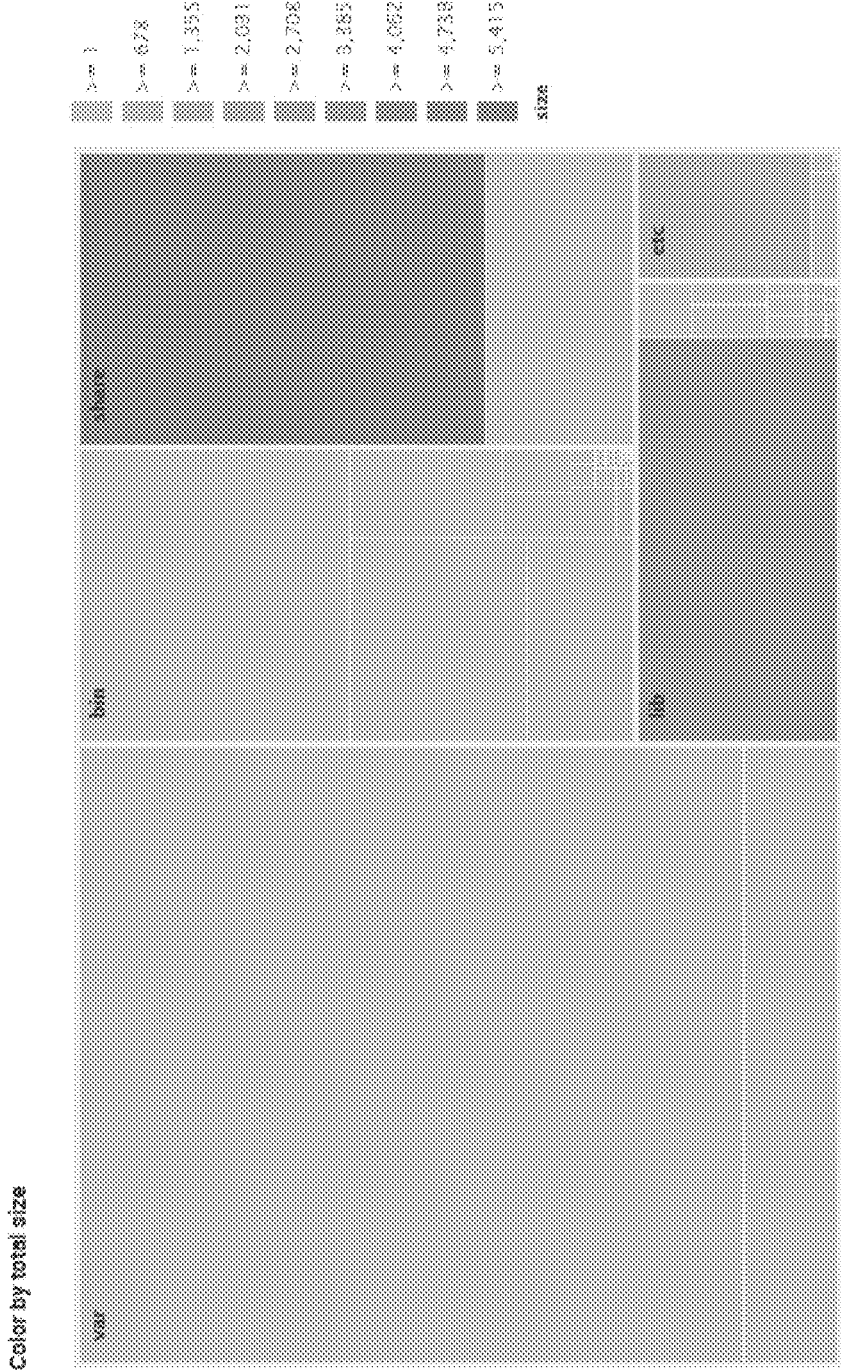
FIG. 53 illustrates an example of a visualization of a treemap with sequential coloring.

In addition to using the colors to denote the characteristic of the first level (e.g., credit card types or first-level directories), the treemap can further use colors to denote another characteristic of the events. FIG. 53 illustrates an example of a visualization of a treemap with sequential coloring. The colors of the rectangles can be used to denote data ranges (called sequential coloring), e.g., the number of files and directories included in a directory. Alternatively, different color intensities can be used to denote the data range as well in the sequential coloring. For example, as illustrated in FIG. 5, different colors are used to denote first-level directories with different number of files and sub-directories. In some embodiments, the system, adapting the static library of software code, automatically chooses colors of the rectangles or corresponding value ranges of the characteristic based on the data of the event, without human intervention.

Figure 54:
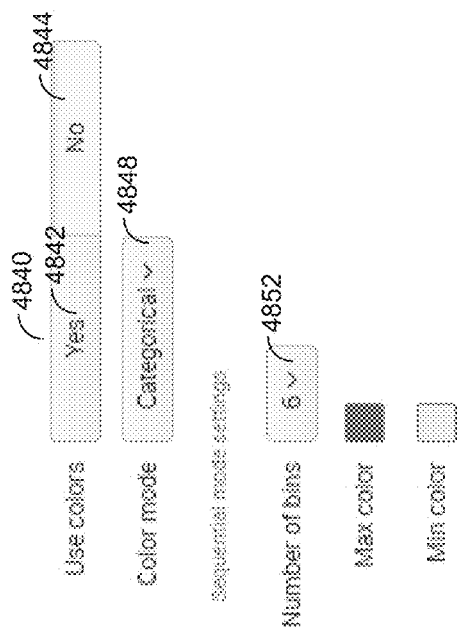
FIG. 54 illustrates an example of a visualization format interface for a treemap.

A user may choose between sequential coloring and categorical coloring. For example, a user can click a "format" button 4832 (as illustrated in FIG. 48). In response, the visualization tab can display a visualization format interface. FIG. 54 illustrates an example of a visualization format interface for a treemap. The visualization format interface 4840 includes a "Yes" button 4842 and a "No" button 4844. When a user clicks the "No" button 4844, the visualization tab renders the rectangles of the treemap using a single color. When a user clicks the "yes" button 4842, the visualization tab renders the rectangles of the treemap using different colors (e.g., as illustrated in FIGS. 52 and 53).

The visualization format interface 4840 further includes a "color mode" drop-down menu 4846, which includes a "Categorical" element 4848 and a "Sequential" element 4850 (not shown). When a user selects the "Categorical" element 4848, the visualization tab renders colors of the rectangles of the treemap to denote categories (categorical coloring) as illustrated in FIG. 52. When a user selects the "Sequential" element 4850, the visualization tab renders colors of the rectangles of the treemap to denote data ranges (sequential coloring) as illustrated in FIG. 53.

The visualization format interface 4840 also includes "Number of bins" drop-down menu 4852. A user can use the menu 4852 to specify the total numbers of different colors for displaying the rectangles of the treemap.

Bullet Graph Visualization

The data intake and query system can use the real-time updated event data of the search results to generate a user-interactive "bullet graph" chart (also referred to as "bullet graph," or "bullet chart") as a visualization of a chart indicative of data. The data intake and query system can generate the bullet graph by adapting a static library of software code, which in some embodiments is an open source library.

A bullet graph, as the term is used herein, is a bar graph showing a primary measure (e.g. a characteristic of one or more events), comparing to one or more data ranges. In some embodiments, the comparison of the primary measure to the data ranges are indicative of qualitative ranges of performance (e.g., poor, satisfactory, and good).

Figure 55:
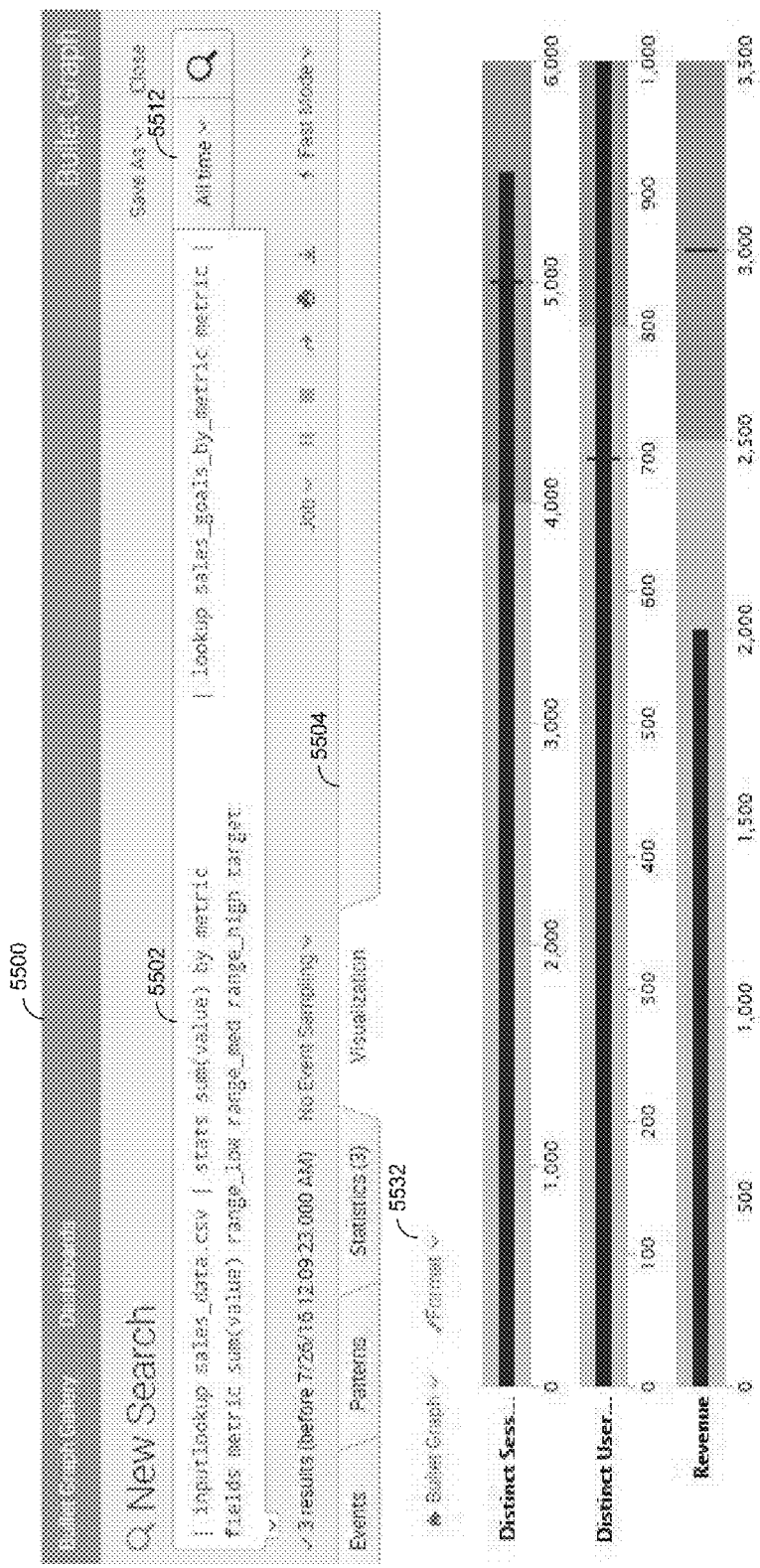
FIG. 55 illustrates an example of a search screen of a search GUI for a bullet graph.

FIG. 55 illustrates an example of a search screen of a search GUI for a bullet graph. The search screen 5500 can be generated by, e.g., the search head of the data intake and query system as illustrated in FIG. 2C. The search screen 5500 includes a search bar 5502 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 5500 also includes a time range picker 5512 that enables the user to specify a time range for the search. The time range picker 5512 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 5500 displays the results through search results section 5504, wherein search results section 5504 includes: an "Events tab" that displays various information about events returned by the search; a "Statistics tab" that displays statistics about the search results; and a "Visualization tab" that displays various visualizations of the search results (e.g., a bullet graph).

Figure 56:
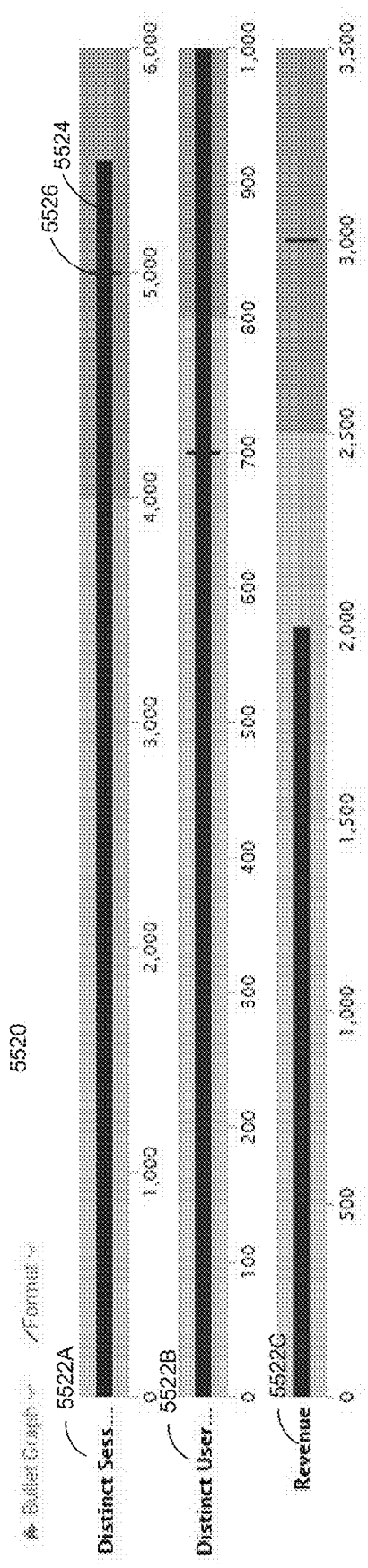
FIG. 56 illustrates an example of a visualization tab displaying bullet graphs.

FIG. 56 illustrates an example of a visualization tab displaying bullet graphs. The FIG. 5520 can include a plurality of bullet graphs 5522A-5522C. Each of the bullet graphs 5522A-5522C displays a type of events included in the search results. For example, bullet graph 5522A displays distinct sessions of sales events. Bullet graph 5522B displays distinct users of the sales events. Bullet graph 5522C displays total revenue of the sales events.

The bullet graph 5522A shows a bar 5524 representing the primary measure of distinct sessions of the sales events. The length of the bar 5524 is indicative of the number of the distinct sessions. The bullet graph 5522A further includes a plurality of data ranges displayed at different shades of grey. A data range of 0-2000 is displayed using a light grey and represents a "poor" range. A data range of 2000-4000 is displayed using a medium grey and represents a "satisfactory" range. A data range of 4000-6000 is displayed using a dark grey and represents a "good" range. Although the bullet graph illustrated includes three data ranges, bullet graph can include any number of data ranges.

The bullet graph 5522A shows that the number of distinctive sessions, represented by the bar 5524 is in the good range. Similarly, the bullet graph 5522B shows that the number of distinct users is in the good range. The bullet graph 5522C shows that the total revenue is in the satisfactory range.

The bullet graph 5522A can further include a goal mark 5526 at 5000. The bar 5524, which crosses the goal mark 5526, suggests that the number of distinctive sessions has exceeded the goal for distinctive sessions. Similarly, the bullet graph 5522B shows that the number of distinct users exceeded the goal for distinctive users. The bullet graph 5522C shows that the total revenue does not exceed the revenue goal.

In some embodiments, the bullet graphs within a figure can share a horizontal axis. In some alternative embodiments, each bullet graph can include a separate horizontal axis as illustrated in FIG. 56.

The bullet graph can be user-interactive. For example, the user can move a cursor over an object (e.g., a dot or a bar), or click an object. In some embodiments, when a user moves a cursor over an object (e.g., a bar or a data range) of a bullet graph, the visualization tab automatically displays additional information related to the object.

Figure 57:
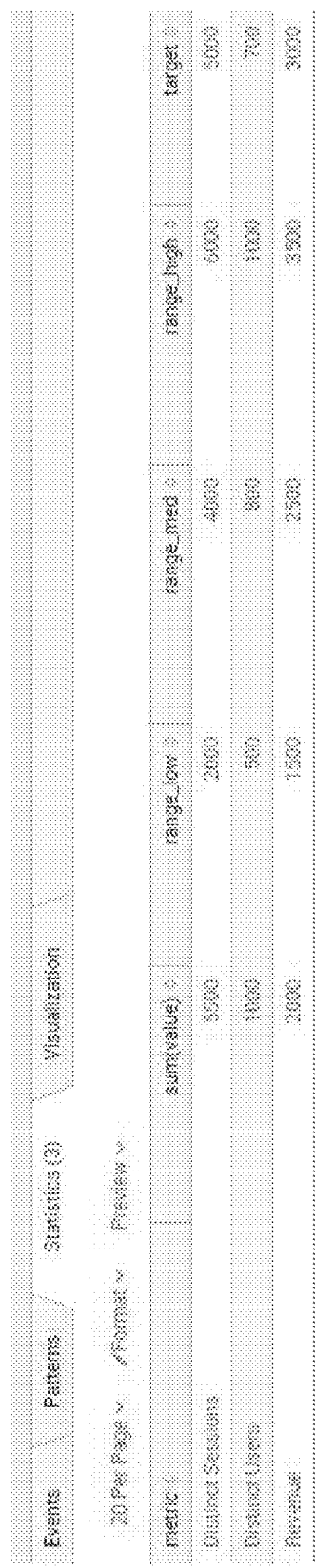
FIG. 57 illustrates an example of a statistics tab for a bullet graph.

If a user clicks a bullet graph, the search screen can display an "Events" tab or a "Statistics" tab summarizing the events corresponding to that object. FIG. 57 illustrates an example of a statistics tab for a bullet graph. The statistics tab illustrated in FIG. 57 shows relevant statistics regarding the events corresponding to the clicked object, such as the name of the primary metric, the value of the primary metric, the threshold values of different data ranges, the value of the goal mark, etc.

In some embodiments, a user can select a subset of the search results and the visualization tab can then visualize of the subset (e.g., using another bullet graph). In response to the user selection, the visualization tab can generate a new bullet graph to visualize the event data for the selected events corresponding to the selected bullet graph. The process of visualizing a user-selected subset is referred to as "drill down." In some embodiments, the system automatically selects threshold values of the data ranges of the new bullet graph without human intervention.

Figure 58:
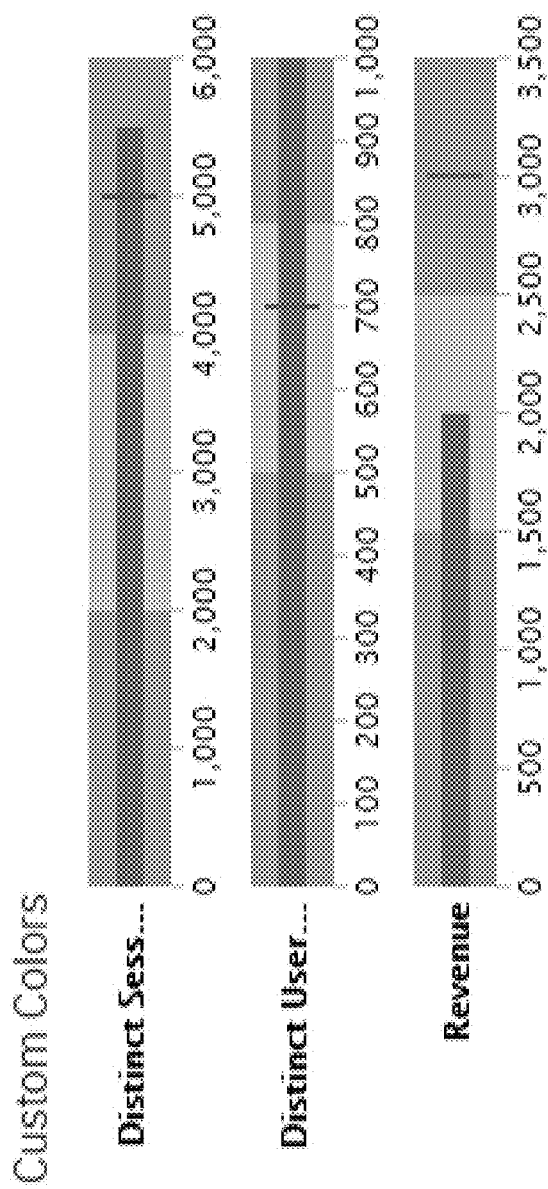
FIG. 58 illustrates an example of a bullet graph with customized colors.
Figure 59:
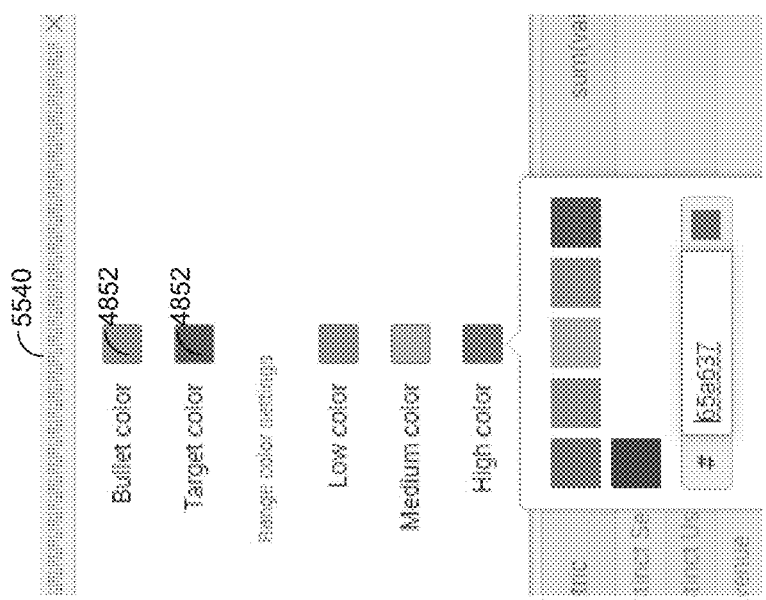
FIG. 59 illustrates an example of a visualization format interface for a bullet graph.

A user can customize a bullet graph by, e.g., specifying the colors of the primary measure bar, data ranges, and the goal mark. FIG. 58 illustrates an example of a bullet graph with customized colors. The visualization tab can provide an interface for specifying the colors. For example, a user can click a "format" button 5532 (as illustrated in FIG. 55). In response, the visualization tab can display a visualization format interface. FIG. 59 illustrates an example of a visualization format interface for a bullet graph. The visualization format interface 5540 includes "Bullet color" button 5542. The user can click the "Bullet color" button 5542 to pick a particular color for the primary measure bar. The user can also enter a HEX value of the color code to specify a color for the primary measure bar.

Similarly, the visualization format interface 5540 includes "Target color" button 5544, "Low color" button 5546, "Medium color" button 5548 and "High color" button 5550 for specifying colors for the goal mark, first data range, second data range and third data range, respectively.

Calendar Heat Map Visualization

The data intake and query system can use the real-time updated event data of the search results to generate a user-interactive "calendar heat map" chart (also referred to as "calendar heat map" or simply "heat map") as a visualization of a chart indicative of data. The data intake and query system can generate the calendar heat map by adapting a static library of software code, which in some embodiments is an open source library.

A calendar heat map, as the term is used herein, is a figure displaying time series of data in a calendar-like manner. For example, the calendar heat map can include a plurality of cluster of blocks. Each cluster represents a month, and each block represents a day. A color of the block is indicative of a characteristic of an event (or a collection of events) occurring during the corresponding day.

Figure 60:
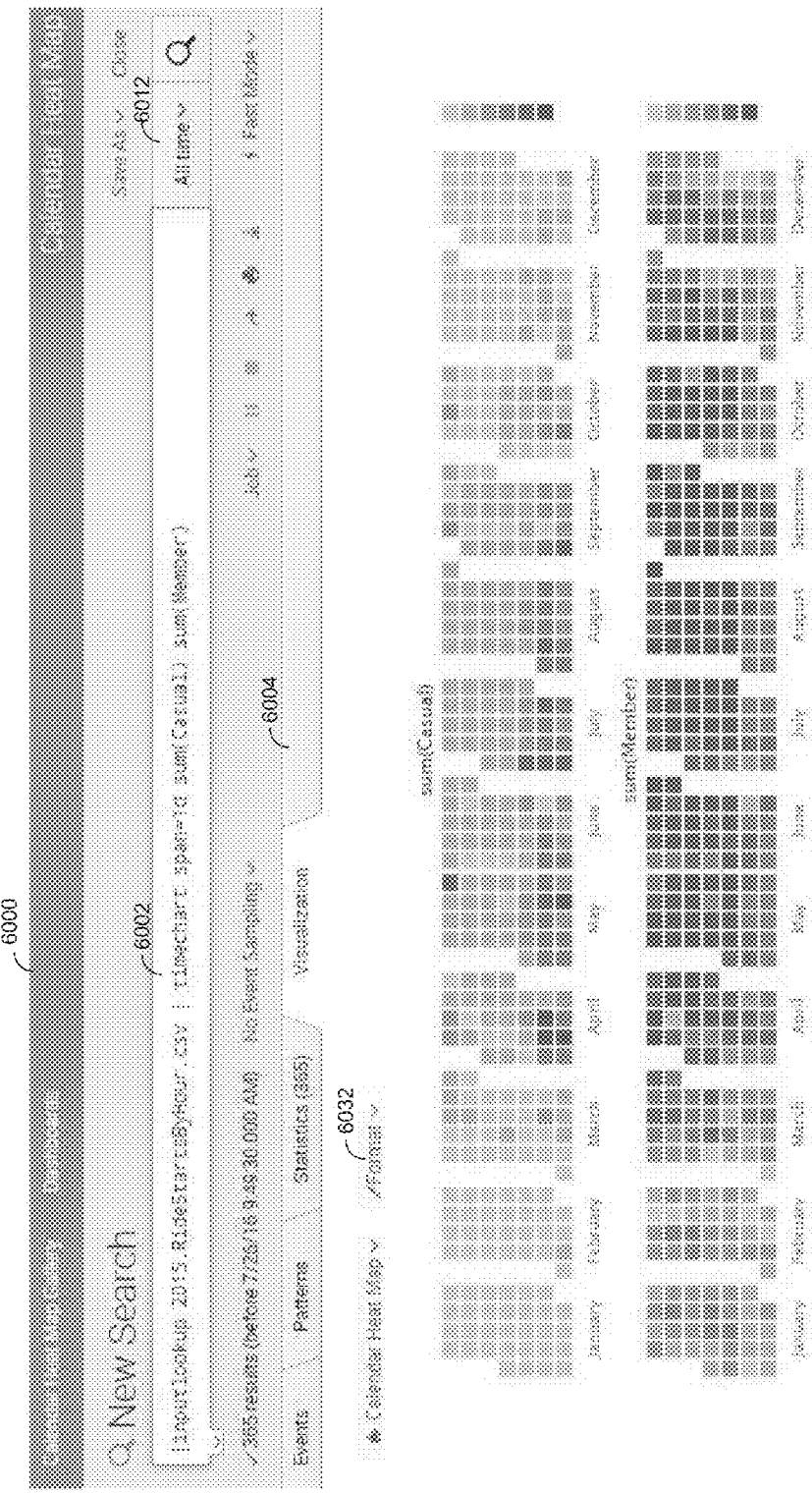
FIG. 60 illustrates an example of a search screen of a GUI for a calendar heat map.

FIG. 60 illustrates an example of a search screen of a GUI for a calendar heat map. The search screen 6000 can be generated by, e.g., the search head of the data intake and query system as illustrated in FIG. 2C. The search screen 6000 includes a search bar 6002 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 6000 also includes a time range picker 6012 that enables the user to specify a time range for the search. The time range picker 6012 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 6000 displays the results through search results section 6004, wherein search results section 6004 includes: an "Events tab" that displays various information about events returned by the search; a "Statistics tab" that displays statistics about the search results; and a "Visualization tab" that displays various visualizations of the search results (e.g., a calendar heat map).

Figure 61:
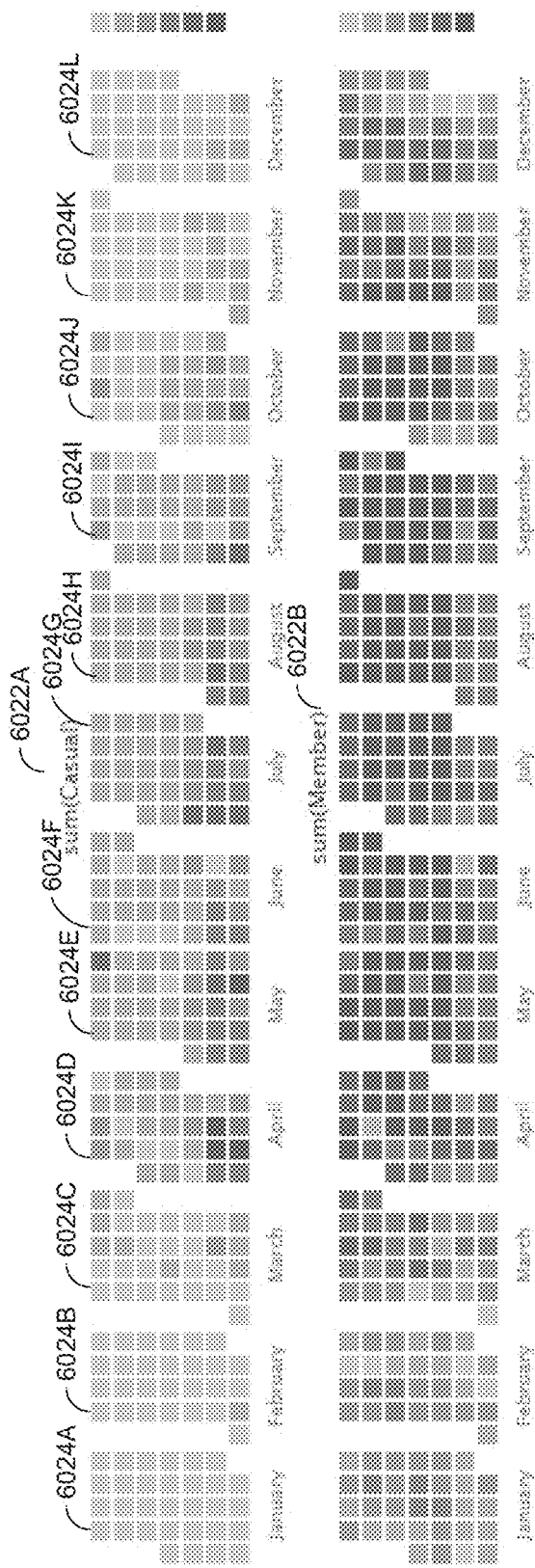
FIG. 61 illustrates an example of a visualization tab displaying calendar heat maps.

FIG. 61 illustrates an example of a visualization tab displaying calendar heat maps. The FIG. 6020 can include a plurality of calendar heat maps 6022A and 6022B. Each of the calendar heat maps 6022A and 6022B displays a type of events included in the search results. For example, calendar heat map 6022A displays bike share events involving casual users. Calendar heat map 6022B displays bike share events involving member users.

The calendar heat map 6022A includes a plurality of clusters 6024A-6024L representing months. Each block within a cluster represents a day within a month. The blocks are displayed using different colors. A color of a block is indicative of a characteristic of one or more events occurring during that day. For example, a color of a block of the calendar heat map 6022A is indicative of a total number of bike share events occurring during that day. The calendar heat map 6022A has five different colors. The darker the color, the higher number of bike share events occurring during that day. In some embodiments, the system, adapting the static library of software code, automatically chooses colors of the blocks or corresponding value ranges of the characteristic based on the data of the event, without human intervention. The calendar heat maps can include shapes other than blocks, such as dots, bars, etc.

Figure 62:
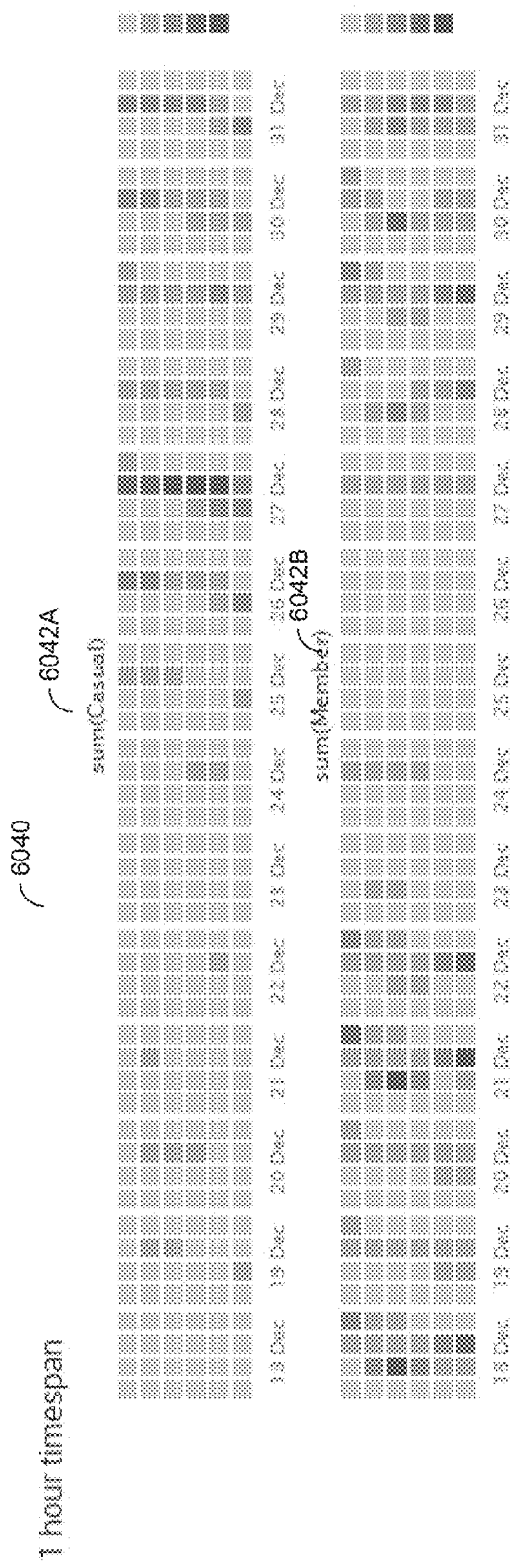
FIG. 62 illustrates another example of calendar heat maps.

The clusters and blocks of a calendar heat map can represent any suitable time periods. For an example, a cluster of blocks can represent a year, a month, a week, a day, an hour etc. Alternatively, a calendar heat map can include just one cluster of blocks for the entire timespan of the calendar heat map. A block can represent a week, a day, an hour, a minute, etc. FIG. 62 illustrates another example of calendar heat maps. The FIG. 6040 includes a calendar heat map 6042A for bike share events involving casual users and a calendar heat map 6042B for bike share events involving member users. Each of the calendar heat maps 6042A and 6042B includes one cluster of blocks. Each block represent one hour of time period (also referred to as one hour timespan). The color of a block is indicative of a total number of bike share events (for casual or member users) occurring during the corresponding one hour time period.

Figure 63:
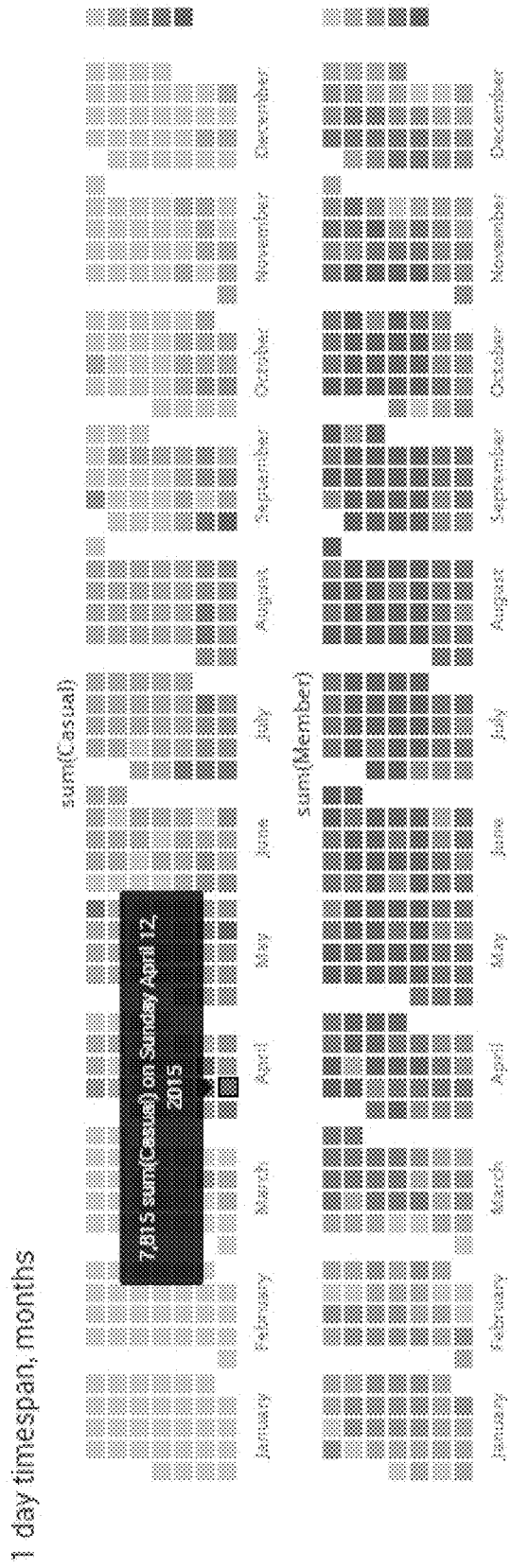
FIG. 63 illustrates an example of a calendar heat map showing additional information in response to a user interaction.

The calendar heat map is user-interactive. For example, the user can move a cursor over a block, or click a block. In some embodiments, when a user moves a cursor over a block of a calendar heat map, the visualization tab automatically displays additional information related to the block. As illustrated in FIG. 63, for example, in response to a user input of moving a cursor over a block, the visualization table generates an information block (also referred to as hovering window) to display relevant information about the block, such as the total number of events involving casual users occurring during that day.

Figure 64:
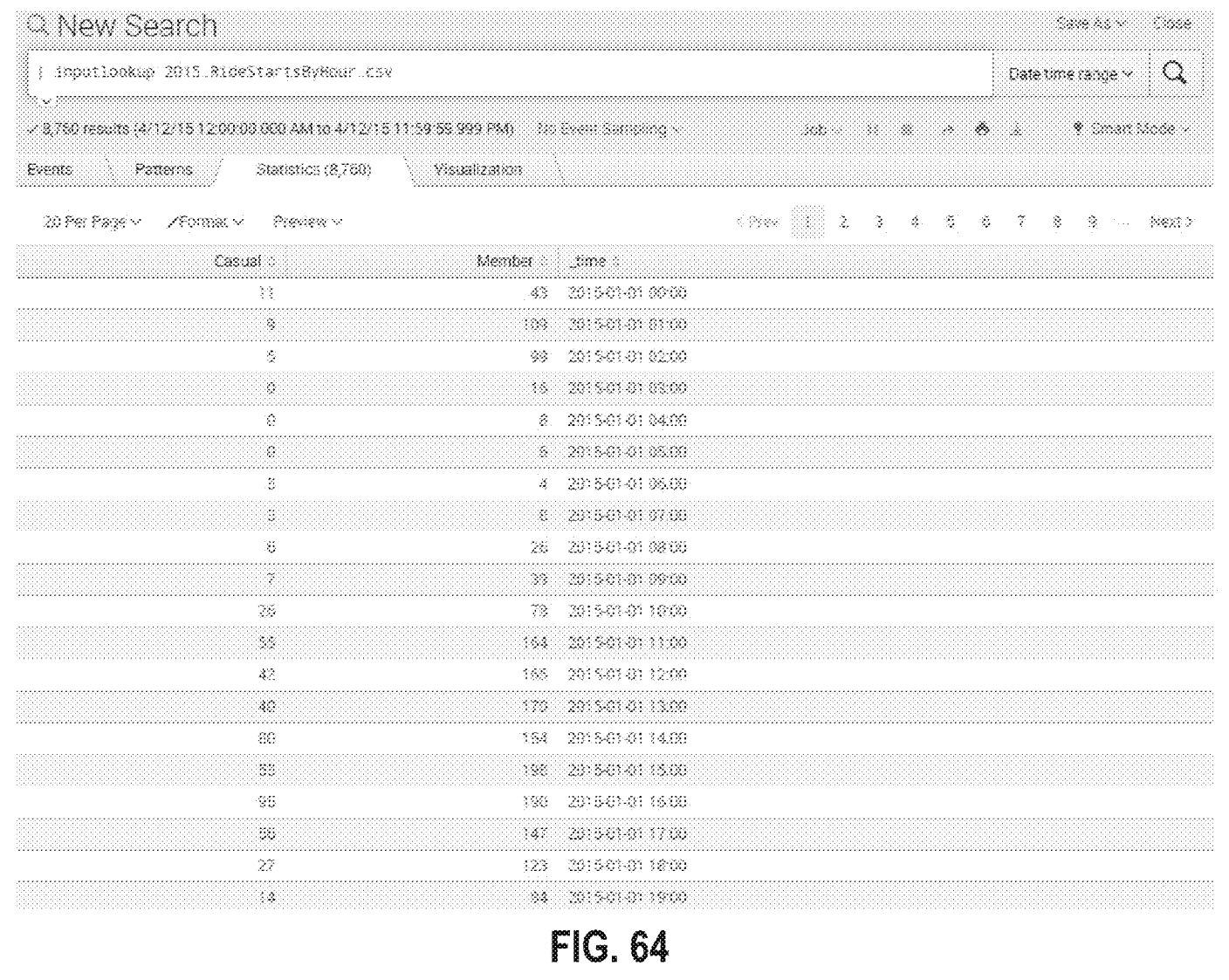

If a user clicks a particular block of a calendar heat map, the search screen 6000 can display an events tab or a statistics tab summarizing the events of that block. FIG. 64 illustrates an example of a statistics tab for a calendar heat map. The statistics tab illustrated in FIG. 64 shows relevant statistics regarding the results of the search query, such as the time stamp, a total number of events involving casual users for a time period (e.g., an hour), and a total number of events involving member users for the time period (e.g., an hour).

A user can also select a subset of the search results by clicking a block and the visualization tab can then visualize of the subset (e.g., using a calendar heat map). Referring back to FIG. 63, a user can click the block representing Apr. 12, 2015 to select the 7,815 events for a further analysis. In response to the user selection, the visualization tab can generate a new calendar heat map to visualize the event data for the selected 7,815 events that occurred on Apr. 12, 2015. The process of visualizing a user-selected subset is referred to as "drill down."

Figure 65:
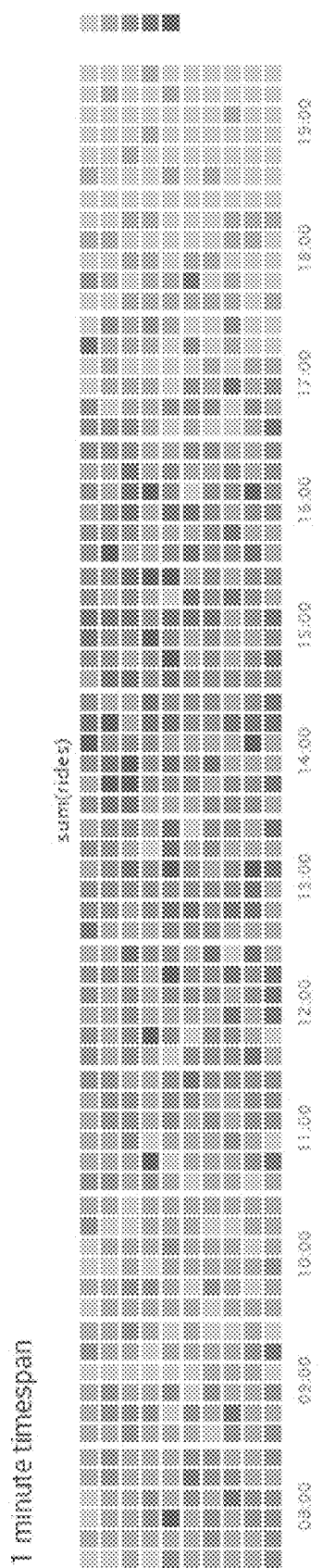
FIG. 65 illustrates an example of a drilled-down calendar heat map.

FIG. 65 illustrates an example of a drilled-down calendar heat map. The drilled-down calendar heat map display event data of the user-selected subset. Each block of the drill-down calendar heat map represents a one-minute timespan. The user can further drill down a subset of event data by clicking one of the blocks representing a one-minute timespan. In response, another calendar heat map can be generated to have blocks representing even smaller timespans (e.g., minutes).

In some embodiments, the system, adapting the static library of software code, automatically chooses an appropriate time range of a calendar heat map based on the timespan represented by each block or the timestamps of the events being displayed. Furthermore, the system can automatically determine the clustering of the blocks. For example, if each block represents a day and the events occurred during a time period of three months, the system can automatically display the blocks in clusters, where each cluster of blocks represents a month.

Real-Time Location Tracker Visualization

The data intake and query system can use the real-time updated event data of the search results to generate a user-interactive "real-time location tracker" graph (also referred to as simply "location tracker" graph) as a visualization of a chart indicative of data. The data intake and query system can generate the location tracker graph by adapting a static library of software code, which in some embodiments is an open source library.

A location tracker graph, as the term is used herein, is a map graph displaying current locations of one or more individual resources in a real time on a map and traces of movement (e.g., routes) of the resource on the map. The location tracker graph displays the real-time locations based on the event data that are continually updated. The event data includes timestamps and location coordinates of the resources. The location tacker graph also continually updates the traces based on the continually-updated event data.

Figure 66:
FIG. 66 illustrates an example of a search screen of a search GUI for a location tracer graph.

FIG. 66 illustrates an example of a search screen of a search GUI for a location tracer graph. The search screen 6600 can be generated by, e.g., the search head of the data intake and query system as illustrated in FIG. 2C. The search screen 6600 includes a search bar 6602 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 6600 also includes a time range picker 6612 that enables the user to specify a time range for the search. The time range picker 6612 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 6600 displays the results through search results section 6604, wherein search results section 6604 includes: an "Events tab" that displays various information about events returned by the search; a "Statistics tab" that displays statistics about the search results; and a "Visualization tab" that displays various visualizations of the search results (e.g., a location tracker graph).

Figure 67:
FIG. 67 illustrates an example of a visualization tab displaying a location tracker graph.

FIG. 67 illustrates an example of a visualization tab displaying a location tracker graph. The location tracker graph 6620 displays a plurality of icons 6622A-6622E on a map. Each of the icons 6622A-6622E represents a current location of a resource. For example, a resource can be a person, a vehicle, a computer device, etc. The event data for an individual resource can include historical data regarding the locations and timestamps for the individual resource. Using the historical data, the location tracker graph can also display the traces (e.g., 6624A-6624E) of movement of the sources. For example, the traces 6624A-6624E can represent past movements of vehicles represented by icons 6622A-6622E.

For each resource, the location tracker graph 6620 assigns a unique color for the resource. The corresponding icon and trace of that resource are displayed using that color. The event data are continually updated. The location tracker graph 6620 can continually update the location of the icons 6622A-6622E and the traces 6624A-6624E based on the continually-updated data.

Figure 68:
FIG. 68 illustrates an example of a location tracker graph showing additional information in response to a user interaction.

The location tracker graph is user-interactive. For example, the user can move a cursor over an icon, or click an icon. In some embodiments, when a user moves a cursor over an icon of a location tracker graph, the visualization tab automatically displays additional information related to the icon. As illustrated in FIG. 68, for example, in response to a user input of moving a cursor over an icon 6622A, the visualization table generates an information block (also referred to as hovering window) to display relevant information about the block, such as an identification number of the resource represented by the icon 6622A.

A user can also select a subset of the search results by clicking a block and the visualization tab can then visualize of the subset (e.g., using another location tracker graph). Referring back to FIG. 68, a user can click the icon 6622A representing driver #944 for a further analysis. In response to the user selection, the visualization tab can generate a new location tracker graph to visualize the event data for the selected driver #944. For example, the new location tracker graph can highlight the icon and trace for the selected driver by removing icons and traces of other drivers. The process of visualizing a user-selected subset is referred to as "drill down."

If a user clicks a particular icon of a location tracker graph, the search screen 6600 can also display an events tab or a statistics tab summarizing the events of that resource. FIG. 69 illustrates an example of a statistics tab for a location tracker graph. The statistics tab illustrated in FIG. 60 shows relevant information regarding the results of the search query, such as timestamps of the events, latitude and longitude coordinates of the events, user identification numbers, etc.

Figure 70:
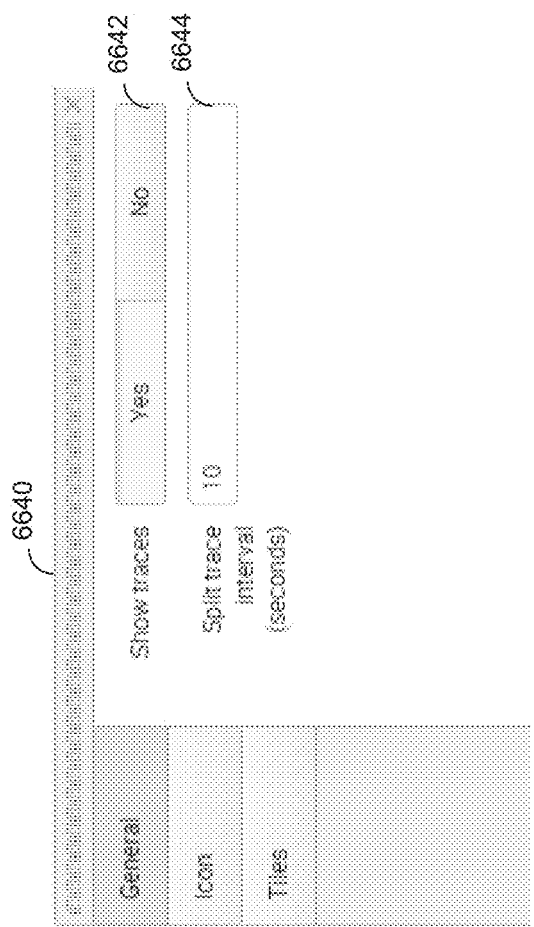
FIG. 70 illustrates an example of a visualization format interface for a location tracker graph.

A user can customize a location tracker graph. For example, a user can click a "format" button 6632 (as illustrated in FIG. 66). In response, the visualization tab can display a visualization format interface. FIG. 70 illustrates an example of a visualization format interface for a location tracker graph. The visualization format interface 6640 includes a "Show traces" radio button 6642 with options of "Yes" and "No." If a user chooses "Yes," the location tracker graph can display the traces. If a user chooses "No," the location tracker graph can omit the traces on the graph.

The visualization format interface 6640 also includes a "Split trace interval" text input 6644 for the user to specify the split trace interval. The user can control the resolution of the traces by specifying different split trace interval. If timestamps of two events are closer than the specified split trace interval, the visualization tab treats the two events as a single event with the same location for the purpose of displaying traces.

Horseshoe Meter Visualization

The data intake and query system can use the real-time updated event data of the search results to generate a user-interactive "horseshoe meter" chart (also referred to as simply "horseshoe meter") as a visualization of a chart indicative of data. The data intake and query system can generate the horseshoe meter by adapting a static library of software code, which in some embodiments is an open source library.

A horseshoe meter, as the term is used herein, is a graph including a number and a curved meter bar shaped like a horseshoe. The number represents a value of a characteristic of an event (or a collection of events). The curved meter bar gauges the characteristic value (also referred to as primary measure) against a set of ranges or a target value.

Figure 71:
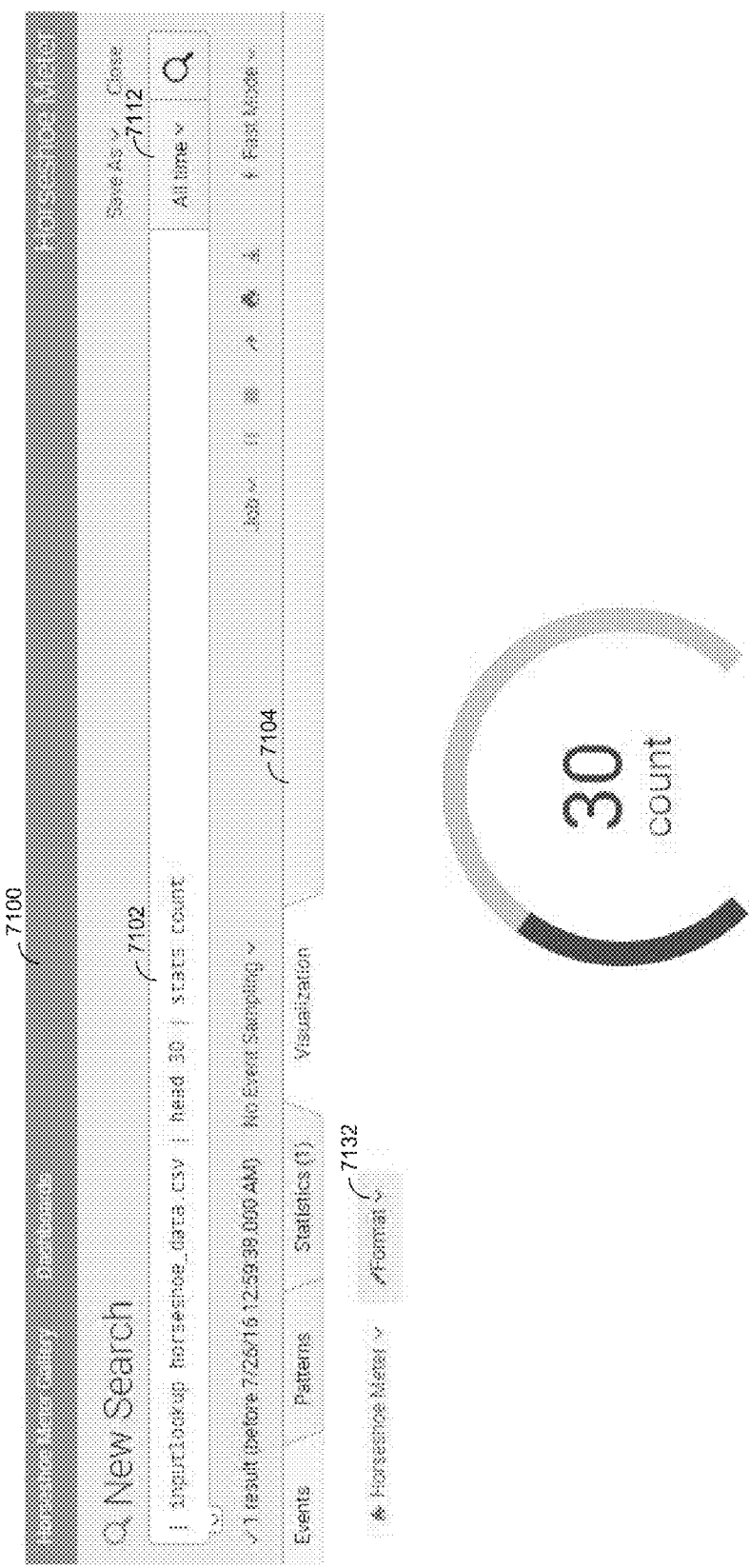
FIG. 71 illustrates an example of a search screen of a search GUI for a horseshoe meter.

FIG. 71 illustrates an example of a search screen of a search GUI for a horseshoe meter. The search screen 7100 can be generated by, e.g., the search head of the data intake and query system as illustrated in FIG. 2C. The search screen 7100 includes a search bar 7102 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 7100 also includes a time range picker 7112 that enables the user to specify a time range for the search. The time range picker 7112 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 7100 displays the results through search results section 7104, wherein search results section 7104 includes: an "Events tab" that displays various information about events returned by the search; a "Statistics tab" that displays statistics about the search results; and a "Visualization tab" that displays various visualizations of the search results (e.g., a horseshoe meter).

Figure 72:
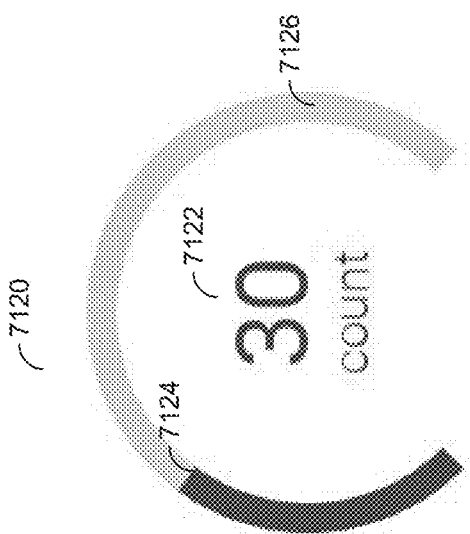
FIG. 72 illustrates an example of a visualization tab displaying a horseshoe meter.

FIG. 72 illustrates an example of a visualization tab displaying a horseshoe meter. The horseshoe meter 7120 displays a number 7122 as the primary measure (such a total count of events). The horseshoe meter 7120 further includes a curved meter bar 7124. The length of the curved meter bar 7124 is also indicative of the primary measure. The curved bar 7126 is indicative of a goal. So the primary measure represented by the bar 7124 is visually compared to the goal represented by the bar 7126.

The horseshoe meter can be user-interactive. For example, the user can move a cursor over an object (e.g., the number 7122 or the bar 7124), or click an object. In some embodiments, when a user moves a cursor over an object of a horseshoe meter, the visualization tab automatically displays additional information related to the object.

If a user clicks a horseshoe meter, the search screen can display an "Events" tab or a "Statistics" tab summarizing the events corresponding to that object. For example, the statistics tab can show relevant statistics regarding the events corresponding to the clicked object.

In some embodiments, a user can select a subset of the search results and the visualization tab can then visualize of the subset (e.g., using another horseshoe meter or other types of charts). In response to the user selection, the visualization tab can generate a new horseshoe meter to visualize the event data for the selected events corresponding to the selected horseshoe meter. The process of visualizing a user-selected subset is referred to as "drill down." In some embodiments, the system automatically selects goal value of the new horseshoe meter without human intervention.

Figure 73:
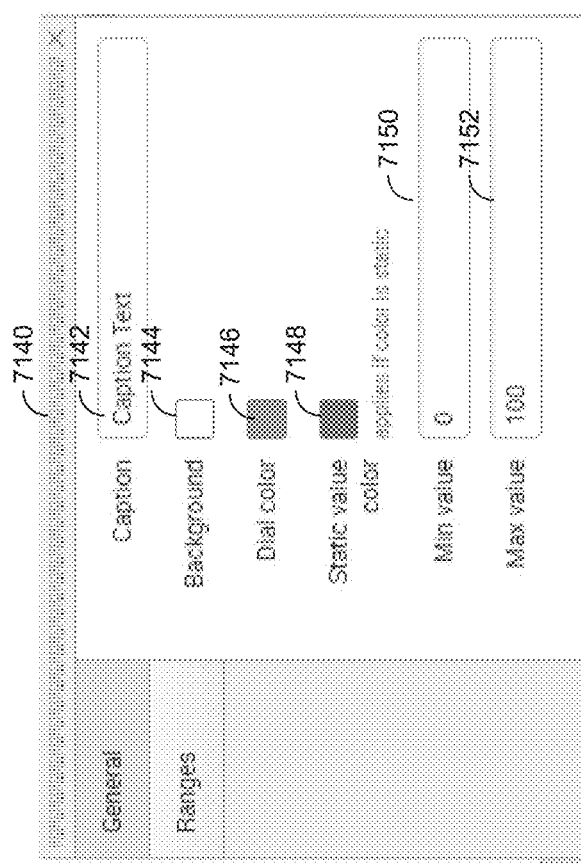
FIG. 73 illustrates an example of a visualization format interface for a horseshoe meter.

A user can customize a horseshoe meter by, e.g., specifying the colors of the primary measure bar, data ranges, and the goal bar. The visualization tab can provide an interface for specifying the colors. For example, a user can click a "format" button 7132 (as illustrated in FIG. 71). In response, the visualization tab can display a visualization format interface. FIG. 73 illustrates an example of a visualization format interface for a horseshoe meter. The visualization format interface 7140 includes "Caption" text input 7142 for specifying the text under the number 7122. The visualization format interface 7140 further includes "Background" button 7144, "Dial color" button 7146 and "Static value color" 7148 for specifying the background color of the horseshoe meter, the color of the primary measure bar 7124 and the color of the goal bar 7126, respectively. The visualization format interface 7140 further includes text inputs 7150 and 7152 for specifying the minimum and maximum values for the goal bar 7126.

Status Indicator Visualization

The data intake and query system can use the real-time updated event data of the search results to generate a user-interactive "status indicator" chart (also referred to as simply "status indicator") as a visualization of a chart indicative of data. The data intake and query system can generate the status indicator by adapting a static library of software code, which in some embodiments is an open source library.

A status indicator, as the term is used herein, is a graph including a number and an icon. The number (also referred to a primary measure) represents a value of a characteristic of an event (or a collection of events). The icon can be used to suggest or explain meaning of the number.

Figure 74:
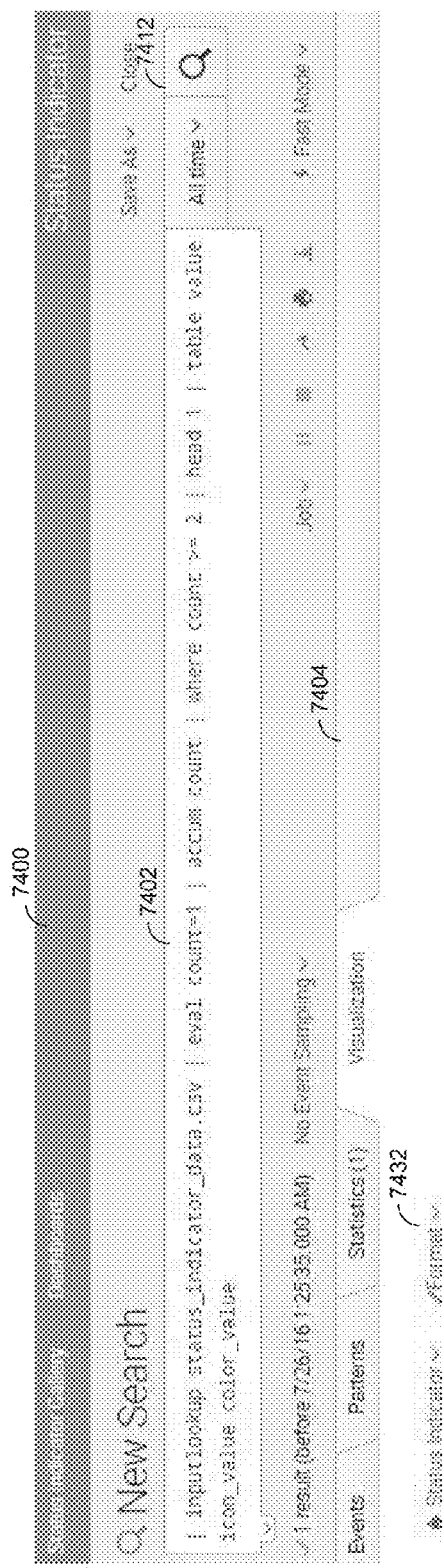
FIG. 74 illustrates an example of a search screen of a search GUI for a status indicator.

FIG. 74 illustrates an example of a search screen of a search GUI for a status indicator. The search screen 7400 can be generated by, e.g., the search head of the data intake and query system as illustrated in FIG. 2C. The search screen 7400 includes a search bar 7402 that accepts a user-input search query in the form of a search string. The search string can be, e.g., in the form of a query in a pipelined search language (PSL), such as Splunk Processing Language (SPL), used in conjunction with the SPLUNK® ENTERPRISE system.

Search screen 7400 also includes a time range picker 7412 that enables the user to specify a time range for the search. The time range picker 7412 can be selected to view a screen having various choices of time ranges for the search. For example, for "historical searches" the user can select a specific time range, or alternatively a relative time range, such as "today," "yesterday" or "last week." For "real-time searches," the user can select the size of a preceding time window to search for real-time events.

After a search is executed, the search screen 7400 displays the results through search results section 7404, wherein search results section 7404 includes: an "Events tab" that displays various information about events returned by the search; a "Statistics tab" that displays statistics about the search results; and a "Visualization tab" that displays various visualizations of the search results (e.g., a status indicator).

Figure 75:
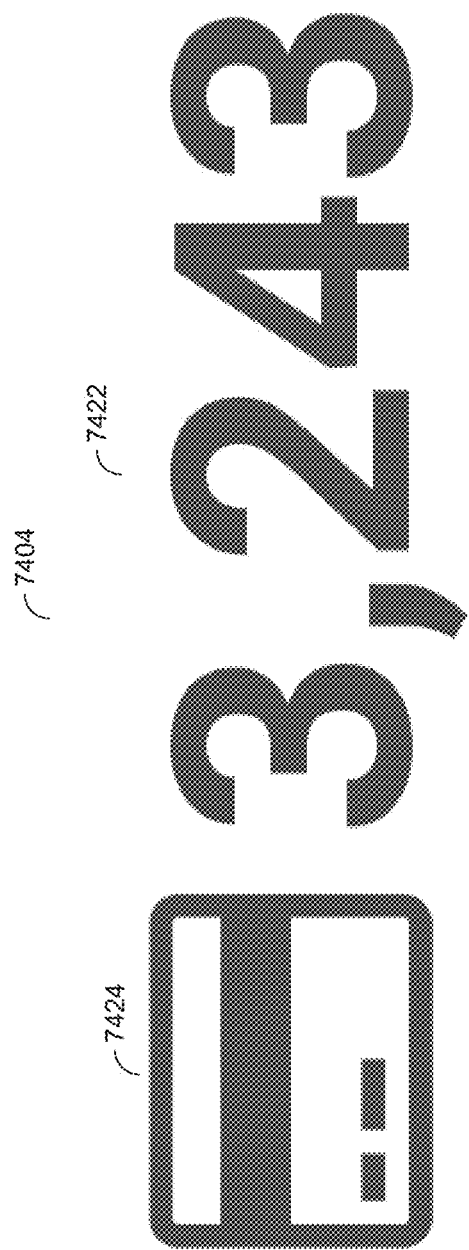
FIG. 75 illustrates an example of a visualization tab displaying a status indicator.

FIG. 75 illustrates an example of a visualization tab displaying a status indicator. The status indicator 7420 displays a number 7422 as the primary measure (such a total count of events). The status indicator 7420 further includes an icon 7424. The icon can be used to suggest or explain meaning of the number. In some embodiments, the system, adapting the static library of software code, automatically chooses the icon 7424 and the color of the number 7422, without human intervention.

Figure 76:
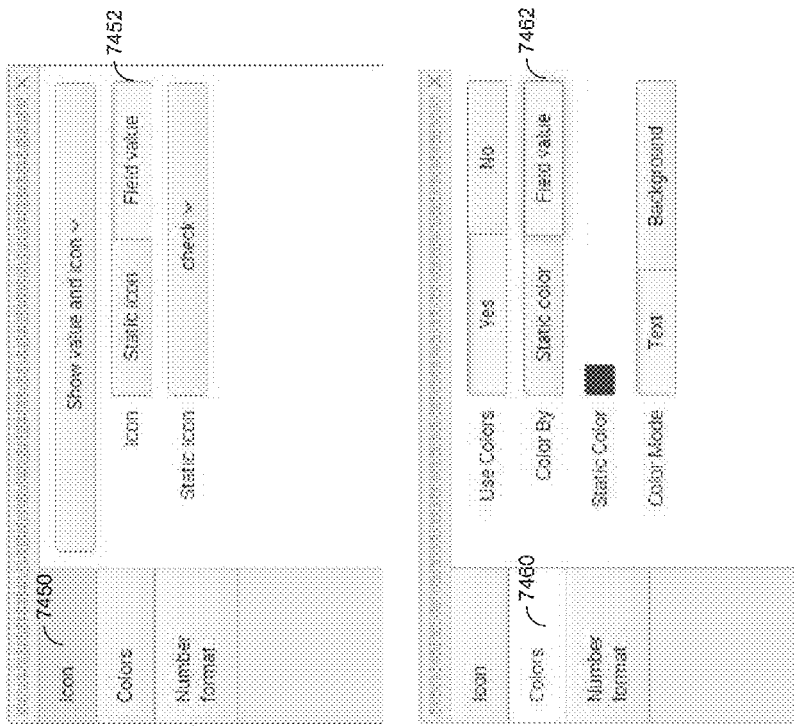
FIG. 76 illustrates an example of a visualization format interface for a status indicator.

A user can customize a status indicator using an interface provided by the visualization tab. For example, a user can click a "format" button 7432 (as illustrated in FIG. 74). In response, the visualization tab can display a visualization format interface. FIG. 76 illustrates an example of a visualization format interface for a status indicator. The visualization format interface 7440 includes "Icon" tab 7450 and "Colors" tab 7460. The "Icon" tab 7450 includes an "Icon" radio button 7452 with options of "Static icon" and "Field value." If a user chooses "Field value," the system, adapting the static library of software code, automatically chooses the icon 7424 based on certain data field of the event data.

The "Colors" tab 7460 includes a "Color By" radio button 7462 with options of "Static color" and "Field value." If a user chooses "Field value," the system, adapting the static library of software code, automatically chooses the color of the number 7422 based on certain data field of the event data.

The status indicator can be user-interactive. For example, the user can move a cursor over an object (e.g., the number 7422 or the icon 7424), or click an object. In some embodiments, when a user moves a cursor over an object of a status indicator, the visualization tab automatically displays additional information related to the object.

If a user clicks a status indicator, the search screen can display an "Events" tab or a "Statistics" tab summarizing the events corresponding to that object. For example, the statistics tab can show relevant statistics regarding the events corresponding to the clicked object.

In some embodiments, a user can select a subset of the search results and the visualization tab can then visualize of the subset (e.g., using another status indicator or other types of charts). In response to the user selection, the visualization tab can generate a new status indicator to visualize the event data for the selected events corresponding to the selected status indicator. The process of visualizing a user-selected subset is referred to as "drill down." In some embodiments, the system automatically selects icon and color of the new status indicator without human intervention.

Example Computer Processing System

Figure 77:
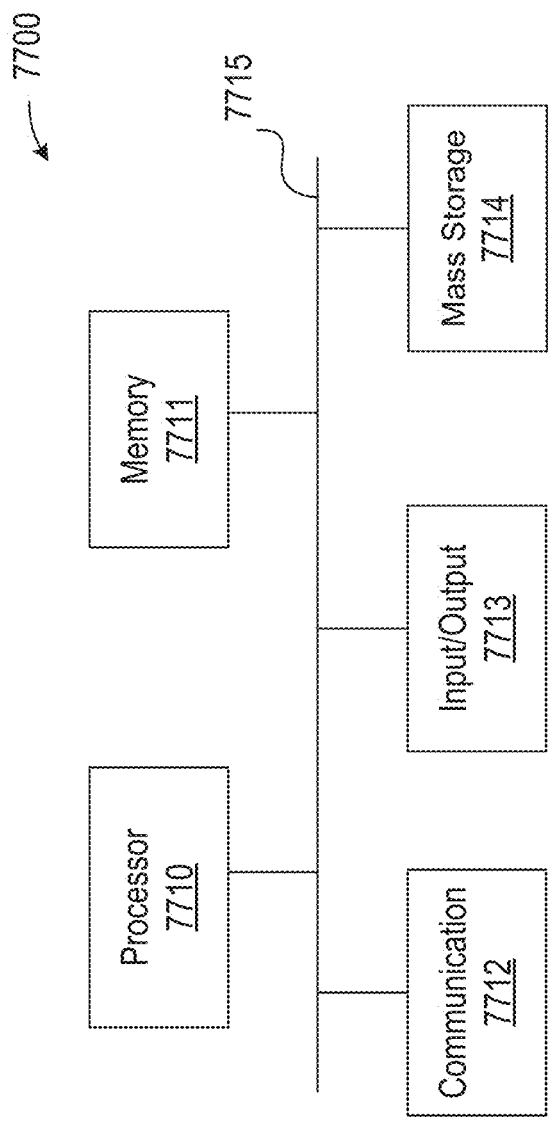
FIG. 77 shows a high-level example of a hardware architecture of a processing system that can be used to implement any one or more of the functional components described herein.

FIG. 77 shows a high-level example of a hardware architecture of a processing system that can be used to implement any one or more of the functional components referred to above (e.g., the tool, forwarders, indexer, search head, data store). One or multiple instances of an architecture such as shown in FIG. 77 (e.g., multiple computers) can be used to implement the techniques described herein, where multiple such instances can be coupled to each other via one or more networks.

The illustrated processing system 7700 includes one or more processors 7710, one or more memories 7711, one or more communication device(s) 7712, one or more input/output (I/O) devices 7713, and one or more mass storage devices 7714, all coupled to each other through an interconnect 7715. The interconnect 7715 may be or include one or more conductive traces, buses, point-to-point connections, controllers, adapters and/or other conventional connection devices. Each processor 7710 controls, at least in part, the overall operation of the processing device 7700 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 7711 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 7714 can be or include one or more hard drives, digital versatile disks (DVDs), flash memories, or the like. Each memory 7711 and/or mass storage 7714 can store (individually or collectively) data and instructions that configure the processor(s) 7710 to execute operations to implement the techniques described above. Each communication device 7712 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 7700, each I/O device 7713 can be or include a device such as a display (which may be a touch screen display), audio speaker, keyboard, mouse or other pointing device, microphone, camera, etc. Note, however, that such I/O devices may be unnecessary if the processing device 1200 is embodied solely as a server computer.

In the case of a user device, a communication device 7712 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 7712 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
in response to a search query, retrieving search results including a plurality of events, each of the plurality of events containing time-stamped data, at a system for indexing and searching data;
identifying a plurality of characteristics from the time-stamped data corresponding to the plurality of events; and
causing display of an interactive multiple-dimensional chart depicting the data corresponding to the events the interactive multiple-dimensional chart including a plurality of axes, each of the axes corresponding to one of the identified characteristics, the interactive multiple-dimensional chart further including a plurality of polylines representing the events, each of the polylines including a plurality of vertices on the axes;
wherein causing display of the interactive multiple-dimensional chart includes:
formatting the time-stamped data corresponding to the plurality of events into a data object that is readable by a code library for generating a static visualization;
receiving state information that is indicative of a current state of display of the interactive multiple-dimensional chart, wherein use of the state information enables the interactive multiple-dimensional chart to be displayed at a plurality of different devices without saving a rendering of the interactive multiple-dimensional chart; and
processing the data object using the code library to render the interactive multiple-dimensional chart based on the received state information.

2. The method of claim 1, wherein the multiple-dimensional chart is a parallel coordinates chart and the plurality of axes are parallel to each other.

3. The method of claim 1, wherein for an individual polyline of the plurality of polylines, a position of an individual vertex of the individual polyline on an individual axis is indicative of a value of a particular characteristic corresponding to the individual axis.

4. The method of claim 1, wherein the time-stamped data comprises machine data.

5. The method of claim 1, wherein the time-stamped data comprises real-time event data.

6. The method of claim 1 further comprising:
in response to a signal indicative of a user interaction with an individual axis of the plurality of axes of the interactive multiple-dimensional chart, identifying a subset of events that correspond with the individual axis; and
dynamically updating display of the interactive multiple-dimensional chart by processing the subset of events using the code library.

7. The method of claim 1, wherein the code library is open source.

8. The method of claim 1, further comprising:
repeatedly and automatically updating the interactive multiple-dimensional chart when the search results are updated with new events.

9. The method of claim 1, wherein the events represent products or data points that are indicated in the time-stamped data corresponding to the events.

10. The method of claim 1, wherein a color of each individual polyline of the plurality of polylines is indicative of a position of a vertex of the individual polyline on a particular axis of the plurality of axes.

11. The method of claim 1, wherein a color of each individual polyline of the plurality of polylines is indicative of a value or a value range of a particular characteristic for an event represented by the individual polyline, or is indicative of a category of a particular characteristic for an event represented by the individual polyline.

12. The method of claim 1, further comprising:
in response to a user interacting with the interactive multiple-dimensional chart or the user changing the search query,
reordering the axes of the interactive multiple-dimensional chart; and
causing changes of the polylines of the interactive multiple-dimensional chart in response to the reordering of the axes.

13. The method of claim 1, further comprising:
in response to a user input, dynamically switching the interactive multiple-dimensional chart between a categorical color mode and a sequential color mode;
wherein in a sequential color mode, a color of an individual polyline of the plurality of polylines denotes a value range of a particular characteristic for an event represented by the individual polyline; and
wherein in a categorical color mode, a color of an individual polyline of the plurality of polylines denotes a category of a particular characteristic for an event represented by the individual polyline.

14. The method of claim 1, further comprising:
displaying the plurality of polylines in a plurality of colors, wherein a color of an individual polyline of the plurality of polylines denotes a value range of a particular characteristic for an event represented by the individual polyline;
in response to a user input, adjusting value ranges of the particular characteristic for the plurality of colors;
dynamically changing the colors of the polylines based on the adjusted value ranges.

15. The method of claim 1, further comprising:
generating a user interface element for users to specify a time range of events as part of the search query.

16. The method of claim 1, further comprising:
receiving a signal indicative of a user input interacting with an individual axis of the plurality of axes of the interactive multiple-dimensional chart;
in response to the signal, generating a filter specifying a value range of a particular characteristic represented by the individual axis; and
highlighting polylines representing events that are selected by the filter.

17. The method of claim 1, further comprising:
receiving a signal indicative of a user input interacting with an individual axis of the plurality of axes of the interactive multiple-dimensional chart;
in response to the signal, generating a filter specifying a value range of a particular characteristic represented by the individual axis, based on the user input interacting with the individual axis; and
reducing intensities of polylines representing events that are excluded by the filter.

18. The method of claim 1, further comprising:
receiving a signal indicative of a user input interacting with an individual axis of the plurality of axes of the interactive multiple-dimensional chart;
in response to the signal, generating a filter specifying a value range of a particular characteristic represented by the individual axis;
removing polylines representing events that are excluded by the filter;
receiving a second signal indicative of a user input clearing the filter; and
displaying polylines representing events that are excluded by the filter and polylines representing events that are selected by the filter.

19. The method of claim 1, further comprising:
receiving a first signal indicative of a user input interacting with a first individual axis of the plurality of axes of the interactive multiple-dimensional chart;
in response to the first signal, generating a first filter specifying a first value range of a first particular characteristic represented by the first individual axis;
receiving a second signal indicative of a user interaction with a second individual axis of the plurality of axes of the interactive multiple-dimensional chart;
in response to the second signal, generating a second filter specifying a second value range of a second particular characteristic represented by the second individual axis, based on the user input interacting with the second individual axis; and
highlighting polylines representing events that are selected by the first filter and the second filter.

20. The method of claim 1, further comprising:
receiving a user input selecting a subset of events from the search results; and
generating a second interactive multiple-dimensional chart visualizing data of the subset of events by processing the subset of events using the code library.

21. The method of claim 1, further comprising:
receiving a signal indicative of a user input interacting with an individual axis of the plurality of axes of the interactive multiple-dimensional chart;
in response to the signal, generating a filter specifying a value range of a particular characteristic represented by the individual axis, based on the user input interacting with the individual axis;
identifying a set of new coordinate ranges for the plurality of axes, based on the filter specifying the value range of the particular characteristic; and
generating a second interactive multiple-dimensional chart visualizing data of the subset of events selected by the filter, the second interactive multiple-dimensional chart including the plurality of axes with the set of new coordinate ranges.

22. The method of claim 1, further comprising:
in response to a cursor being positioned over an individual polyline of the plurality of polylines, displaying a total number of the one or more events that are represented by the individual polyline.

23. The method of claim 1, further comprising:
in response to a cursor being positioned over an individual polyline of the plurality of polylines, displaying a total number of the one or more events that are share common characteristics represented by vertices of the individual polyline.

24. The method of claim 1, further comprising:
in response to a cursor being positioned over an individual polyline of the plurality of polylines, displaying a hovering window that includes additional information related to the individual polyline.

25. The method of claim 1, further comprising:
in response to a cursor being positioned over an individual polyline of the plurality of polylines, displaying an event represented by the individual polyline.

26. The method of claim 1, further comprising:
receiving a signal indicative of a user input interacting with an individual axis of the plurality of axes of the interactive multiple-dimensional chart; and
in response to the signal, updating the state information based on the user interaction with the individual axis of the plurality of axes of the interactive multiple-dimensional chart.

27. The method of claim 1, further comprising:
in response to a signal indicative of a user interaction with an individual axis of the plurality of axes of the interactive multiple-dimensional chart, identifying a subset of events that correspond with the individual axis; and
dynamically updating display of the interactive multiple dimensional chart by:
discarding the object used to render a current version of the multiple-dimensional chart;
formatting a subset of the time-stamped data corresponding to the subset of events into a second data object that is readable by the code library; and
processing the second data object using the code library to render an updated version of the multiple-dimensional chart.

28. A computer system comprising:
processor; and
a storage device having instructions stored thereon, which when executed by the processor cause the system to:
in response to a search query, retrieve search results including a plurality of events, each of the plurality of events containing time-stamped data;
identify a plurality of characteristics from the time-stamped data corresponding to the plurality of events; and
cause display of an interactive multiple-dimensional chart depicting the data corresponding to the events, the interactive multiple-dimensional chart including a plurality of axes, each of the axes corresponding to one of the identified characteristics, the interactive multiple-dimensional chart further including a plurality of polylines representing the events, each of the polylines including a plurality of vertices on the axes;
wherein causing display of the interactive multiple-dimensional chart includes:
formatting the time-stamped data corresponding to the plurality of events into a data object that is readable by a code library for generating a static visualization;
receiving state information that is indicative of a current state of display of the interactive multiple-dimensional chart, wherein use of the state information enables the interactive multiple-dimensional chart to be displayed at a plurality of different devices without saving a rendering of the interactive multiple-dimensional chart; and
processing the data object using the code library to render the interactive multiple-dimensional chart based on the received state information.

29. A non-transitory computer readable medium containing instructions, execution of which in a computer system causes the computer system to:
in response to a search query, retrieve search results including a plurality of events, each of the plurality of events containing time-stamped data;
identify a plurality of characteristics from the time-stamped data corresponding to the plurality of events; and
cause display of an interactive multiple-dimensional chart depicting the data corresponding to the events, the interactive multiple-dimensional chart including a plurality of axes, each of the axes corresponding to one of the identified characteristics, the interactive multiple-dimensional chart further including a plurality of polylines representing the events, each of the polylines including a plurality of vertices on the axes;
wherein causing display of the interactive multiple-dimensional chart includes:
formatting the time-stamped data corresponding to the plurality of events into a data object that is readable by a code library for generating a static visualization;
receiving state information that is indicative of a current state of display of the interactive multiple-dimensional chart, wherein use of the state information enables the interactive multiple-dimensional chart to be displayed at a plurality of different devices without saving a rendering of the interactive multiple-dimensional chart; and
processing the data object using the code library to render the interactive multiple-dimensional chart based on the received state information.

* * * * *